US010757707B2

(12) United States Patent
Lee et al.

(10) Patent No.: US 10,757,707 B2
(45) Date of Patent: Aug. 25, 2020

(54) METHOD AND APPARATUS FOR COMMUNICATING IN WIRELESS COMMUNICATION SYSTEM

(71) Applicant: Samsung Electronics Co., Ltd., Gyeonggi-do (KR)

(72) Inventors: Namjeong Lee, Suwon-si (KR); Chanhong Kim, Suwon-si (KR); Taeyoung Kim, Seoul (KR); Hyunseok Ryu, Yongin-si (KR); Peng Xue, Suwon-si (KR); Hyunil Yoo, Suwon-si (KR); Yeohun Yun, Hwaseong-si (KR); Jongbu Lim, Seoul (KR); Cheol Jeong, Seongnam-si (KR); Sungnam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 15/614,485

(22) Filed: Jun. 5, 2017

(65) Prior Publication Data

US 2018/0007679 A1 Jan. 4, 2018

(30) Foreign Application Priority Data

Jun. 3, 2016 (KR) .................. 10-2016-0069707
Sep. 29, 2016 (KR) .................. 10-2016-0125939

(51) Int. Cl.
*H04W 72/04* (2009.01)
*H04B 7/26* (2006.01)
(Continued)

(52) U.S. Cl.
CPC ........ *H04W 72/048* (2013.01); *H04B 7/0695* (2013.01); *H04B 7/088* (2013.01);
(Continued)

(58) Field of Classification Search
CPC ................................. H04W 72/0048
See application file for complete search history.

(56) References Cited

U.S. PATENT DOCUMENTS

2010/0103045 A1 4/2010 Liu et al.
2013/0250818 A1 9/2013 Gaal et al.
(Continued)

FOREIGN PATENT DOCUMENTS

JP      2013176050 A    9/2013
KR  10-2015-0077511 A   7/2015
WO     2015046853 A1    4/2015

OTHER PUBLICATIONS

International Search Report, dated Sep. 8, 2017, regarding Application No. PCT/KR2017/005858, 3 pages.
(Continued)

*Primary Examiner* — Sulaiman Nooristany

(57) ABSTRACT

The present disclosure relates to a 5G or a pre-5G communication system for supporting a higher data rate following 4G communication systems such as LTE. In accordance with an embodiment of the present disclosure, a method of a base station includes: checking an operation mode depending on whether beam sweeping is supported, transmitting a signal related to the operation mode to a terminal, and performing communication with the terminal according to the operation mode.

20 Claims, 38 Drawing Sheets

(51) Int. Cl.
    *H04B 7/08*           (2006.01)
    *H04B 7/06*           (2006.01)
    *H04L 5/14*            (2006.01)
    *H04W 56/00*        (2009.01)
    *H04W 72/00*        (2009.01)
    *H04B 7/0413*       (2017.01)
    *H04W 16/28*        (2009.01)
    *H04W 88/10*        (2009.01)

(52) U.S. Cl.
    CPC ............... *H04B 7/26* (2013.01); *H04L 5/14* (2013.01); *H04W 56/001* (2013.01); *H04W 72/005* (2013.01); *H04B 7/0413* (2013.01); *H04W 16/28* (2013.01); *H04W 72/046* (2013.01); *H04W 72/0446* (2013.01); *H04W 88/10* (2013.01)

(56) References Cited

U.S. PATENT DOCUMENTS

2016/0044517 A1     2/2016   Raghavan et al.
2016/0294462 A1*  10/2016  Jeong ................... H04B 10/29
2017/0111886 A1*   4/2017  Kim ..................... H04W 72/042
2018/0176065 A1*   6/2018  Deng .................... H04B 7/088

OTHER PUBLICATIONS

Samsung et al., "WF on Supported NR Operations", 3GPP TSG RAN WG1 #85, R1-165559, May 2016, 5 pages.

\* cited by examiner

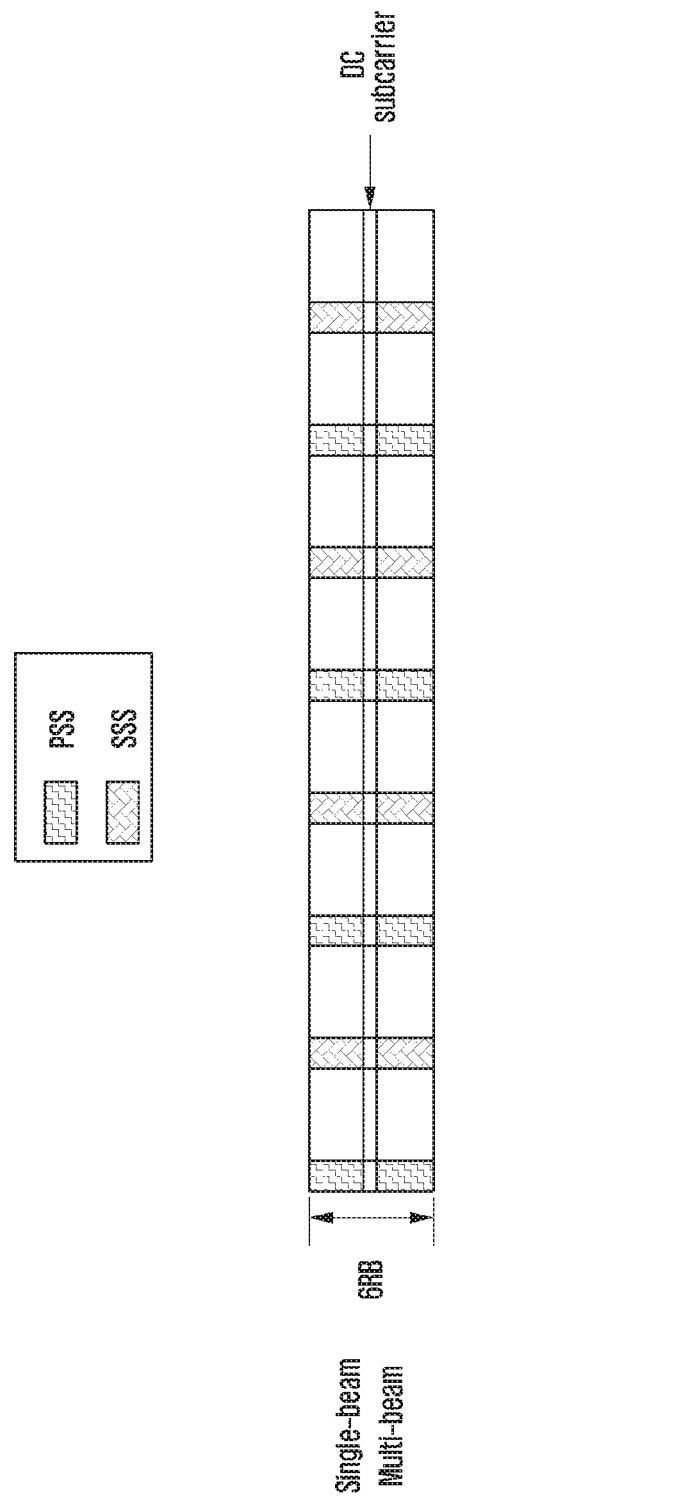

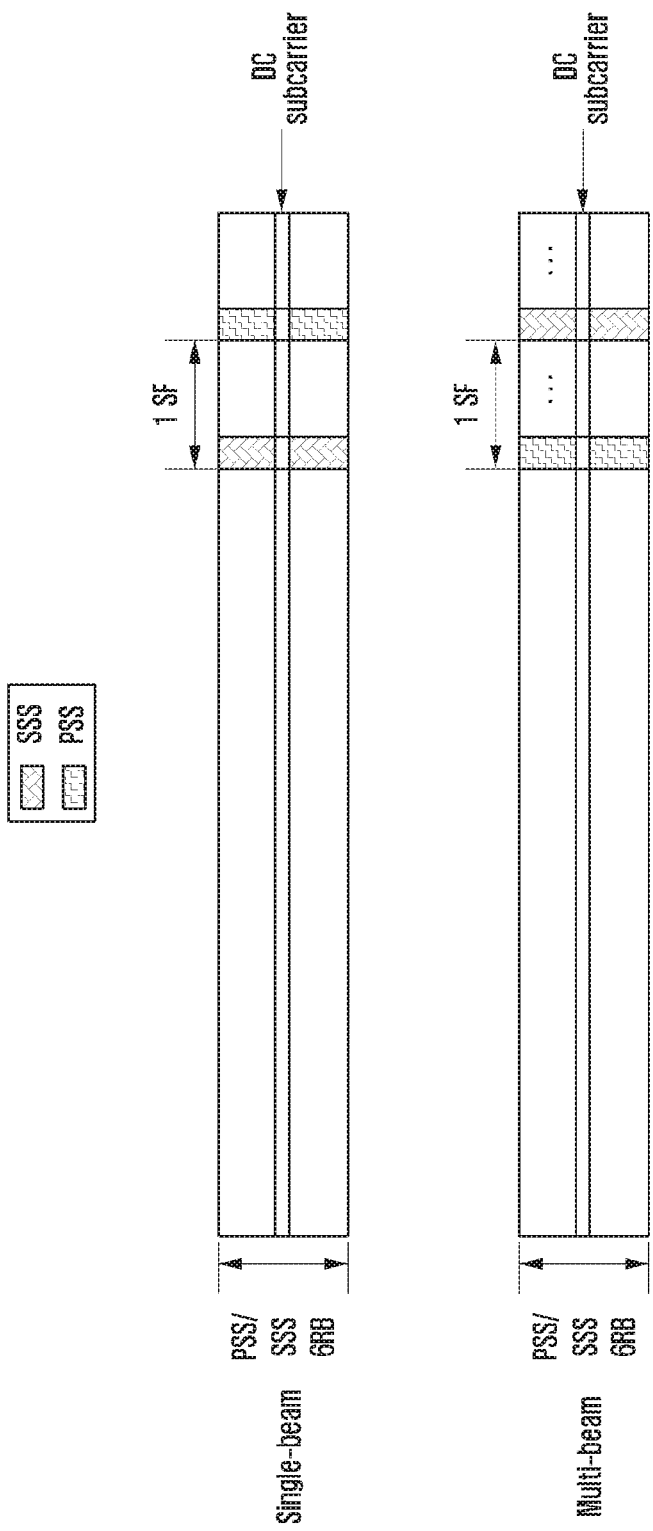

METHOD AND APPARATUS FOR COMMUNICATING IN WIRELESS COMMUNICATION SYSTEM

CROSS-REFERENCE TO RELATED APPLICATION(S) AND CLAIM OF PRIORITY

This application claims priority under 35 U.S.C. 119(a) to applications filed in the Korean Intellectual Property Office on Jun. 3, 2016, and Sep. 29, 2016, and assigned Serial Nos. 10-2016-0069707 and 10-2016-0125939, respectively, the contents of which are incorporated herein by reference.

TECHNICAL FIELD

The present disclosure relates to a wireless communication system, and more particularly, the present disclosure provides a method and an apparatus for transmitting information on an operation mode of a base station, etc. to a terminal.

BACKGROUND

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system.

To achieve a high data transmission rate, the 5G communication system is considered to be implemented in a super high frequency (mmWave) band (e.g., like 60 GHz band). To relieve a path loss of a radio wave and increase a transfer distance of the radio wave in the super high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed.

In addition, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, a demand for a method for supporting a massive multiple input multiple output (MIMO) system through an integrated framework has been increased.

SUMMARY

To address the above-discussed deficiencies, it is a primary object to provide

The present disclosure has been made in order to solve the above problems, and an aspect of the present disclosure provides a method and an apparatus for indicating information on an operation mode of a base station, information on a physical broadcast channel (PBCH) period, and information related to a frame structure.

In accordance with an aspect of the present disclosure, a method of a base station includes: checking an operation mode depending on whether beam sweeping is supported, transmitting a signal related to the operation mode to a terminal, and performing communication with the terminal according to the operation mode.

In accordance with another aspect of the present disclosure, a method of a terminal includes: receiving a signal related to an operation mode depending on whether beam sweeping is supported from a base station, determining the operation mode of the base station based on the received signal, and performing communication with the base station according to the operation mode.

According to the embodiment of the present disclosure, the terminal may acquire information on an operation mode of the base station, information on a physical broadcast channel (PBCH) period, and information related to a frame structure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A to 6C illustrate examples downlink frame structure of transmission by the base station to the terminal according to an embodiment of the present disclosure;

FIGS. 8A to 8C illustrate examples transmission structure of a synchronization signal according to an embodiment of the present disclosure in a case in which the base station does not support beam sweeping or in a case in which the base station supports beam sweeping;

DETAILED DESCRIPTION

Figure 1:
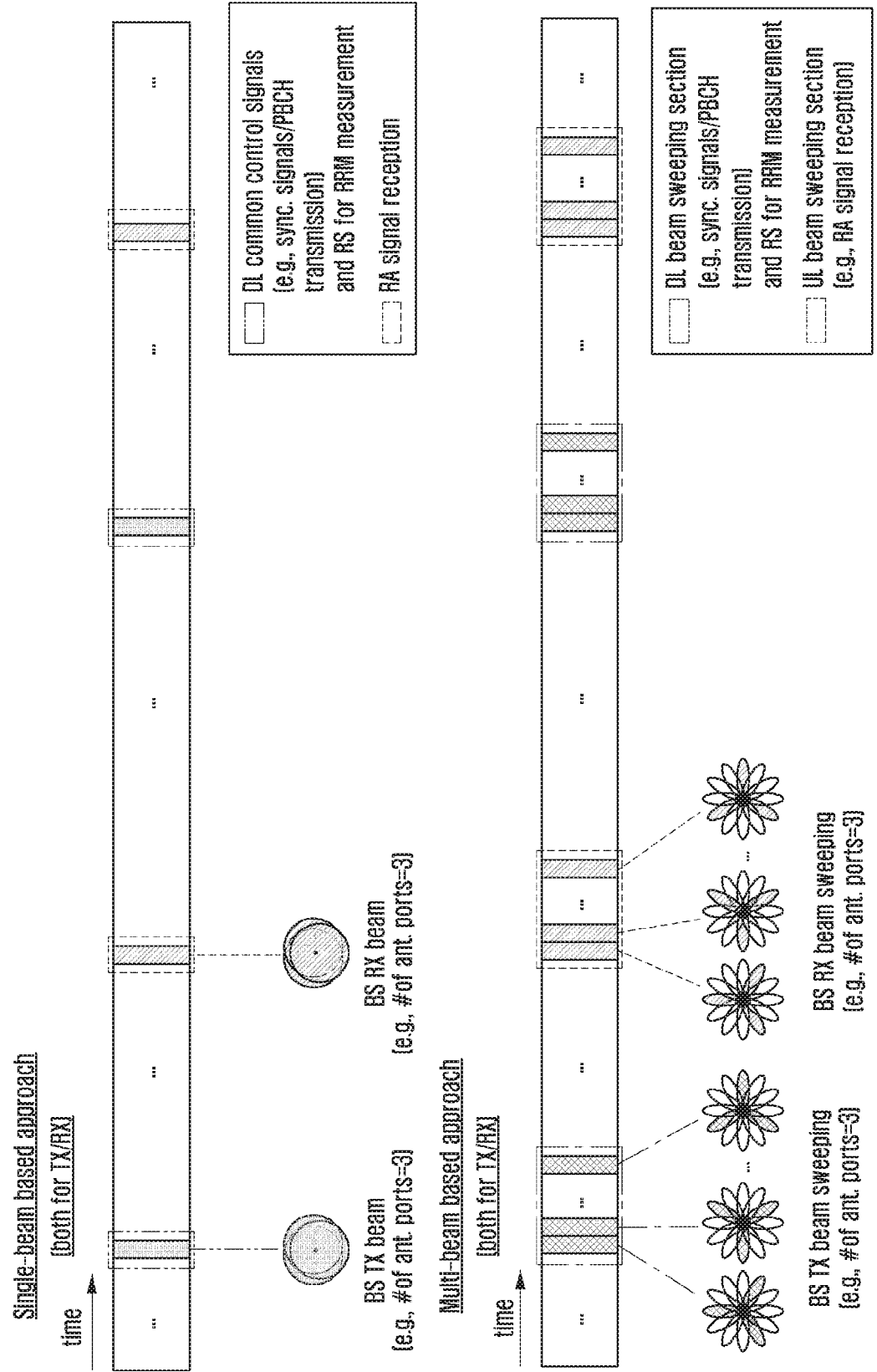
FIG. 1 illustrates an example general beam sweeping method.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect the real size of each component. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term "unit" used in the present embodiment means software or hardware components such as FPGA and ASIC and the "unit" performs any roles. However, the meaning of the "unit" is not limited to software or hardware. The "unit" may be configured to be in a storage medium that may be addressed and may also be configured to reproduce one or more processor. Accordingly, for example, the "unit" includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "units" may be combined with a smaller number of components and the "units" or may further separated into additional components and "units". In addition, the components and the "units" may also be implemented to reproduce one or more CPUs within a device or a security multimedia card.

In the present disclosure, a terminal may generally include a mobile terminal, and may indicate a device that is pre-subscribed to a mobile communication system to receive a service from the mobile communication system. The mobile terminal may include smart devices such as a smartphone, a tablet PC, and the like, but this is merely an example and the present disclosure is not limited thereto.

Prior to detailed description of the present disclosure, terms used throughout the present specification may be defined: (1) Transceiver unit (TXRU): a TXRU is an amplitude and phase controller connected to a single transmission and reception radio frequency (RF) and a single RF. For example, the TXRU may be a unit configured by integrating a plurality of antenna elements; (2) TXRU virtualization: TXRU virtualization may define a relationship between each RF and an antenna element at the time of transmission/reception. For example, the TXRU virtualization may be a process of determining how many or which antenna element is connected to each RF;
(3) TXRU virtualization weight(s): a TXRU virtualization weight may mean a coefficient for determining a phase and amplitude of a transmission and/or reception beam generated in each TXRU.
(4) Static TXRU virtualization weight(s): a static TXRU virtualization weight may mean that the TXRU virtualization weight(s) is not changed over time. For example, the static TXRU virtualization weight may mean that a phase and amplitude of a beam generated in a transmission/reception terminal are constants; (5) Dynamic TXRU virtualization weight(s): a dynamic TXRU virtualization weight may mean that the TXRU virtualization weight(s) is changed over time. For example, the dynamic TXRU virtualization weight may mean that a phase and amplitude of a beam generated in a transmission/reception terminal are continuously changed; (6) TXRU virtualization type: a TXRU virtualization type may mean a type of a base station or a terminal classified depending on whether the base station or the terminal performs the static or dynamic TXRU virtualization weight(s);
(7) TXU/RXU virtualization: a TXU only refers to a transmission terminal, and a RXU only refers to a reception terminal;
(8) Analog-beam forming (Analog-BF): analog-BF may mean a case in which the dynamic TXRU virtualization weight(s) is performed and the base station or the terminal has a single TXRU. At this point, one beam that is changed over time may be generated;
(9) Hybrid-beam forming (Hybrid-BF): hybrid-BF may mean a case in which the dynamic TXRU virtualization weight(s) is performed and the base station or the terminal has a plurality of TXRUs. At this point, a plurality of beams that are changed over time may be generated. Therefore, a multiple input multiple output (MIMO) operation such as multiplexing or diversity multiplexing at a digital terminal may be possible;
(10) Digital-beam forming (Digital-BF): digital-BF may mean a case in which the static TXRU virtualization weight(s) is performed. At this point, a single beam or a plurality of beams that are not changed over time may be generated;
(11) Beam reference signal (BRS): a BRS may mean a reference signal that may be used by a terminal to select a cell at the time of initial access of the terminal, or to select a preferred beam among beams transmitted from the base station;
(12) Beam sweeping: beam sweeping may mean that a signal is transmitted in every direction of a cell by transmitting a beam in different directions for various time instances at a transmission/reception terminal in order to prevent an angular coverage hole that is generated at the time of generating a beam from being generated;
(13) Single-beam based approach: a single-beam based approach may mean a system in which every direction of the cell is available without a beam-sweeping operation since a beam generated in a transceiver unit is sufficiently wide;
(14) Multi-beam based approach: a multi-beam based approach may mean a system in which every direction of the cell is available only with a beam-sweeping operation since a beam generated in a transceiver unit is narrow;
(15) Transmission and reception point (TRP): a signal transmission and reception device including an antenna or antennas;
(16) Base station: a base station in the present disclosure performs transmission and reception in a single cell and one base station may be configured of a single TRP or a plurality of TRPs; and
(17) User equipment (UE): a UE is a user equipment that may transmit or receive a signal to or from the base station and may be used as a synonym of a user terminal, a terminal, and the like.

FIG. 1 illustrates an example single-beam based approach and the multi-beam based approach. As described above, the multi-beam based approach is accompanied with beam-sweeping.

As illustrated in FIG. 1, a single-beam or multi-beam may be generated regardless of an architecture of a transceiver unit, that is, regardless of whether the transceiver unit performs analog-beam forming (A-BF), digital-beam forming (D-BF), or hybrid-beam forming (H-BF).

Recently, signal transmission at 1 to 100 GHz band in a new radio access network (RAT) or a new radio access technology (NR) standard has been discussed. At this time, the single-beam based approach and the multi-beam based approach may be utilized regardless of a band. Alternatively, different architectures and operations may be or may not be divided according to a band. For example, system support may be made in the following form in a single standard. A DL/UL frame structure is changed depending on a beam approach and architecture of the base station, and the change in the frame structure means that an operation of the base station/terminal according thereto is also changed.

The following Table 1 shows classification of downlink/uplink (DL/UL) frame structure for each NR band.

TABLE 1

| Operating band | Classification based on band | Classification based on beamforming approach |
|---|---|---|
| All bands in which NR is operated | DL/UL frame structure 1 or 2 | DL/UL frame structure 1-1 or 1-2, or DL/UL frame structure 2-1 or 2-2 Note: DL/UL frame structure 1-1 = Single-beam DL/UL frame structure 1-2 = Multi-beam, D-BF DL/UL frame structure 2-1 = Single-beam DL/UL frame structure 2-2 = Multi-beam, H-BF |

As shown in Table 1 above, the terminal may determine the DL/UL frame structure through an identifier in a corresponding center frequency region regardless of an operating frequency. Thereafter, the DL/UL frame structure depending on whether the single-beam based approach or the multi-beam based approach is used may be determined through another identifier, thereby determining an operation of the base station/terminal.

At this point, the DL/UL frame structure 1-1 represents a single-beam system based on D-BF or H-BF architecture, and the DL/UL frame structure 1-2 represents a multi-beam system based on D-BF architecture. The DL/UL frame structure 2-1 represents a single-beam system based on D-BF or H-BF architecture, and the DL/UL frame structure 2-2 represents a multi-beam system based on H-BF architecture.

Each frame structure may be different in multiplexing between channels, a configuration scheme for a certain channel, contents of a certain channel, and the like. For example, in the DL/UL frame structure 1 (1-1/1-2), a synchronization signal and a PBCH may be subject to time-division multiplexing (TDM), and a minimum system BW may also be determined according thereto. On the other hand, in the DL/UL frame structure 2 (2-1/2-2), synchronization signals may be subject to frequency-division multiplexing (FDM), and synchronization signals and a PBCH may be subject to the TDM. Alternatively, synchronization signals and a PBCH may also be subject to FDM.

Further, the DL/UL frame structures 1-2 and 2-2 may have differences as follows in addition to the multiplexing scheme between channels described above. For example, in the DL/UL frame structure 2-1, a synchronization signal and a PBCH are subject to beam sweeping based on multi-beam, but a BRS is not transmitted and the synchronization signal may perform a measurement function. On the other hand, in the DL/UL frame structure 2-2, a synchronization signal and a PBCH are subject to beam sweeping based on multi-beam, and a separate channel (i.e. a BRS)(which is also subject to beam sweeping) performing a measurement function may be included.

If the DL/UL frame structures 1-1 and 2-1 are the same as each other, and the DL/UL frame structures 1-2 and 2-2 are the same as each other, the above Table 1 is in the same situation as Table 3 added below.

As another example, system support as below may be possible. Specifically, Table 2 shows classification of DL/UL frame structures for each NR band.

TABLE 2

| Operating band | Classification based on band | Classification based on beamforming approach |
|---|---|---|
| F1 GHz or less | DL/UL frame structure 1 | DL/UL frame structure 1-1 (Single-beam) DL/UL frame structure 1-2 (Multi-beam) |
| F1 GHz to F2 GHz | DL/UL frame structure 1 or 2 | DL/UL frame structure 1-1 or 1-2, or DL/UL frame structure 2-1 or 2-2 |
| F2 GHz or more | DL/UL frame structure 2 | DL/UL frame structure 2-1 (Single-beam) DL/UL frame structure 2-2 (Multi-beam) |

As show in Table 2 above, the terminal may determine a center frequency through a channel raster, check an operating frequency region to which the corresponding center frequency belongs according to Table 2, and determine a DL/UL frame structure depending on whether the single-beam based approach or the multi-beam based approach is used through an identifier in each region, thereby determining an operation of the base station/terminal. In particular, in the F1 GHz to F2 GHz region, an identifier for classifying the DL/UL frame structures 1 and 2 is required.

As another example, system support as below may be possible. Specifically, Table 3 shows classification of DL/UL frame structures for each NR band.

TABLE 3

| Operating band | Classification based on band | Classification based on beamforming approach |
|---|---|---|
| F1 GHz or less | DL/UL frame structure 1 | DL/UL frame structure 1-1 (Single-beam) DL/UL frame structure 1-2 (Multi-beam) |
| F1 GHz or more | DL/UL frame structure 2 | DL/UL frame structure 2-1 (Single-beam) DL/UL frame structure 2-2 (Multi-beam) |

In this case, the terminal may determine a center frequency through a channel raster, check an operating frequency region to which the corresponding center frequency belongs according to Table 3, and determine a DL/UL frame structure depending on whether the single-beam based approach or the multi-beam based approach is used through an identifier in each region, thereby determining an operation of the base station/terminal.

As another example, whether the base station uses the single-beam based approach or the multi-beam bases approach without classification based on the band. Specifically, Table 4 shows classification of DL/UL frame structure for each NR band.

TABLE 4

| Operating band | Classification based on band |
|---|---|
| NR Operating Bands | DL/UL frame structure 1 (Single-beam) DL/UL frame structure 2 (Multi-beam) |

Figure 4:
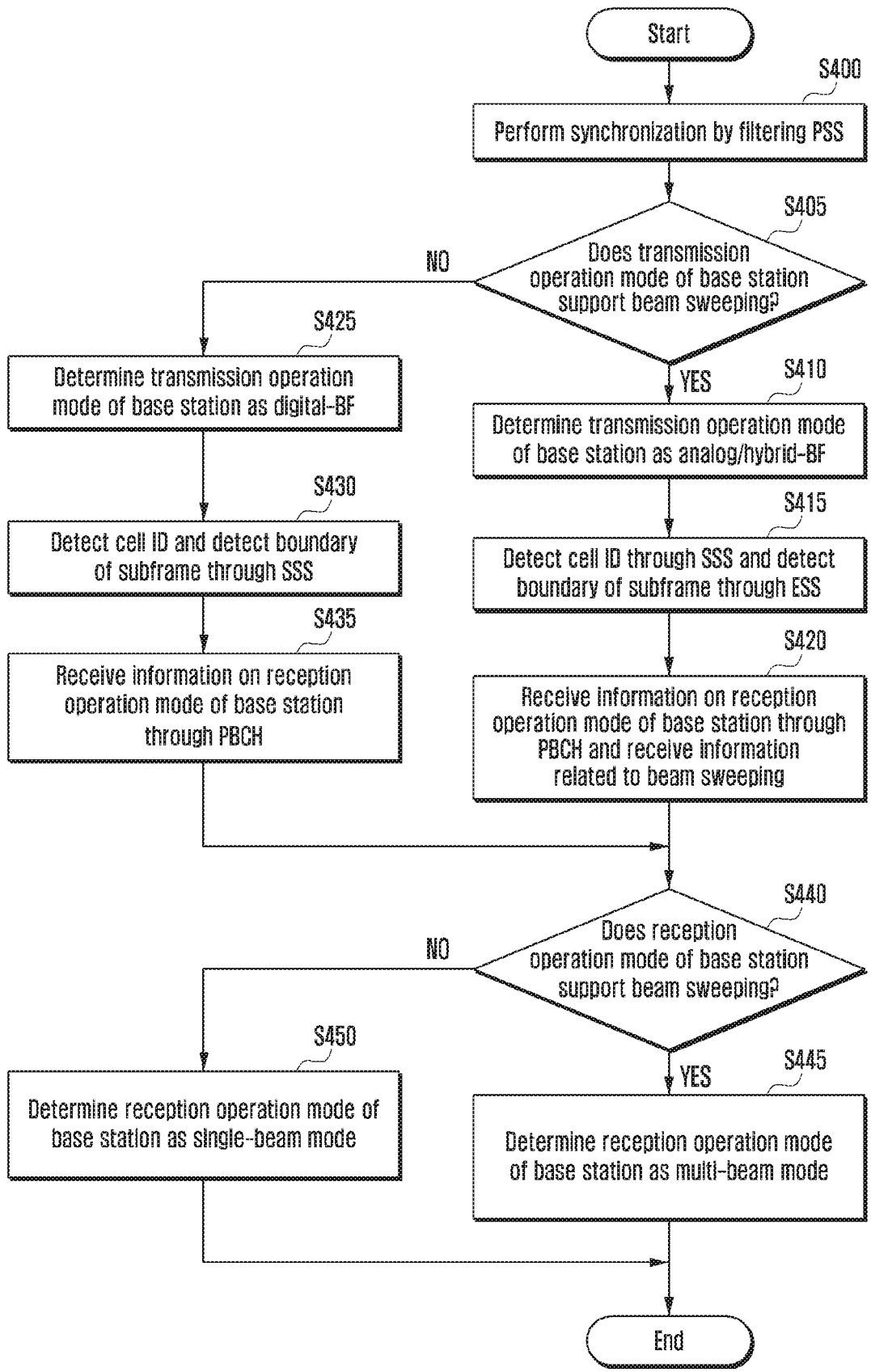
FIG. 4 illustrates a method of determining, by a terminal, a transmission operation mode and a reception operation mode of the base station according to an embodiment of the present disclosure.

As shown in FIG. 4, the terminal may determine a center frequency through a channel raster and the DL/UL frame structure depending on whether the single-beam based approach or the multi-beam based approach is used through an identifier, thereby determining an operation of the base station/terminal.

Figure 2A:
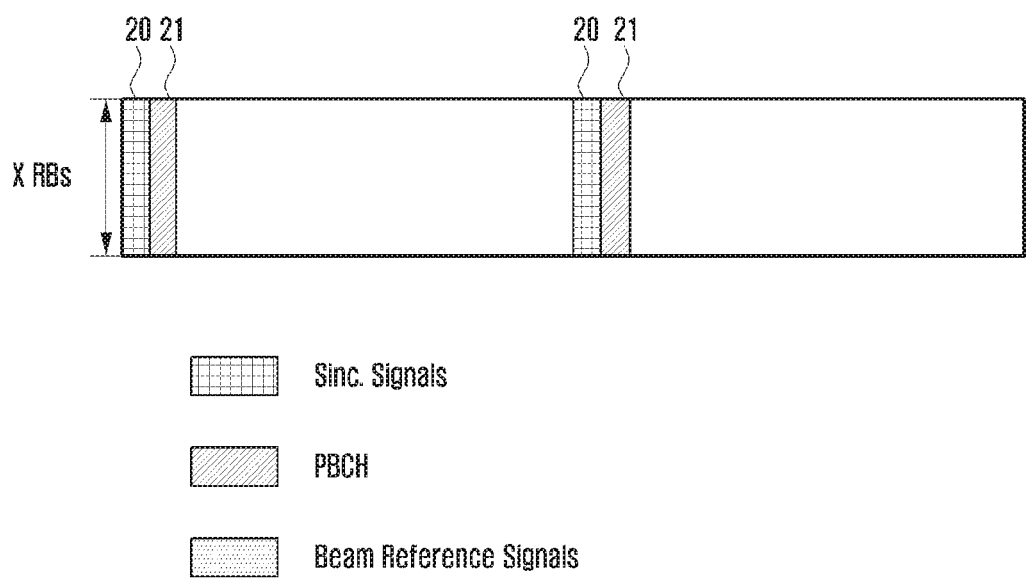
FIGS. 2A and 2B illustrate examples of indicating whether a base station supports beam sweeping, using different downlink (DL) frame structures according to an embodiment of the present disclosure.
Figure 2B:
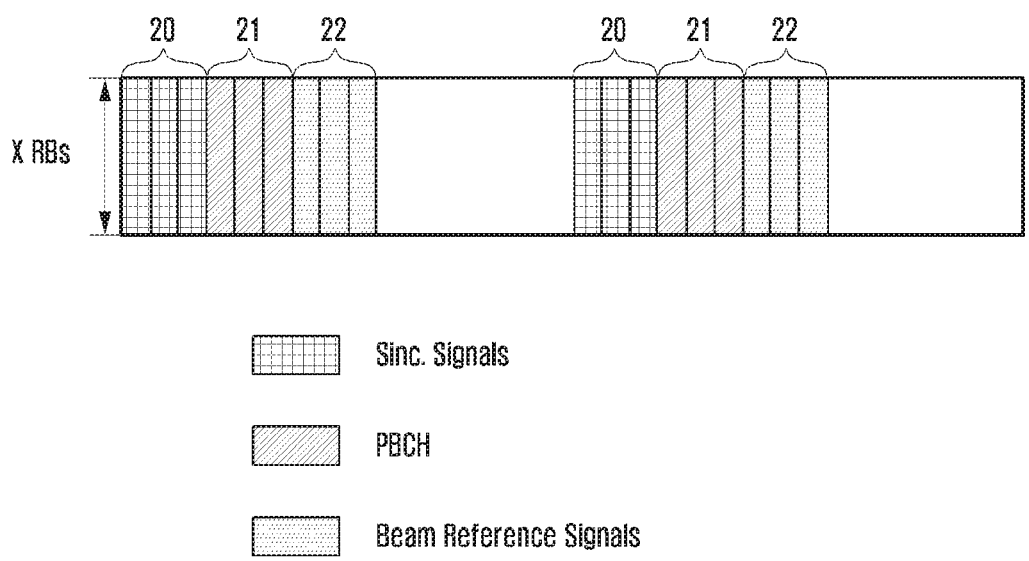

Meanwhile, FIGS. 2A and 2B illustrate example of indicating whether a base station supports beam sweeping, using different DL frame structures.

For example, FIG. 2A illustrates an example frame structure of a signal transmitted by the base station that does not support beam sweeping, and FIG. 2B is a diagram illustrating a frame structure of a signal transmitted by the base station that supports beam sweeping.

Therefore, the terminal that receives a downlink signal with the DL frame structure illustrated in FIG. 2A may perform communication with the base station based on a scheme of not supporting the beam sweeping.

Further, the terminal that receives a downlink signal with the DL frame structure illustrated in FIG. 2B may perform communication with the base station based on a scheme in which the beam sweeping is supported.

In FIGS. 2A and 2B, reference numeral 20 may represent a synchronization signal, reference numeral 21 may represent a physical broadcast channel (PBCH), and reference numeral 22 may represent a beam reference signal.

In FIG. 2B, a duration in which transmission of the synchronization signal 20 continues may mean a beam sweeping duration.

Hereinafter, a method of indicating an operation mode will be described in detail by dividing a case in which the base station supports beam sweeping and a case in which the base station does not support beam sweeping.

Base station operation mode indication may mean that the base station informs the terminal whether or not the base station supports single-beam or multi-beam based signal transmission/reception, or may mean that the base station informs the terminal of a DL and UL frame structure type. Based on Tables 1 to 3 above, the DL/UL frame structure may be different with respect to the single-beam and the multi-beam depending on the operating frequency of the base station/terminal.

In the LTE/LTE-A system, the base station differently indicates the frame structure type for the terminal, for example, the base station differently indicates the frame structure type depending on a system duplexing type such as frequency division duplex (FDD) or time division duplex (TDD).

The DL and UL frame structure type is designated according to the base station operation mode indication, thereby determining a subsequent operation of the terminal. For example, if the operation mode of the base station at the time of transmission is a single-beam mode, the base station may not transmit the BRS.

Meanwhile, random access channel (RACH) configuration may be changed depending on a reception mode of the base station. For example, if the reception mode of the base station is a multi-beam mode, beam sweeping needs to be performed at the time of receiving a random access signal transmitted from the terminal. Accordingly, the base station may inform the terminal of information on a reception beam number for each symbol in the RACH. On the other hand, if the reception mode of the base station is the single-beam mode, the RACH may be transmitted in the same manner as LTE.

In the following embodiments, a single-beam base station operation mode is described, but this may be interpreted identically to the DL/UL frame type indication. For example, defining the base station transmission and reception structure as the single-beam structure when beamforming approach=0 means that DL/UL frame type=0.

Since it is generally difficult to secure coverage of the uplink as compared to the downlink, it may be assumed that if the operation mode of the base station at the time of signal transmission is the multi-beam mode, the multi-beam mode is performed even at the time of signal reception. Alternatively, it may be assumed that if the operation mode of the base station at the time of signal transmission is the single-beam mode, the single-beam mode is performed even at the time of signal reception. However, this is merely an example, thus communication may also be performed based on the multi-beam mode at the time of signal reception even though the operation mode of the base station at the time of signal transmission is the single-beam mode.

According to an embodiment of the present disclosure, the base station may transmit a different primary synchronization signal (PSS) depending on a transmission operation mode.

Figure 3A:
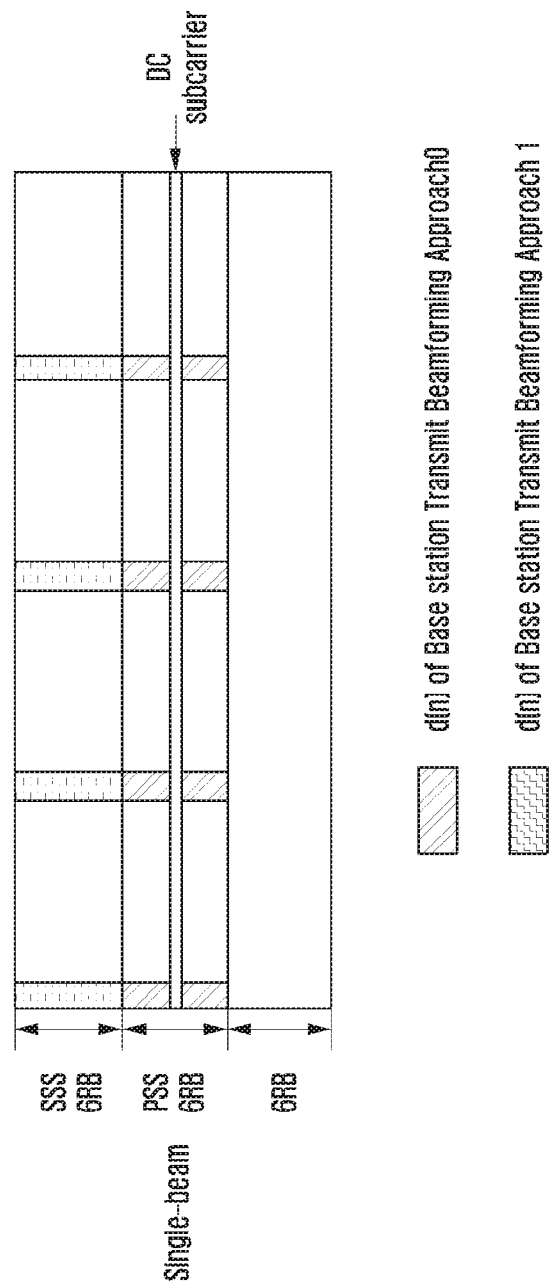
FIGS. 3A to 3C illustrate examples transmission structure of a synchronization signal according to an embodiment of the present disclosure in a case in which the base station does not support beam sweeping or in a case in which the base station supports beam sweeping.
Figure 3B:
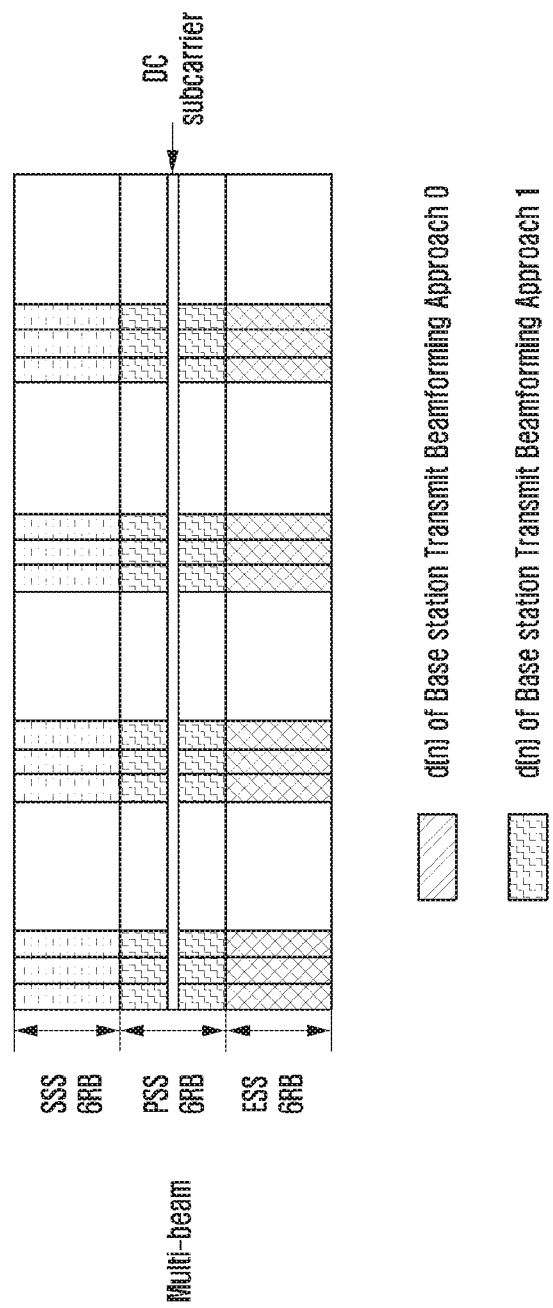

Specifically, FIG. 3A illustrates an example transmission structure of a synchronization signal if the base station does not support beam sweeping, and FIG. 3B is a diagram illustrating a transmission structure of a synchronization signal if the base station supports beam sweeping.

As illustrated in FIGS. 3A and 3B, the base station may transmit a different PSS sequence depending on the transmission scheme (whether or not the beam sweeping is supported).

The PSS may be a synchronization signal used for orthogonal frequency division multiplexing (OFDM) symbol synchronization or slot synchronization. A sequence used for the PSS transmission may be generated from Zadoff-Chu (ZC) sequence at a frequency domain.

If the sequence used for the PSS transmission is indicated as d(n), the sequence is as the following equation 1.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{equation (1)}$$

u in Equation 1 represents a Zadoff-Chu root sequence index, and may be defined as shown in Table 5 below.

TABLE 5

| | $N_{ID}^{(2)}$ | Root index u |
|---|---|---|
| Base Station Transmit Beamforming Approach 0 | 0 | A-1 |
| | 1 | A-2 |
| | 2 | A-3 |
| Base Station Transmit Beamforming Approach 1 | 0 | B-1 |
| | 1 | B-2 |
| | 2 | B-3 |

The base station transmit beamforming approach 0 in Table 5 may be defined as a multi-beam transmission operation mode of the base station.

Further, the base station transmit beamforming approach 1 may be defined as a single-beam transmission operation mode of the base station.

However, this is merely an example, thus the base station transmit beamforming approach 0 may also be defined as a single-beam operation mode, and the base station transmit beamforming approach 1 may also be defined as a multi-beam operation mode.

A-1, A-2, A-3, B-1, B-2, and B-3 are integers, and may be selected as indices for sequences having a predetermined level or more of autocorrelation and cross correlation property. Further, may mean physical layer identity.

FIGS. 3A and 3B illustrate examples in which it is assumed that the PSS and a secondary synchronization signal (SSS) are subject to frequency division multiplexing (FDM).

A sequence length of the PSS and the SSS may be 62 subcarriers, and five subcarriers at both ends of the sequence may be zero padded.

An extended synchronization signal (ESS) is a signal transmitted by the terminal to find out where a starting point and an end point of a subframe are. Unlike the single-beam mode, in the case of the multi-beam mode, since the beam sweeping is performed, it is not possible to find out a boundary of the subframe with synchronization using the PSS and the SSS. Thus, the ESS may be used to determine the boundary of the subframe by informing which beam is detected by the terminal (from which symbol the beam is transmitted) using different sequences for each OFDM symbol (or in a form in which the same sequence is cyclically generated for each OFDM symbol).

The terminal that receives the signal according to the frame structure as illustrated in FIG. 3A or 3B may find out the base station transmit beamforming approach. If the terminal detects that the base station does not support beam sweeping according to the frame structure as illustrated in FIG. 3A, the terminal may perform communication with the base station based on a scheme of not supporting the beam sweeping. For example, the terminal may perform communication according to the single-beam mode.

Alternatively, if the terminal detects that the base station supports beam sweeping according to the frame structure as illustrated in FIG. 3B, the terminal may perform communication with the base station based on a scheme of supporting the beam sweeping. For example, the terminal may perform communication according to the multi-beam mode.

A method of determining, by the terminal, whether the base station supports beam sweeping will be described in detail. The terminal may determine correlations using sequences each representing the single-beam mode and the multi-beam mode during a process of receiving the PSS. The terminal may determine whether the sequence of the received PSS is a sequence representing the single-beam mode, or the sequence representing the multi-beam operation mode depending on the determined correlation.

Alternatively, the terminal may determine correlation using one type of sequence for a predetermined time when receiving the PSS. If the correlation is successful, the single-beam mode or the multi-beam mode may be determined by the scheme of using the one type of sequence.

Specifically, the terminal may determine that the base station that transmits the PSS supports the single-beam mode if correlation is determined using a sequence representing the single-beam mode and is successful with respect to the received PSS sequence. Meanwhile, if the correlation is unsuccessful, the terminal may determine that the base station that transmits the PSS supports the multi-beam mode.

Further, according to another embodiment of the present disclosure, the terminal may determine that the base station that transmits the PSS supports the multi-beam mode if correlation is determined using a sequence representing the multi-beam mode and is successful with respect to the received PSS sequence. Meanwhile, if the correlation is unsuccessful, the terminal may determine that the base station that transmits the PSS supports the single-beam mode.

Further, according to another embodiment of the present disclosure, the terminal may determine that the base station that transmits the PSS supports the single-beam mode if correlation is determined using a sequence representing the single-beam mode and is successful with respect to the received PSS sequence. Meanwhile, if the correlation is unsuccessful, the terminal may not immediately determine that the base station that transmits the PSS supports the multi-beam mode, but may determine whether correlation determined using a sequence representing the multi-beam mode is successful. If the correlation is successful, the terminal may determine that the base station that transmits the PSS supports the multi-beam mode.

The terminal that determines the transmission mode of the base station by the method described above may receive a signal from the base station by the determined mode.

Meanwhile, the base station may indicate a reception mode thereof to the terminal through the PBCH. For example, the base station may transfer the reception operation mode of the base station by using a master information block (MIB) transferred through the PBCH.

Specifically, the base station may indicate whether the base station supports beam sweeping in the reception mode using information of 1 bit in the MIB. For example, the information of 1 bit that is inserted by the base station into the MIB may be defined through "base station receive beamforming approach".

The information indicated through the "base station receive beamforming approach" may be as in the following Table 6 or 7.

TABLE 6

| 0 | Multi-beam Base Station Receive BF Approach |
| 1 | Single-beam Base Station Receive BF Approach |

TABLE 7

| 0 | Identical to Base Station Transmit BF Approach |
| 1 | Different from Base Station Receive BF Approach |

As shown in Table 6 above, the terminal may determine the reception operation mode depending on whether the "base station receive BF approach" is "0" or "1". Alternatively, as shown in Table 7, the terminal may determine whether the reception operation mode of the base station is the same as the transmission operation mode of the base station or different from the transmission operation mode of the base station depending on whether the "base station receive BF approach" is "0" or "1".

As described above with reference to FIGS. 3A and 3B, the method of determining, by the terminal, the transmission and reception operation modes of the base station may be summarized as shown in the flow chart of FIG. 4. First, in step S400, the terminal may perform synchronization by filtering the PSS. Specifically, the terminal may filter a frequency band in which the PSS is transmitted to perform rapid and clear initial synchronization from a time axis signal. For example, the terminal may capture some frequency band of the received signal, and confirm the signal received through the frequency band. Therefore, the terminal may capture a band corresponding to 6 RBs of the center in which the PSS is received. Further, the terminal may perform synchronization by extracting the PSS.

In step S405, the terminal may determine whether the transmission operation mode of the base station supports beam sweeping. For example, the base station may transmit a different PSS sequence to the terminal depending on the transmission operation mode. The terminal may determine the PSS sequence to determine whether transmission operation mode of the base station is the multi-beam mode which supports beam sweeping, or the single-beam mode which does not support beam sweeping.

If the transmission operation mode of the base station supports beam sweeping, in step S410, the terminal may determine the transmission operation mode of the base station as the multi-beam mode. Further, in step S415, the terminal may detect a cell ID through an SSS, and detect a boundary of the subframe through an ESS.

Further, in step S420, the terminal may receive information on the reception operation mode of the base station and information related to the beam sweeping through the PBCH. For example, the terminal may receive information on whether the reception operation mode of the base station is the single-beam mode or the multi-beam mode through the PBCH. Further, since the transmission operation mode of the base station is the multi-beam mode, the terminal may receive information related to the beam sweeping such as information related to a beam sweeping period through the PBCH.

Meanwhile, if the transmission operation mode of the base station does not support beam sweeping, in step S425, the terminal may determine that the transmission operation mode of the base station as the single-beam mode. Further, in step S430, the terminal may detect a cell ID and a boundary of the subframe through the SSS. Further, in step S435, the terminal may receive information on the reception operation mode of the base station through the PBCH. For example, the terminal may receive the MIB through the PBCH. Further, the terminal may determine whether the base station supports beam sweeping in the reception mode by checking information of 1 bit included in the MIB.

In step S440, the terminal may determine whether the reception operation mode of the base station supports beam sweeping based on the information included in the MIB.

As the determination result, if it is determined that the reception operation mode of the base station supports beam sweeping, in step S445, the terminal may determine the reception operation mode of the base station as the multi-beam mode.

On the other hand, if it is determined that the reception operation mode of the base station does not support beam sweeping, in step S450, the terminal may determine the reception operation mode of the base station as the single-beam mode.

Meanwhile, determining, by the terminal, the transmission operation mode of the base station through the PSS sequence and the reception operation mode of the base station through the PBCH as described above is merely an example. According to still another embodiment of the present disclosure, the terminal may also determine the reception operation mode of the base station through the PSS sequence and the transmission operation mode of the base station through the PBCH.

In some embodiments, the PSS and the SSS that are the reference signals for indicating the transmission operation mode of the base station are not necessarily subject to beam sweeping. Accordingly, with respect to the PSS and the SSS illustrated in FIGS. 3A and 3B, the base station may transmit the signals with the single-beam structure. For example, the base station may transmit the PSS and the SSS in a static beam direction through analog-beam forming without beam sweeping.

Figure 3C:
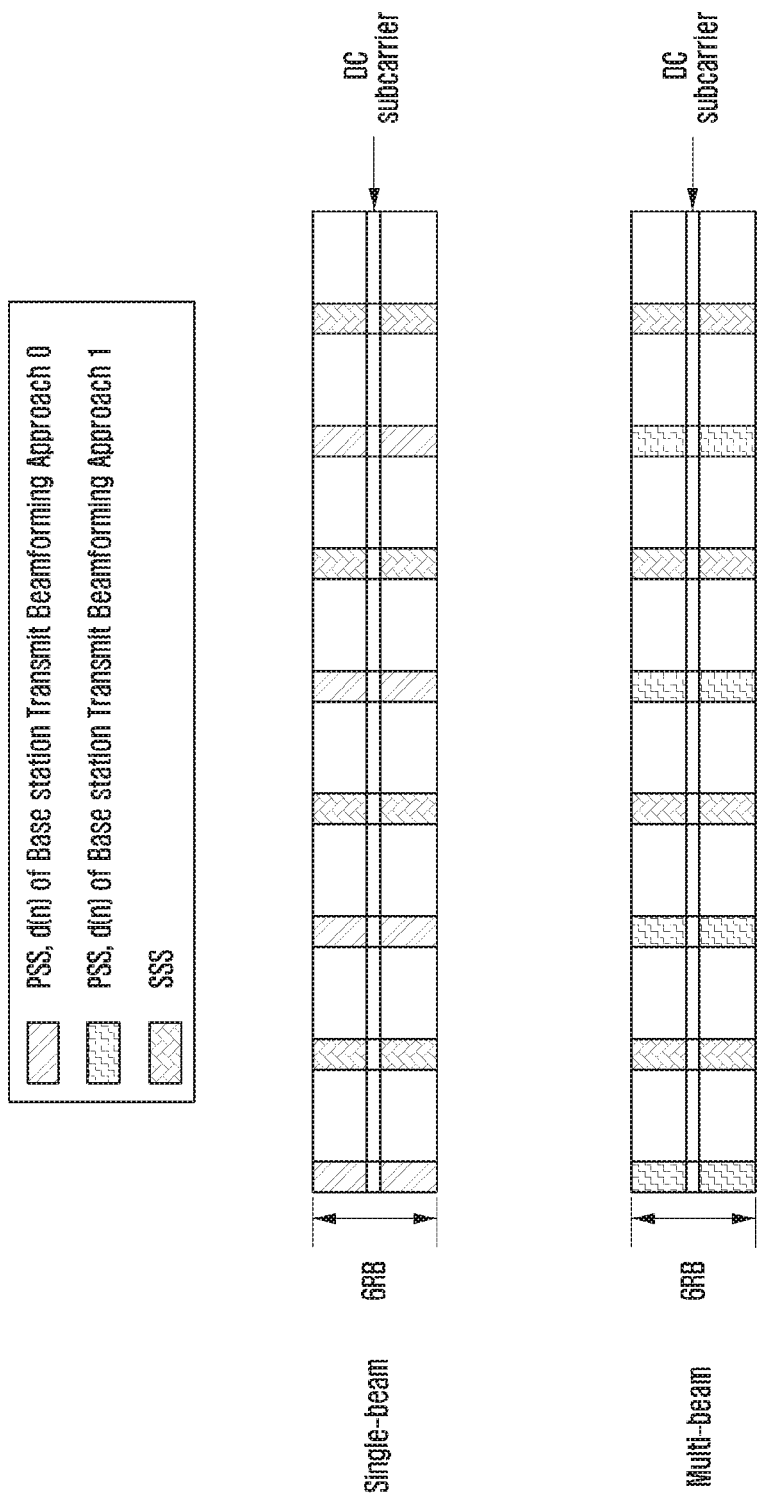

Alternatively, according to still another embodiment of the present disclosure, the base station may transmit a synchronization signal according to the DL frame structure having a structure as illustrated in FIG. 3C. If the DL frame structure as illustrated in FIG. 3C is used, the terminal may clearly determine a timing (e.g. a starting point of a subframe or a slot) of the PSS and the SSS. Therefore, the base station may not transmit the ESS. The PSS and the SSS illustrated in FIG. 3C may not be necessarily subject to beam sweeping. Therefore, when the base station transmits a synchronization signal according to FIG. 3C, the signal may be transmitted with the single-beam structure.

The frame structure type according to the embodiment of the present disclosure may also be defined as below.

Three radio frame structures may be supported. In one example of Type 1, the radio frame structure is used in the case of multi-beam base station transmit and receive beamforming approach. In another example of Type 2, the radio frame structure is used in the case of single-beam base station transmit and receive beamforming approach. In yet another example of Type 3, the radio frame structure is used in the case of simultaneously utilizing single-beam base station transmit and receive beamforming approach and multi-beam base station transmit and receive beamforming approach In some embodiments, in a case in which the transmission operation mode and the reception operation mode of the base station are determined to be the same as each other, a sequence d(n) used for the PSS transmission of the base station may be the same as equation 1, but a Zadoff-Chu (ZC) root sequence index u may be defined as in the following Table 8.

TABLE 8

|  | $N_{ID}^{(2)}$ | Root index u |
| --- | --- | --- |
| Base Station Transmit/Receive Beamforming Approach 0 | 0 | A-1 |
|  | 1 | A-2 |
|  | 2 | A-3 |
| Base Station Transmit/Receive Beamforming Approach 1 | 0 | B-1 |
|  | 1 | B-2 |
|  | 2 | B-3 |

In Table 8 above, "base station transmit/receive beamforming approach 0" means a case in which the transmission/reception operation mode of the base station is the multi-beam mode, and thus the base station supports beam sweeping. Further, "base station transmit/receive beamforming approach 1" means a case in which the transmission/reception operation mode of the base station is the single-beam mode, and thus the base station does not support beam sweeping. Further, may mean physical layer identity.

Figure 5A:
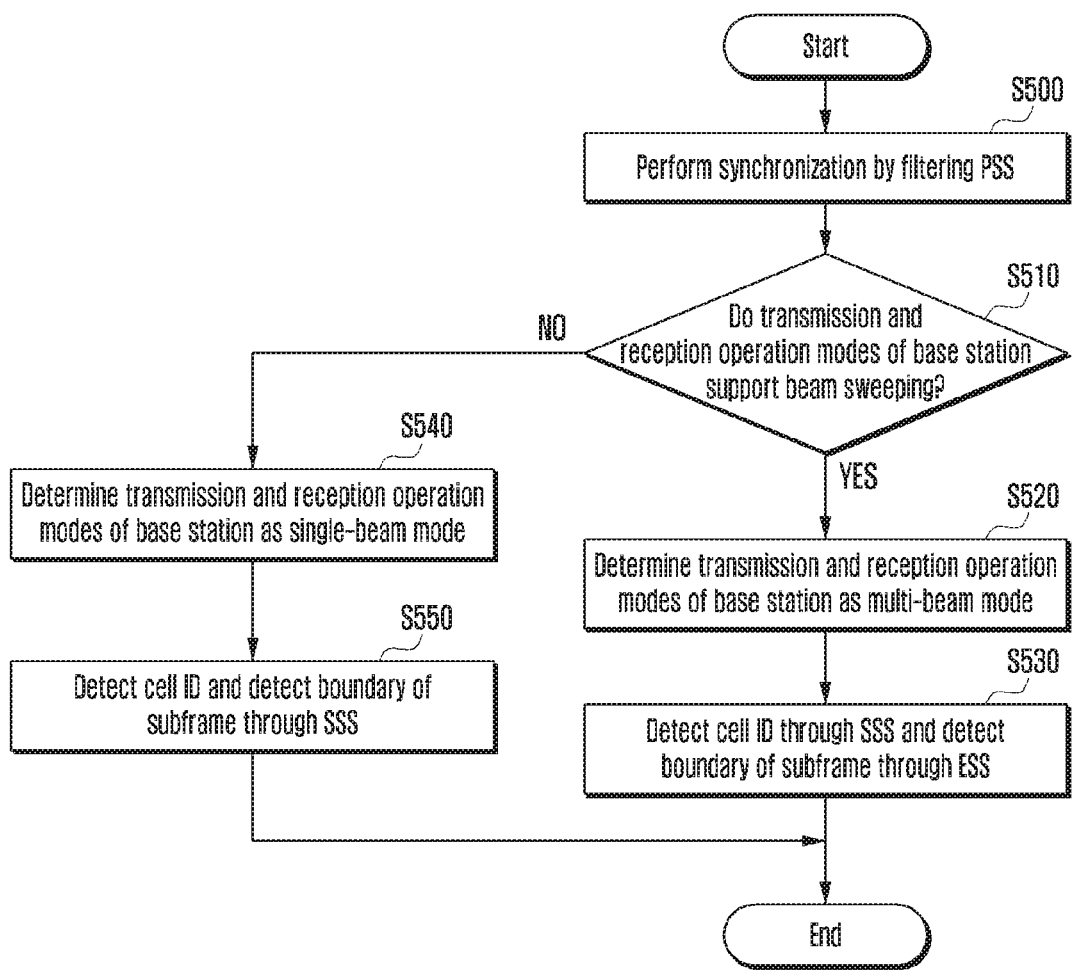
FIGS. 5A and 5B illustrate methods of determining, by the terminal, a transmission operation mode and a reception operation mode of the base station using a PSS sequence according to an embodiment of the present disclosure.

FIG. 5A illustrates a method of determining, by the terminal, a transmission operation mode and a reception operation mode of the base station using a PSS sequence according to an embodiment of the present disclosure.

First, in step S500, the terminal may perform synchronization by filtering the PSS. Further, in step S510, the terminal may determine whether the transmission and reception operation modes of the base station support beam sweeping.

For example, the base station may transmit a different PSS sequence to the terminal depending on the transmission and reception operation modes. The terminal may determine the PSS sequence to determine whether transmission operation mode of the base station is the multi-beam mode which supports beam sweeping, or the single-beam mode which does not support beam sweeping.

As the determination result, if the transmission and reception operation modes of the base station support beam sweeping, in step S520, the terminal may determine the transmission and reception operation modes of the base station as the multi-beam mode. Further, in step S530, the terminal may detect a cell ID through an SSS, and detect a boundary of the subframe through an ESS.

Meanwhile, if the transmission and reception operation modes of the base station do not support beam sweeping, in step S540, the terminal may determine that the transmission and reception operation modes of the base station as the single-beam mode. Further, in step S550, the terminal may detect a cell ID and a boundary of the subframe through the SSS.

According to the embodiment as described above, the base station differently transmits the PSS sequence to the terminal to indicate whether at least one of the transmission operation mode and the reception operation mode supports beam sweeping.

Figure 6A:
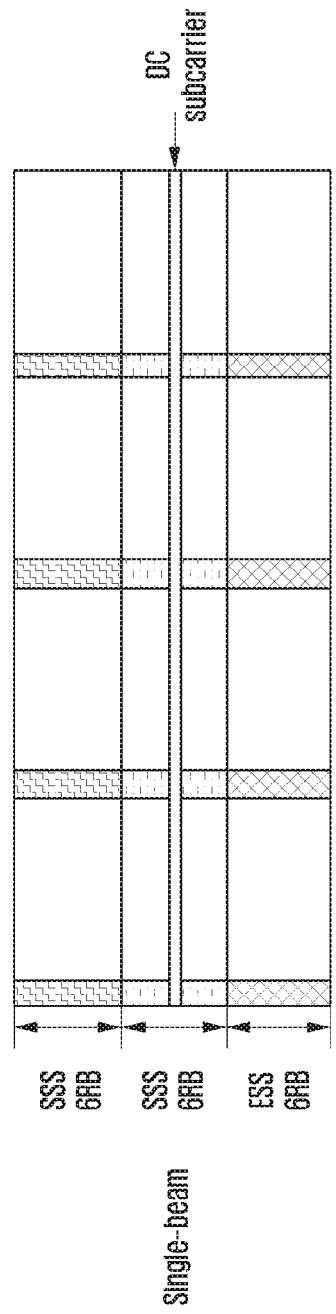
Figure 6B:
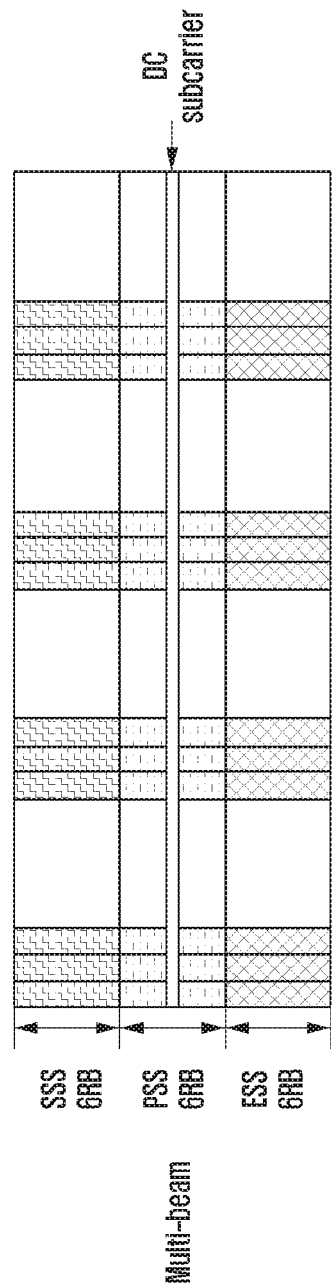

In some embodiments, the base station transmit/receive beamforming approach indication is possible through the ESS. At this point, the frame structures according to the single-beam operation and the multi-beam operation are as shown in FIGS. 6A and 6B, respectively. However, a sequence of the ESS transmitted at the time of the single-beam operation and a sequence of the ESS transmitted at the time of the multi-beam operation may be differently used. As a value of the ESS configuring each OFDM at the time of the multi-beam operation, one sequence may be cyclically configured and used.

Figure 5B:
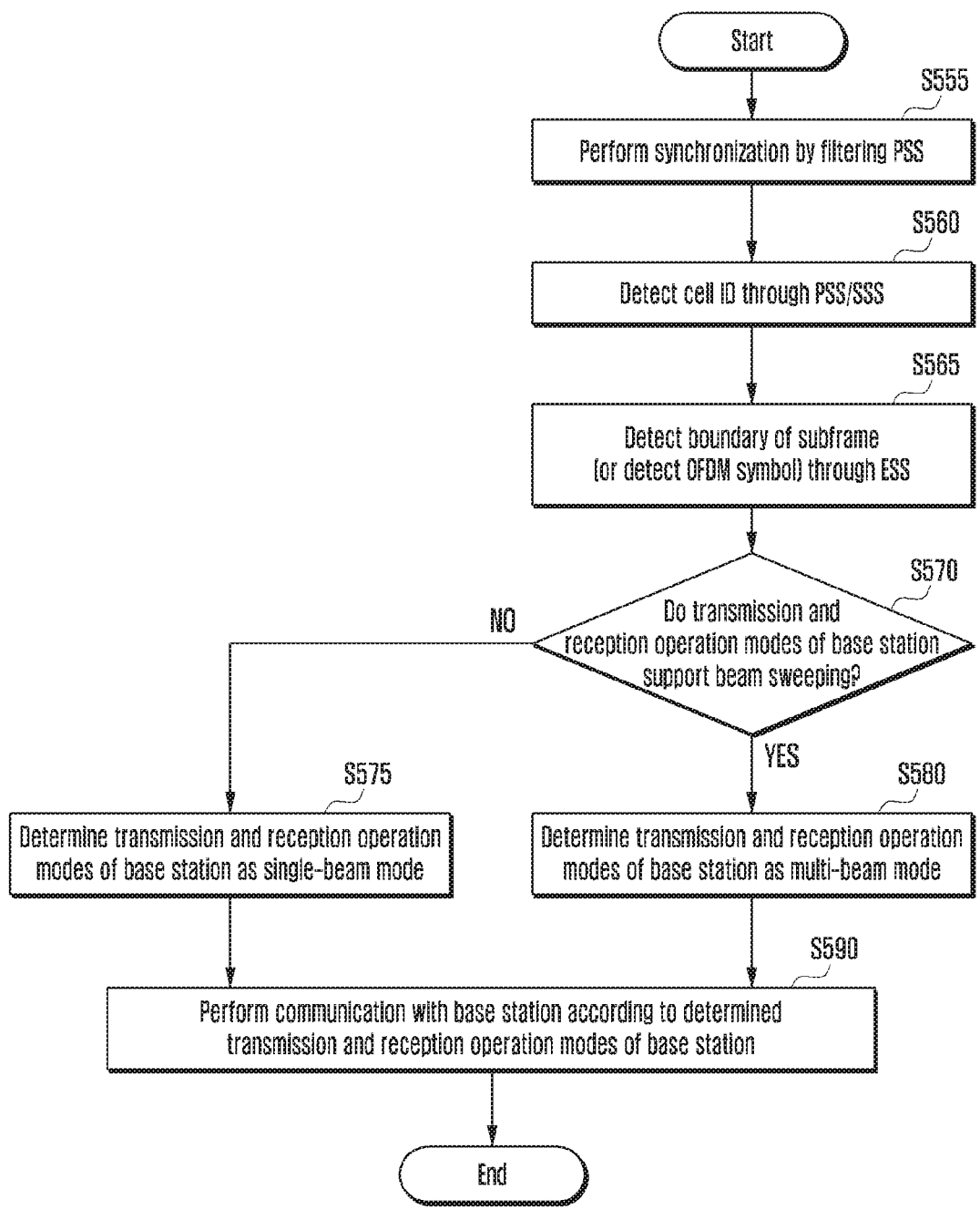

An operation of the base station/terminal according to the aforementioned embodiments illustrated in FIG. 5B. First, in step S555, the terminal may perform synchronization by filtering the PSS. Specifically, the terminal may filter a frequency band in which the PSS is transmitted to perform rapid and clear initial synchronization from a time axis signal. For example, the terminal may capture some frequency band of the received signal, and confirm the signal received through the frequency band. Therefore, the terminal may capture a band corresponding to 6 RBs of the center in which the PSS is received. Further, the terminal may perform synchronization by extracting the PSS.

Further, in step S560, the terminal may detect a cell ID through PSS/SSS, and in step S565, the terminal may detect a boundary of the subframe through an ESS. Alternatively, the terminal may also detect an OFDM symbol.

Further, in step S570, the terminal may determine whether the transmission operation modes of the base station support beam sweeping. For example, the base station may transmit a different ESS sequence to the terminal depending on the transmission operation mode. The terminal may determine the ESS sequence to determine whether transmission operation mode of the base station is the multi-beam mode which supports beam sweeping, or the single-beam mode which does not support beam sweeping.

If the transmission operation mode of the base station does not support beam sweeping, in step S575, the terminal may determine that the transmission operation mode of the base station as the single-beam mode.

Alternatively, if the transmission operation mode of the base station supports beam sweeping, in step S580, the terminal may determine the transmission operation mode of the base station as the multi-beam mode.

Further, in step S585, the terminal may perform communication with the base station according to the determined transmission and reception operation modes of the base station.

In some embodiments, the base station may also transmit the transmission and reception operation modes that indicate whether the beam sweeping is supported to the terminal through the PBCH. For example, the base station may indicate the transmission and reception operation modes of the base station by using 2 bits in the MIB transferred through the PBCH.

Specifically, the base station may indicate whether the base station supports beam sweeping at the time of transmission and reception by the base station using information of 2 bits in the MIB. For example, the information of 2 bit that is inserted by the base station into the MIB may be defined through "base station transmit and receive beamforming approach".

The information indicated through the "base station transmit and receive beamforming approach" may be as in the following Table 9.

TABLE 9

| | |
|---|---|
| 00 | Multi-beam Base Station Transmit and Receive BF Approach Indication |
| 01 | Single-beam Base Station Transmit BF Approach Indication and Multi-beam Base Station Receive BF Approach Indication |
| 10 | Single-beam Base Station Transmit and Receive BF Approach Indication |

Specifically, the base station may express a value of the "base station transmit and receive BF approach" as "00", "01", or "10" and transmit the value to the terminal through the PBCH. Table 9 above is an example, and if the value of the "base station transmit and receive BF approach" is "00", the terminal may determine the transmission and reception operation modes of the base station as the multi-beam mode.

Alternatively, if the value of the "base station transmit and receive BF approach" is "01", the terminal may determine the transmission operation mode of the base station as the single-beam mode, and determine the reception operation mode of the base station as the multi-beam mode.

Further, if the value of the "base station transmit and receive BF approach" is "10", the terminal may determine the transmission and reception operation modes of the base station as the single-beam mode.

However, Table 9 above is merely an example, and if the value of the "base station transmit and receive BF approach" is "01", the terminal may also determine the reception operation mode of the base station as the single-beam mode, and determine the transmission operation mode of the base station as the multi-beam mode. Alternatively, if a value of the "base station transmit and receive BF approach" is "01", the terminal may simply determine that the transmission operation mode and the reception operation mode of the base station is different from each other, and use other information (for example, the PSS sequence as described in Embodiment 1-1) to determine the specific transmission operation mode and reception operation mode of the base station. Further, in addition to the value shown in Table 9, another value for indicating a case in which the transmission operation mode and the reception operation mode of the base station are different from each other may exist (e.g. 11).

FIGS. 6A to 6C illustrate example downlink frame structure of transmission by the base station to the terminal according to the above-described embodiment of the present disclosure.

Since the base station may indicate whether the base station supports beam sweeping through the PBCH as described above, the sequence of the PSS or the SSS is not changed depending on whether the base station supports beam sweeping.

However, as illustrated in FIG. 6B, if the base station supports beam sweeping, the base station may transmit a synchronization signal through a plurality of symbols for a time required to cover a cell.

Figure 7:
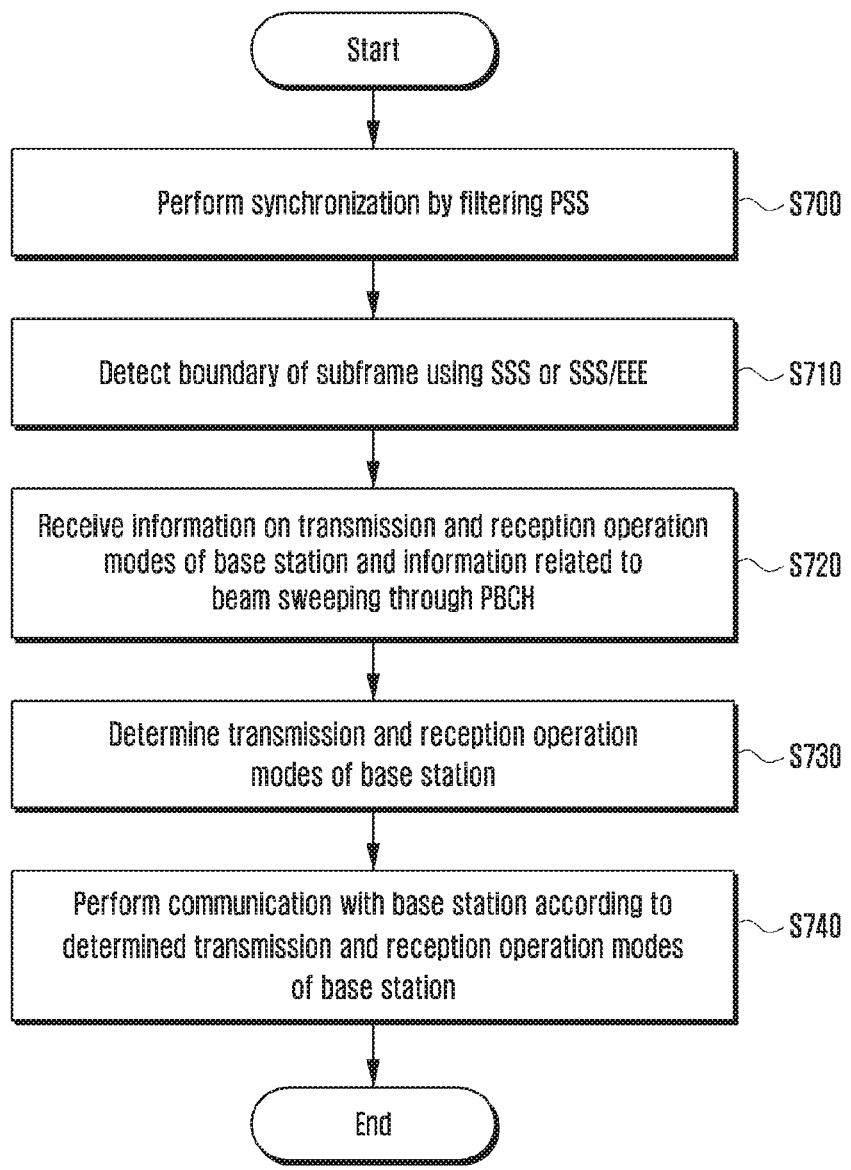
FIG. 7 illustrates a method of determining, by the terminal, a transmission operation mode and a reception operation mode of the base station according to an embodiment of the present disclosure.

As described above with reference to FIGS. 6A and 6B, the method of determining, by the terminal, the transmission and reception operation modes of the base station may be summarized as shown in the flow chart of FIG. 7.

First, in step S700, the terminal may perform synchronization by filtering the PSS. Further, in step S710, the terminal may detect a boundary of the subframe using the SSS or the SSS/ESS.

For example, when receiving the synchronization signal according to the frame structure as illustrated in FIG. 6A, the terminal may detect the boundary of the subframe using the SSS. Alternatively, when receiving the synchronization signal according to the frame structure as illustrated in FIG. 6B, the terminal may detect the boundary of the subframe using the SSS/ESS.

In step S720, the terminal may receive information on the transmission and reception operation modes of the base station and information related to the beam sweeping through the PBCH. Further, in step S730, the terminal may determine the transmission and reception operation modes of the base station. For example, the terminal may determine the transmission and reception operation modes of the base station by using 2 bits in the MIB received through the PBCH.

In step S740, the terminal may perform communication with the base station according to the determined transmission and reception operation modes of the base station. For example, the terminal may perform communication with the base station according to the multi-beam mode if it is determined that the transmission and reception operation modes of the base station support beam sweeping. Alternatively, the terminal may also perform communication with the base station according to the single-beam mode if it is determined that the transmission and reception operation modes of the base station do not support beam sweeping. Meanwhile, if it is determined that the transmission operation mode and the reception operation mode of the base station are different from each other, the terminal may perform communication with the base station according to the multi-beam mode or the single-beam mode according to the determination result.

In some embodiments, the PSS and the SSS that are the reference signals for indicating the transmission operation mode of the base station are not necessarily subject to beam sweeping. Accordingly, with respect to the PSS and the SSS illustrated in FIGS. 6A and 6B, the base station may transmit the signals with the single-beam structure. For example, the base station may transmit the PSS and the SSS in a static beam direction through analog-beam forming without beam sweeping.

Alternatively, according to still another embodiment of the present disclosure, the base station may transmit a synchronization signal according to the DL frame structure having a structure as illustrated in FIG. 6C. If the DL frame structure as illustrated in FIG. 6C is used, the terminal may clearly determine a timing (e.g. a starting point of a subframe or a slot) of the PSS and the SSS. Therefore, the base station may not transmit the ESS. The PSS and the SSS illustrated in FIG. 6C may not be necessarily subject to beam sweeping. Therefore, if the base station transmits a synchronization signal according to FIG. 6C, the signal may be transmitted with the single-beam structure.

In some embodiments, the transmission operation mode and the reception operation mode of the base station may be set to be the same as each other. At this point, the base station needs not to transmit information for the case in which the transmission operation mode and the reception operation mode are different from each other. Therefore, the base station may indicate the transmission and reception operation modes of the base station by using 1 bit in the MIB transmitted through the PBCH.

Specifically, the base station may indicate whether the base station supports beam sweeping at the time of transmission and reception by the base station using information of 1 bit in the MIB. For example, the information of 1 bit that is inserted by the base station into the MIB may be defined through "base station transmit and receive BF approach".

The information indicated through the "base station transmit and receive BF approach" may be as in the following Table 10.

TABLE 10

| | |
|---|---|
| 0 | Multi-beam Base Station Transmit and Receive BF Approach Indication |
| 1 | Single-beam Base Station Transmit and Receive BF Approach Indication |

Specifically, the base station may express a value of the "base station transmit and receive BF approach" as "0" or "1" and transmit the value to the terminal through the PBCH. Table 10 above is an example, and if the value of the "base station transmit and receive BF approach" is "0", the terminal may determine the transmission and reception operation modes of the base station as the multi-beam mode. Alternatively, if the value of the "base station transmit and receive BF approach" is "1", the terminal may determine the transmission and reception operation modes of the base station as the single-beam mode.

However, Table 10 above is merely an example, and if the value of the "base station transmit and receive BF approach" is "0", the terminal may also determine the transmission and reception operation modes of the base station as the single-beam mode, and if the value of the "base station transmit and receive BF approach" is "1", the terminal may also determine the transmission and reception operation modes of the base station as the multi-beam mode.

Even in an embodiment in which the transmission operation mode and the reception operation mode of the base station are set to be the same as each other, the DL frame structure of transmission by the base station to the terminal is as shown in FIGS. 6A and 6B.

Since the base station may indicate whether the base station supports beam sweeping through the PBCH as described above, the sequence of the PSS or the SSS is not changed depending on whether the base station supports beam sweeping.

However, as illustrated in FIG. 6B, if the base station supports beam sweeping, the base station may transmit a synchronization signal through a plurality of symbols for a time required to cover a cell.

Even in an embodiment in which the transmission operation mode and the reception operation mode of the base station are set to be the same as each other, the steps of the method of determining, by the terminal, the transmission and reception operation modes of the base station are the same as the description with reference to FIG. 7.

However, in step S702 of receiving information on the transmission and reception operation modes of the base station through the PBCH, the terminal may determine the transmission and reception operation modes of the base station through 1 bit of the MIB received through the PBCH.

Further, since the transmission operation mode and the reception operation mode of the base station are set to be the same as each other, in step S730, the terminal may determine the transmission and reception operation modes of the base station as one of the multi-beam mode in which the base station supports beam sweeping, and the single-beam mode in which the base station does not support beam sweeping.

In some embodiments, the base station may indicate the transmission or reception operation mode of the base station to the terminal by changing a position on a time axis at which the PSS and the SSS are transmitted.

In such embodiments, the PSS sequence d(n) may be mapped to a resource element according to the following equation 2.

$$a_{k,l,q} = d_u^l(n), \quad \text{equation (2)}$$
$$n = 0, \ldots, 61$$
$$k = n - 31 + \frac{N_{RB}^{DL} N_{SC}^{RB}}{2}$$

For base station transmit $$\text{BF approach } 0 \begin{cases} l = 0 \\ q = N_{SF}^{DL} - 0 \end{cases}$$

For base station transmit $$\text{BF approach } 0 \begin{cases} l = 0, 1, \ldots, 12, 13 \\ q = N_{SF}^{DL} - 1 \end{cases}$$

According to equation 2 above, the PSS may be mapped to a k-th OFDM subcarrier and a first OFDM symbol of a q-th subframe of subframes.

Meanwhile, the base station may reserve the following equation 3 for the PSS. Equation 2 below may represent a subcarrier to which the PSS sequence is not mapped. Therefore, the base station may not use information according to equation 3 below.

$$k = n - 31 + \frac{N_{RB}^{DL} N_{SC}^{RB}}{2} \quad \text{equation (3)}$$
$$n = -5, -4, \ldots, -1, 62, 63, \ldots 66$$

For base station transmit $$\text{BF approach type } 0 \begin{cases} l = 0 \\ q = N_{SF}^{DL} - 0 \end{cases}$$

For base station transmit $$\text{BF approach } 1 \begin{cases} l = 0, 1, \ldots, 12, 13 \\ q = N_{SF}^{DL} - 1 \end{cases}$$

In the aforementioned embodiments, the SSS sequence d(n) may be mapped to a resource element according to the following equation 4.

$$a_{k,l,q} = d_u^l(n), \quad \text{equation (4)}$$
$$n = 0, \ldots, 61$$
$$k = n - 31 + \frac{N_{RB}^{DL} N_{SC}^{RB}}{2}$$

For base station transmit $$\text{BF approach } 0 \begin{cases} l = 0 \\ q = N_{SF}^{DL} - 1 \end{cases}$$

For base station transmit $$\text{BF approach } 1 \begin{cases} l = 0, 1, \ldots, 12, 13 \\ q = N_{SF}^{DL} - 0 \end{cases}$$

According to equation 4 above, the SSS may be mapped to a k-th OFDM subcarrier and a first OFDM symbol of a q-th subframe of subframes.

Meanwhile, the base station may reserve the following equation 5 for the SSS. However, the base station may not use information according to equation 5 below.

$$k = n - 31 + \frac{N_{RB}^{DL} N_{SC}^{RB}}{2} \quad \text{equation (5)}$$
$$n = -5, -4, \ldots, -1, 62, 63, \ldots 66$$

For base station transmit $$\text{BF approach } 0 \begin{cases} l = 0 \\ q = N_{SF}^{DL} - 1 \end{cases}$$

For base station transmit $$\text{BF approach } 1 \begin{cases} l = 0, 1, \ldots, 12, 13 \\ q = N_{SF}^{DL} - 0 \end{cases}$$

The aforementioned embodiment shows a case in which the PSS and the SSS are transmitted through 14 OFDM symbols (=1 subframe), respectively, and may represent the total number of resource blocks (RB) used in a bandwidth supported by the base station. Further, may represent the number of subcarriers in one RB, and may represent the total number of subframes transmitted in one frame.

Further, in equations 2 to 5, the base station transmit BF approach 0 may indicate the case in which the transmission operation mode of the base station is the multi-beam mode, and the base station transmit BF approach 1 may indicate the case in which the transmission operation mode of the base station is the single-beam mode. According to another embodiment of the present disclosure, on the contrary, the base station transmit BF approach 1 may indicate the case in which the transmission operation mode of the base station is the multi-beam mode, and the base station transmit BF approach 0 may indicate the case in which the transmission operation mode of the base station is the single-beam mode. In the aforementioned embodiment, the terminal may distinguish the transmission operation mode of the base station through relative difference between a position on the time axis of the PSS and that of the SSS after reading the PSS (PSS transmission SF number−SSS transmission SF number=−1 SF or +1 SF).

Figure 8A:
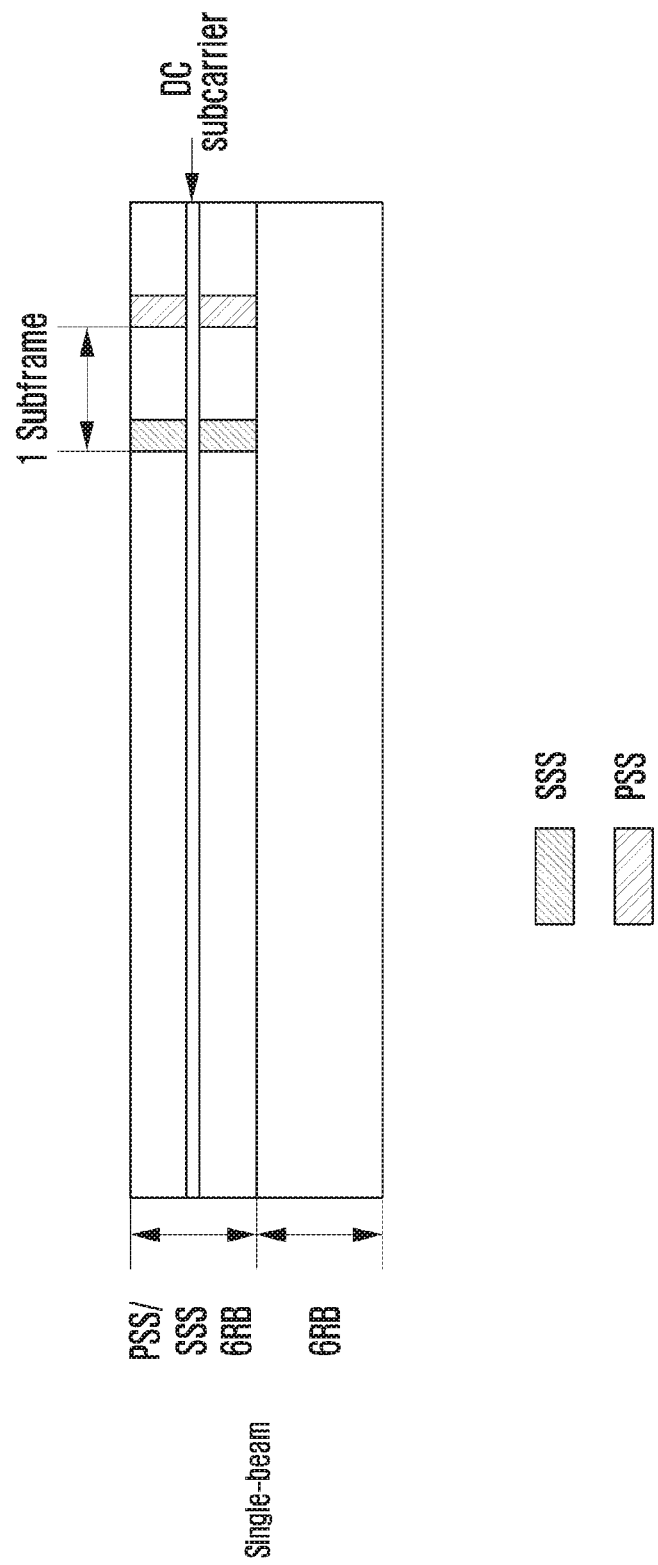
Figure 8B:
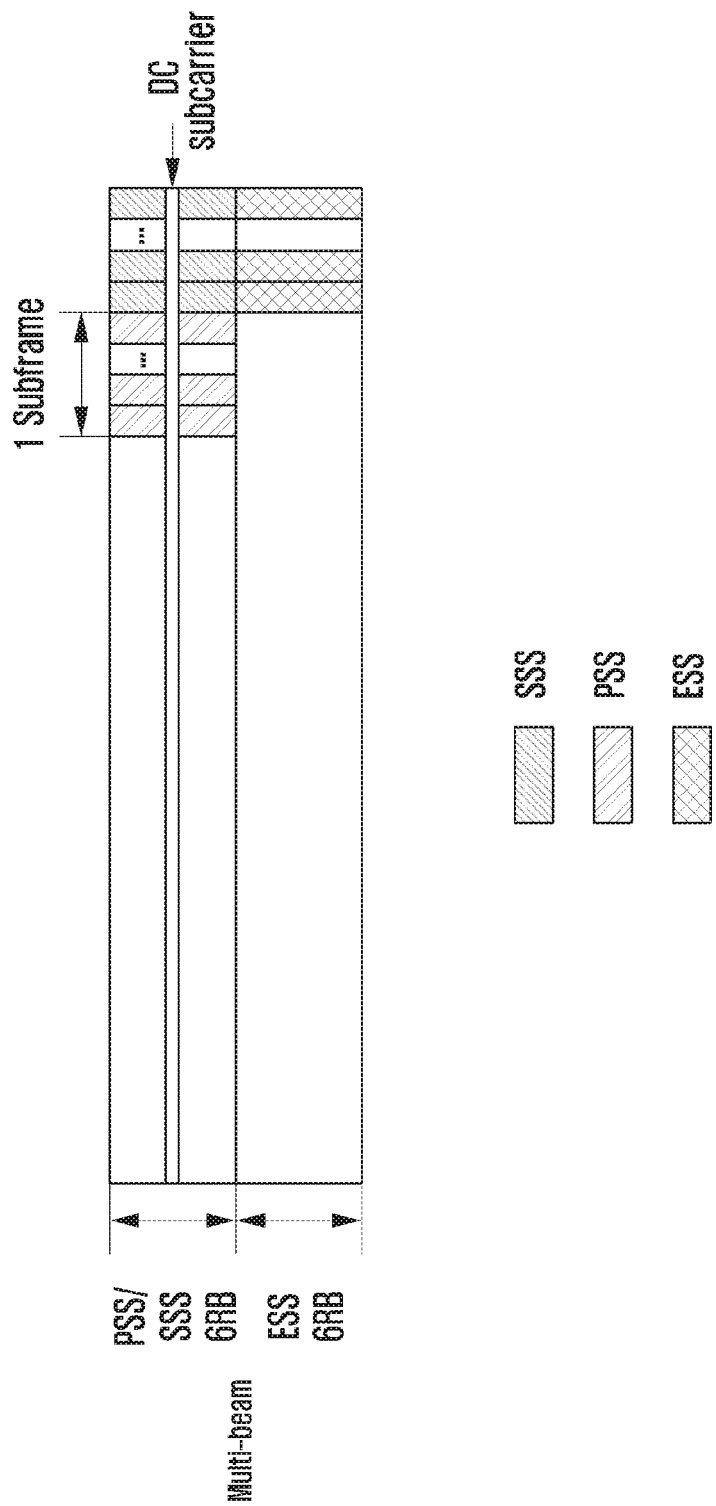

Specifically, FIG. 8A illustrates an example transmission structure of a synchronization signal if the base station does not support beam sweeping, and FIG. 8B illustrates an example transmission structure of a synchronization signal if the base station supports beam sweeping. In the embodiments illustrated in FIGS. 8A and 8B, the PSS and the SSS may be transmitted in the same frequency band (e.g. using 6 RBs of the same frequency band).

At this point, if the base station does not support beam sweeping, as illustrated in FIG. 8A, the base station may transmit the SSS prior to transmission of the PSS to indicate that the transmission operation mode of the base station is the single-beam mode.

Further, if the base station supports beam sweeping, as illustrated in FIG. 8B, the base station may transmit the PSS prior to transmission of the SSS to indicate that the transmission operation mode of the base station is the multi-beam mode.

Therefore, if the PSS is received prior to the reception of the SSS, the terminal may determine that the base station supports beam sweeping, and may perform communication with the base station based on the operation mode of supporting beam sweeping. Alternatively, if the SSS is received prior to the reception of the PSS, the terminal may determine that the base station does not support beam sweeping, and may perform communication with the base station based on the operation mode of not supporting beam sweeping.

According to still another embodiment of the present disclosure, contrary to that illustrated in FIGS. 8A and 8B, the base station may also transmit the PSS prior to the transmission of the SSS if the transmission operation mode is the single-beam mode, and transmit the SSS prior to the transmission of the PSS if the transmission operation mode is the multi-beam mode.

As described above, the base station that indicates the transmission mode of the base station by changing the position on the time axis at which the PSS and the SSS are transmitted may indicate the reception mode of the base station to the terminal through the PBCH. For example, the base station may transfer the reception operation mode of the base station by using a master information block (MIB) transferred through the PBCH.

Specifically, the base station may indicate whether the base station supports beam sweeping in the reception mode using information of 1 bit in the MIB. For example, the information of 1 bit that is inserted by the base station into the MIB may be defined through "base station receive BF approach".

The information indicated through the "base station reception BF approach" may be as in the following Table 11 or 12.

TABLE 11

| 0 | Multi-beam Base Station Receive BF Approach Indication |
| 1 | Single-beam Base Station Receive BF Approach Indication |

TABLE 12

| 0 | Identical to Base Station Transmit BF Approach |
| 1 | Different from Base Station Transmit BF Approach |

As shown in Table 11 above, the terminal may determine the reception operation mode depending on whether the "base station reception BF approach" is "0" or "1". Alternatively, as shown in Table 12, the terminal may determine whether the reception operation mode of the base station is the same as the transmission operation mode of the base station or different from the transmission operation mode of the base station depending on whether the "base station receive BF approach" is "0" or "1".

As described above with reference to FIGS. 8A and 8B, the method of determining, by the terminal, the transmission and reception operation modes of the base station may be summarized as shown in the flow chart of FIG. 9.

First, in step S900, the terminal may perform synchronization by filtering the PSS. Further, in step S905, the terminal may detect a boundary of the subframe using the SSS or the SSS/ESS.

For example, when receiving the synchronization signal according to the frame structure as illustrated in FIG. 8A, the terminal may detect the boundary of the subframe using the SSS. Alternatively, when receiving the synchronization signal according to the frame structure as illustrated in FIG. 8B, the terminal may detect the boundary of the subframe using the SSS/ESS.

In step S910, the terminal may determine whether a subframe in which the SSS precedes a subframe in which the PSS is positioned by one subframe.

As the determination result, if the subframe in which the SSS is positioned precedes the subframe in which the PSS is positioned by one subframe, in step S915, the terminal may determine the transmission operation mode of the base station as the single-beam mode.

Further, in step S920, the terminal may receive information on the reception operation mode of the base station through the PBCH. For example, the terminal may receive the MIB through the PBCH. Further, the terminal may determine whether the base station supports beam sweeping in the reception mode by checking information of 1 bit included in the MIB.

Meanwhile, as the determination result, if the subframe in which the SSS does not precede the subframe in which the PSS is positioned by one subframe, in step S925, the terminal may determine the transmission operation mode of the base station as the multi-beam mode.

Further, in step S930, the terminal may receive information on the reception operation mode of the base station and information related to the beam sweeping through the PBCH.

In step S440, the terminal that receives information on the reception operation mode of the base station through the PBCH may determine whether the reception operation mode of the base station supports beam sweeping.

As the determination result, if it is determined that the reception operation mode of the base station supports beam sweeping, in step S940, the terminal may determine the reception operation mode of the base station as the multi-beam mode.

On the other hand, if it is determined that the reception operation mode of the base station does not support beam sweeping, in step S945, the terminal may determine the reception operation mode of the base station as the single-beam mode.

Meanwhile, determining, by the terminal, the transmission operation mode of the base station through the PSS sequence and the reception operation mode of the base station through the PBCH as described above is merely an example. According to still another embodiment of the present disclosure, the terminal may also determine the reception operation mode of the base station through the PSS sequence and the transmission operation mode of the base station through the PBCH.

In the aforementioned embodiments, the PSS and the SSS that are the reference signals for indicating the transmission operation mode of the base station are not necessarily subject to beam sweeping. Accordingly, with respect to the PSS and the SSS illustrated in FIGS. 8A and 8B, the base station may transmit the signals with the single-beam structure.

Alternatively, according to still another embodiment of the present disclosure, the base station may transmit a synchronization signal according to the DL frame structure having a structure as illustrated in FIG. 8C. If the DL frame structure as illustrated in FIG. 8C is used, the terminal may clearly determine a timing (e.g. a starting point of a subframe or a slot) of the PSS and the SSS. Therefore, the base station may not transmit the ESS. The PSS and the SSS illustrated in FIG. 8C may not be necessarily subject to beam sweeping. Therefore, when the base station transmits a synchronization signal according to FIG. 8C, the signal may be transmitted with the single-beam structure.

In some embodiments, the base station may indicate the transmission or reception operation mode of the base station by transmitting a different PSS sequence while changing a position on a time axis at which the PSS and the SSS are transmitted.

Figure 9A:
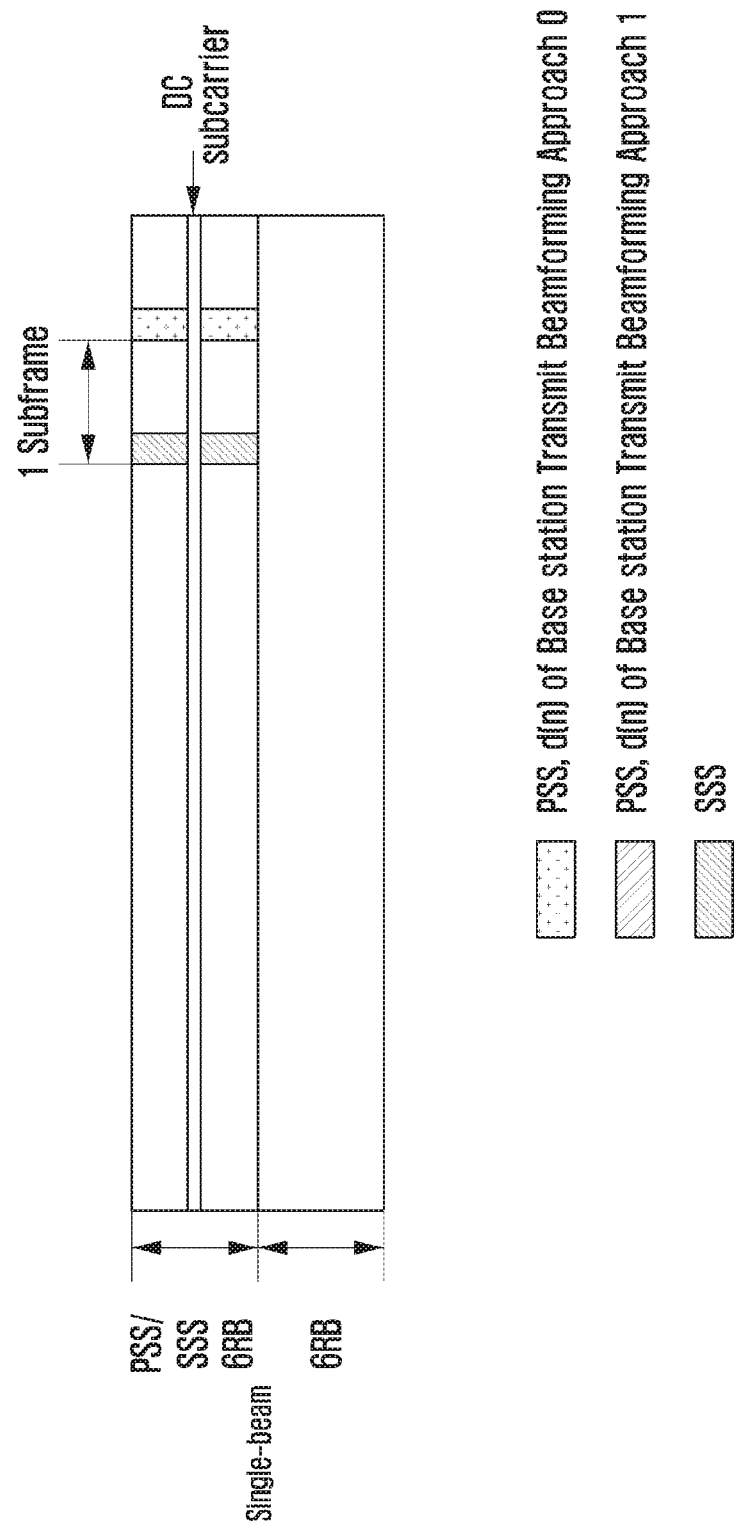
FIGS. 9A to 9C illustrate examples transmission structure of a synchronization signal according to an embodiment of the present disclosure in a case in which the base station does not support beam sweeping or in a case in which the base station supports beam sweeping.
Figure 9B:
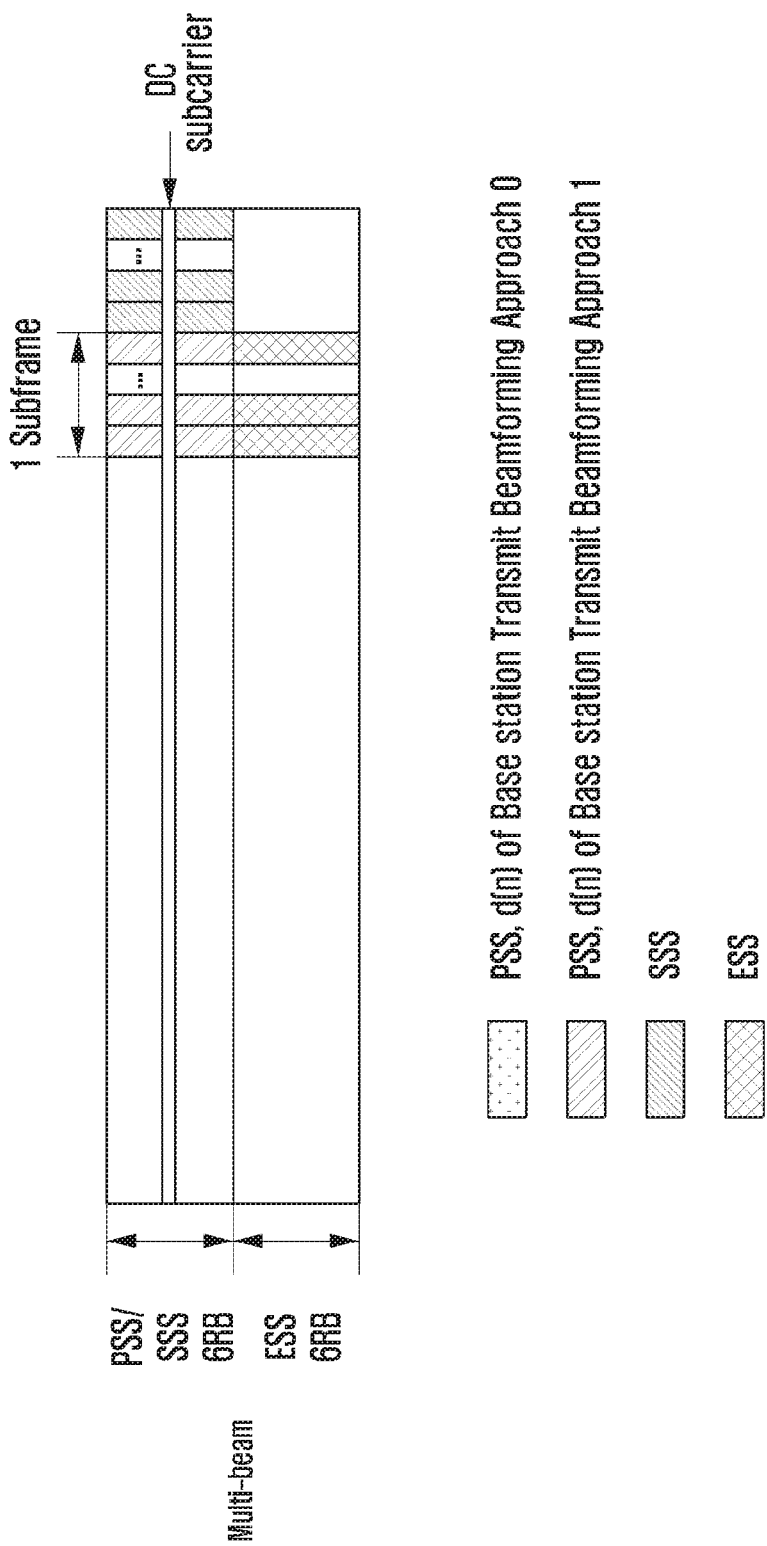

Specifically, the PSS and SSS transmission method by the aforementioned embodiment illustrated in FIGS. 9A and 9B.

Referring to FIGS. 9A and 9B, as described in the aforementioned embodiment, the base station may indicate the transmission operation mode of the base station by indicating whether beam sweeping is supported while changing the position on the time axis at which the PSS and the SSS are transmitted. Further, the base station may transmit a different PSS sequence depending on the reception operation mode of the base station.

By the frame structure illustrated in FIG. 9A or 9B, the terminal that receives the synchronization signal may determine a number of the subframe in which the PSS and the SSS are received by the same method as described in the aforementioned embodiment. Further, the transmission operation mode of the base station may be determined depending on a transmission order of the PSS and the SSS.

Further, the terminal may determine the transmission operation mode of the base station by determining the PSS sequence.

Specifically, the terminal may determine correlations using sequences each representing the single-beam mode and the multi-beam mode during a process of receiving the PSS. The terminal may determine whether the sequence of the received PSS is a sequence representing the single-beam mode, or the sequence representing the multi-beam operation mode depending on the determined correlation.

Alternatively, the terminal may determine correlation using one type of sequence for a predetermined time when receiving the PSS. If the correlation is successful, the single-beam mode or the multi-beam mode may be determined by the scheme of using the one type of sequence.

Specifically, the terminal may determine that the base station that transmits the PSS supports the single-beam mode if correlation is determined using a sequence representing the single-beam mode and is successful with respect to the received PSS sequence. Meanwhile, if the correlation is unsuccessful, the terminal may determine that the base station that transmits the PSS supports the multi-beam mode.

On the other hand, the terminal may determine that the base station that transmits the PSS supports the multi-beam mode if correlation is determined using a sequence representing the multi-beam mode and is successful with respect to the received PSS sequence. Meanwhile, if the correlation is unsuccessful, the terminal may determine that the base station that transmits the PSS supports the single-beam mode.

Figure 10:
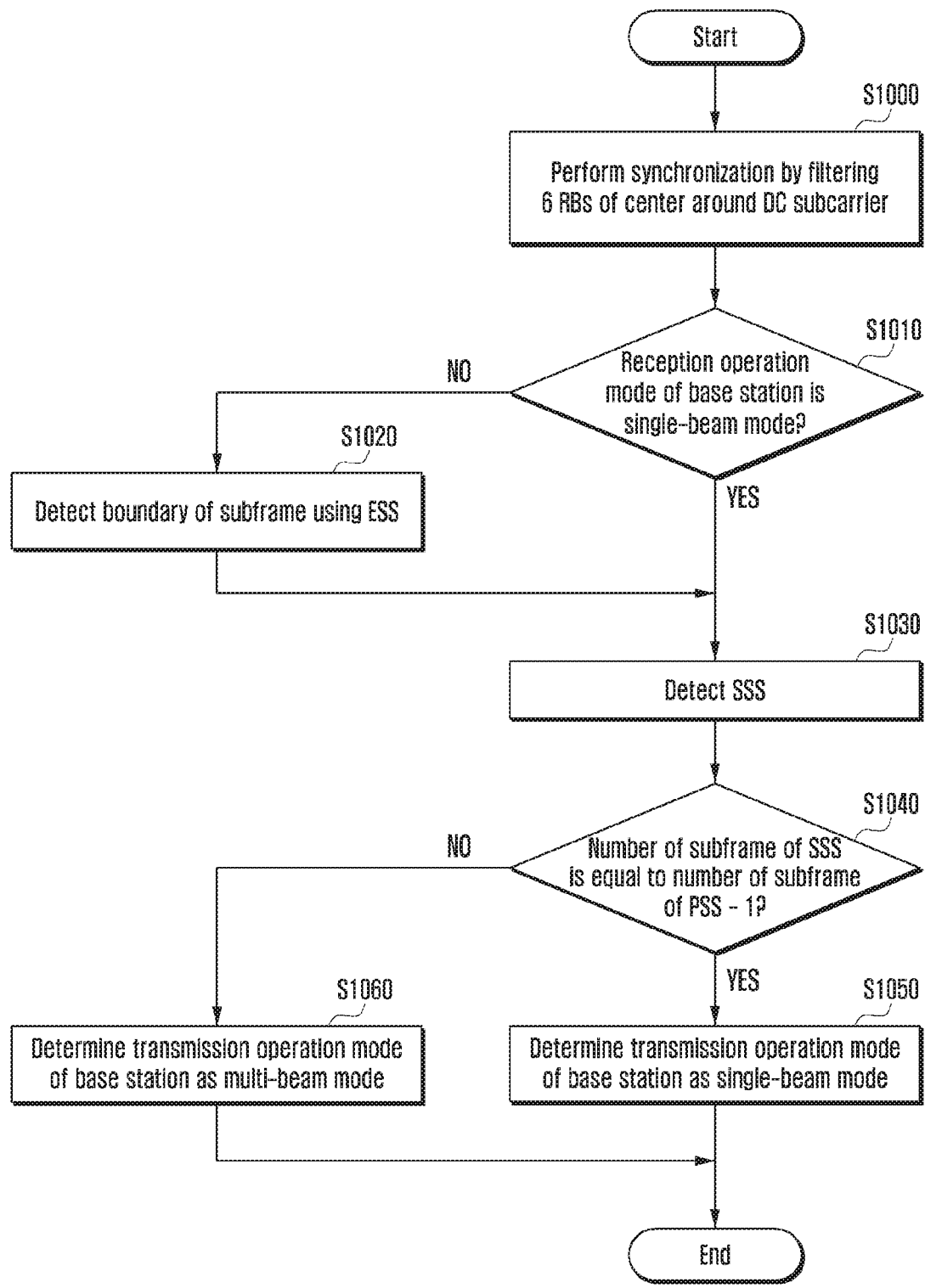
FIG. 10 illustrates a method of determining, by the terminal, an operation mode of the base station according to an embodiment of the present disclosure.

According to the aforementioned embodiment, the method of determining, by the terminal, the transmission mode of the base station is as shown in the flow chart of FIG. 10.

In step S1000, the terminal may perform synchronization by filtering 6 RBs of the center around a DC subcarrier. The number of RBs in which the terminal receives a synchronization signal for synchronization is not limited to 6 and may be 6 or more, or 6 or less.

Further, in step S1010, the terminal may determine whether the reception operation mode of the base station is the single-beam mode. Specifically, the terminal may determine the reception operation mode of the base station by using the PSS sequence among the received synchronization signals. The method of determining, by the terminal, the reception operation mode of the base station using the PSS sequence is as described above.

As the determination result, if it is determined that the reception operation mode of the base station is not the single-beam mode, but is, for example, the multi-beam mode, in step S1020, the terminal may detect the boundary of the subframe using the ESS. Further, in step S1030, the terminal may detect the SSS.

Meanwhile, if it is determined that the reception operation mode of the base station is the single-beam mode, the terminal may directly detect the SSS in step S1030.

The terminal that detects the SSS may determine an order of transmission times of the PSS and the SSS in step S1040. For example, the terminal may determine whether a number of a subframe in which the SSS is transmission is the same as a value obtained by subtracting 1 from a number of a subframe in which the PSS is transmitted.

As the determination result, if it is determined that the subframe in which the SSS is transmitted precedes, in step S1050, the terminal may determine the transmission operation mode of the base station as the single-beam mode.

On the other hand, if it is determined that the subframe in which the SSS is transmitted does not precede, in step S1060, the terminal may determine the transmission operation mode of the base station as the multi-beam mode. The terminal may perform communication with the base station according to the determined transmission and reception operation modes.

As described above, indicating by the base station the transmission operation mode by changing the position on the time axis at which the base station transmits the PSS and the SSS, and transmitting a different PSS sequence to indicate the reception operation mode are merely an example. According to another embodiment of the present disclosure, on the contrary, the base station may indicate the reception operation mode of the base station by changing the position on the time axis at which the PSS and the SSS are transmitted. Further, the base station may transmit a different PSS sequence depending on the transmission operation mode of the base station.

In the aforementioned embodiments, the PSS and the SSS that are the reference signals for indicating the transmission operation mode of the base station are not necessarily subject to beam sweeping. Accordingly, with respect to the PSS and the SSS illustrated in FIGS. 9A and 9B, the base station may transmit the signals with the single-beam structure. For example, the base station may transmit the PSS and the SSS in a static beam direction through analog-beam forming without beam sweeping.

Figure 9C:
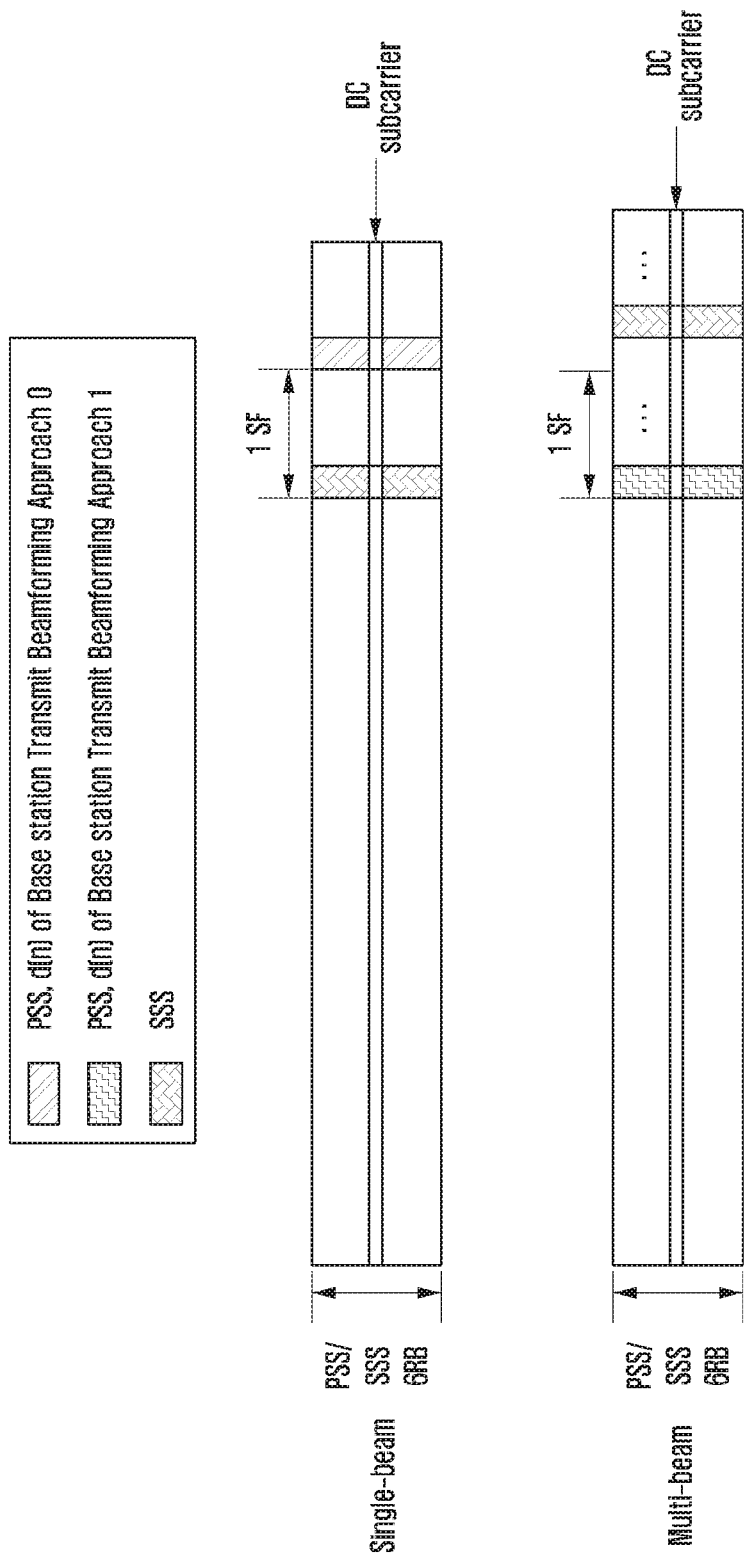

Alternatively, according to still another embodiment of the present invention the base station may transmit a synchronization signal according to the DL frame structure having a structure as illustrated in FIG. 9C. If the DL frame structure as illustrated in FIG. 9C is used, the terminal may clearly determine a timing (e.g. a starting point of a subframe or a slot) of the PSS and the SSS. Therefore, the base station may not transmit the ESS. The PSS and the SSS illustrated in FIG. 9C may not be necessarily subject to beam sweeping. Therefore, when the base station transmits a synchronization signal according to FIG. 9C, the signal may be transmitted with the single-beam structure.

As described above, the transmission operation mode and the reception operation mode of the base station may be set to be the same as each other.

In this case, the base station transmits a synchronization signal according to the frame structure illustrated in FIGS. 8A and 8B as described above to indicate the transmission and reception operation modes of the base station.

Specifically, in order to indicate the transmission and reception operation modes, the base station may perform transmission to the terminal by mapping the PSS and the SSS to a resource and changing the position on the time axis of the transmission resource by the method as described in the aforementioned embodiment. However, since the transmission operation mode and the reception operation mode of the base station are the same as each other, the base station need not to perform transmission by changing the PSS sequence or by additionally inserting information for indicating the operation mode into the MIB.

Figure 11:
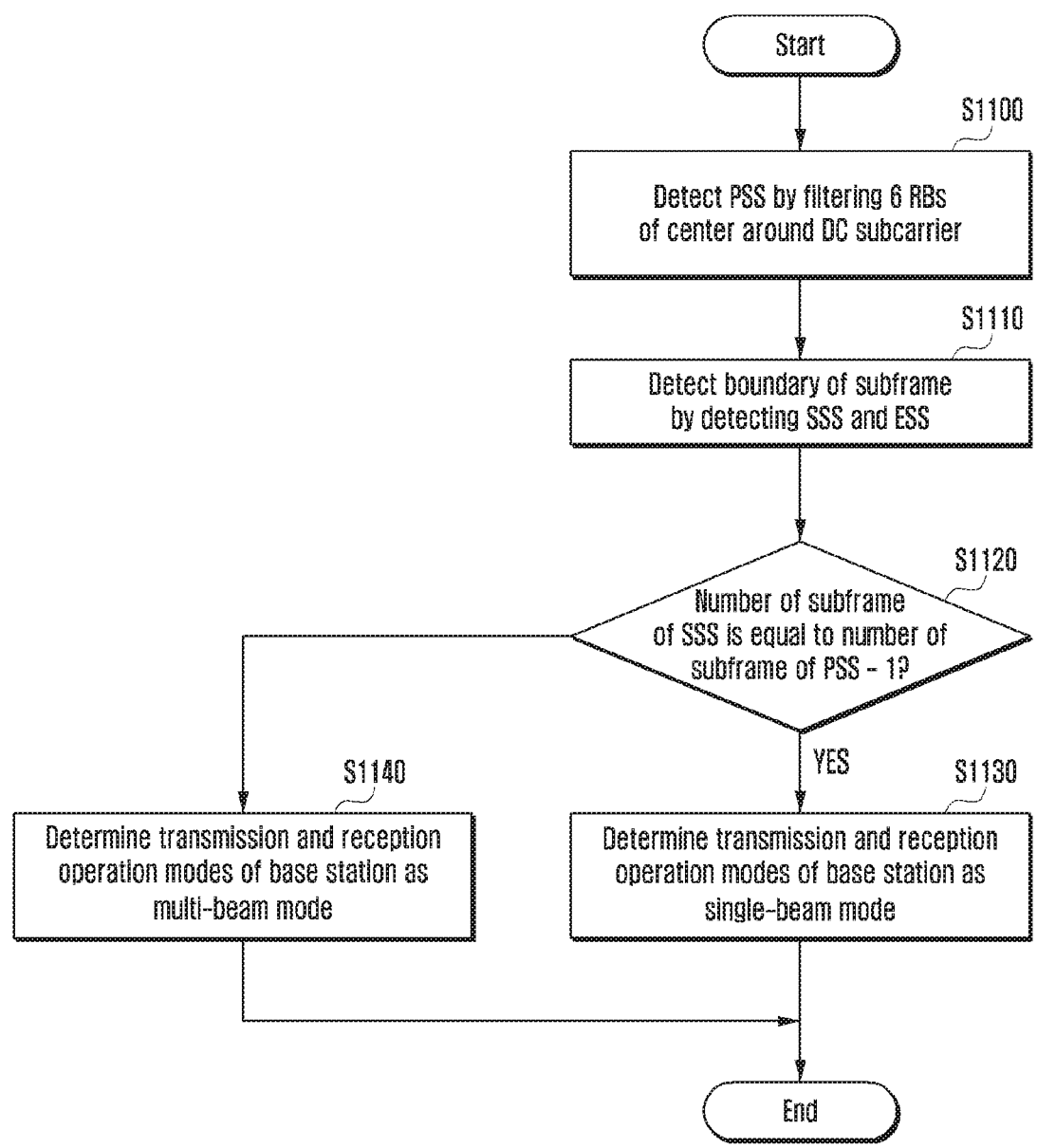
FIG. 11 illustrates a method of determining, by the terminal, transmission and reception operation modes of the base station according to an embodiment of the present disclosure.

Hereinafter, an operation of the terminal in the aforementioned embodiment will be described with reference to FIG. 11. First, in step S1100, the terminal may detect the PSS by filtering 6 RBs of the center around a DC subcarrier. The number of RBs in which the terminal receives a synchronization signal for synchronization is not limited to 6 and may be 6 or more, or 6 or less.

Further, in step S1110, the terminal may determine whether the transmission and reception operation mode of the base station is the single-beam mode. Specifically, the terminal may detect the SSS and the ESS, and detect the boundary of the subframe.

The terminal that detects the SSS may determine an order of transmission times of the PSS and the SSS in step S1120. For example, the terminal may determine whether a number of a subframe in which the SSS is transmission is the same as a value obtained by subtracting 1 from a number of a subframe in which the PSS is transmitted.

As the determination result, if it is determined that the subframe in which the SSS is transmitted precedes, in step S1130, the terminal may determine the transmission and reception operation modes of the base station as the single-beam mode.

On the other hand, if it is determined that the subframe in which the SSS is transmitted does not precede, in step S1140, the terminal may determine the transmission and reception operation mode of the base station as the multi-beam mode. The terminal may perform communication with the base station according to the determined transmission and reception operation modes.

By the method described above, the terminal may determine the transmission and reception operation modes of the base station according to the frame structure of the synchronization signal transmission of the base station.

According to still another embodiment of the present disclosure, the base station may indicate the transmission or reception operation mode of the base station to the terminal by changing a position on a frequency axis at which the PSS and the SSS are transmitted.

In accordance with the aforementioned embodiments, the PSS sequence d(n) may be mapped to a resource element according to the following equation 6.

$$a_{k,l} = d_u^l(n), \qquad \text{equation (6)}$$

$$n = 0, \ldots, 61$$

$$k = \begin{cases} n - 31 + \frac{N_{RB}^{DL} N_{SC}^{RB}}{2} & \text{for Base Station Transmit} \\ & \text{BFApproach 0} \\ n + 41 + \frac{N_{RB}^{DL} N_{SC}^{RB}}{2} & \text{for Base Station Transmit} \\ & \text{BFApproach 1} \end{cases}$$

$$l = \begin{cases} 0 & \text{for Base Station Transmit} \\ & \text{BFApproach 0} \\ 0, 1, \ldots, 12, 13 & \text{for Base Station Transmit} \\ & \text{BFApproach 1} \end{cases}$$

According to equation 6 above, the PSS may be mapped to a k-th OFDM subcarrier and a first OFDM symbol of a k-th subframe.

Meanwhile, the base station may reserve the following equation 7 for the PSS. However, the base station may not use information according to equation 7 below.

$$k = \begin{cases} n - 31 + \frac{N_{RB}^{DL} N_{SC}^{RB}}{2} & \text{for Base Station Transmit} \\ & \text{BFApproach 0} \\ n + 41 + \frac{N_{RB}^{DL} N_{SC}^{RB}}{2} & \text{for Base Station Transmit} \\ & \text{BFApproach 1} \end{cases} \qquad \text{equation (7)}$$

$$n = -5, -4, \ldots -1, 62, 63, \ldots 66$$

$$l = \begin{cases} & \text{for Base Station Transmit} \\ & \text{BFApproach 0} \\ 0, 1, \ldots, 12, 13 & \text{for Base Station Transmit} \\ & \text{BFApproach 1} \end{cases}$$

Meanwhile, in accordance with the aforementioned embodiment, the SSS sequence d(n) may be mapped to a resource element according to the following equation 8.

$$a_{k,l} = d_u^l(n), \qquad \text{(equation 8)}$$

$$n = 0, \ldots, 61$$

$$k = \begin{cases} n + 41 + \frac{N_{RB}^{DL} N_{SC}^{RB}}{2} & \text{for Base Station Transmit} \\ & \text{BFApproach 0} \\ n - 31 + \frac{N_{RB}^{DL} N_{SC}^{RB}}{2} & \text{for Base Station Transmit} \\ & \text{BFApproach 1} \end{cases}$$

-continued $$l = \begin{cases} 0 \text{ for Base Station Transmit} \\ \quad BFApproach \ 0 \\ 0, 1, \ldots, 12, 13 \text{ for Base Station Transmit} \\ \quad BFApproach \ 1 \end{cases}$$

According to equation 8 above, the SSS may be mapped to a k-th OFDM subcarrier and a first OFDM symbol of a k-th subframe in which the SSS is transmitted.

Meanwhile, the base station may reserve the following equation 9 for the SSS. However, the base station may not use information according to equation 9 below.

equation (9)

$$k = \begin{cases} n + 41 + \frac{N_{RB}^{DL} N_{sc}^{RB}}{2} \text{ for Base Station Transmit} \\ \quad BFApproach \ 0 \\ n - 31 + \frac{N_{RB}^{DL} N_{sc}^{RB}}{2} \text{ for Base Station Transmit} \\ \quad BFApproach \ 1 \end{cases}$$

$$n = -5, -4, \ldots -1, 62, 63, \ldots 66$$

$$l = \begin{cases} 0 \text{ for Base Station Transmit} \\ \quad BFApproach \ 0 \\ 0, 1, \ldots, 12, 13 \text{ for Base Station Transmit} \\ \quad BFApproach \ 1 \end{cases}$$

Figure 12A:
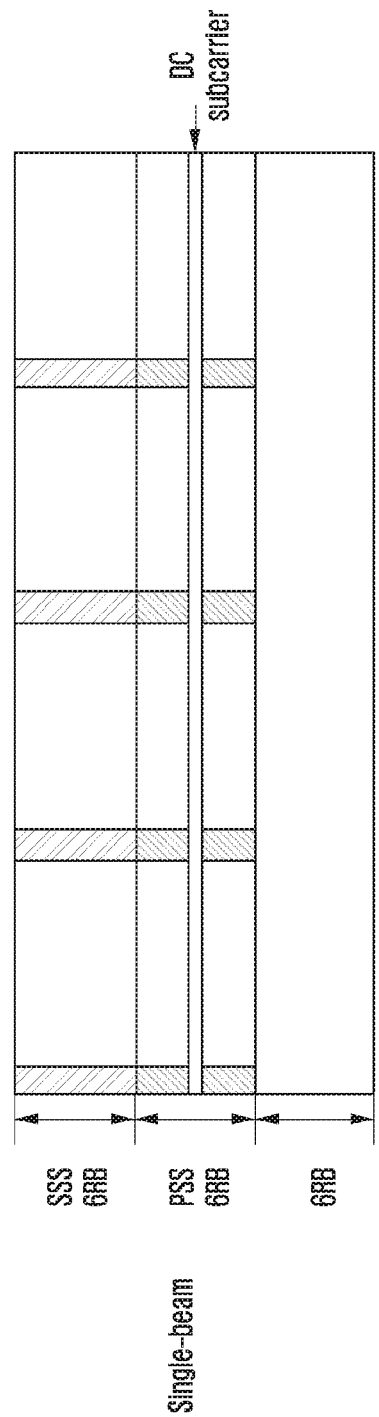
FIGS. 12A to 12C illustrate examples structure of transmitting a synchronization signal by changing a position on a frequency axis according to an embodiment of the present disclosure in a case in which the base station does not support beam sweeping or in a case in which the base station supports beam sweeping.
Figure 12B:
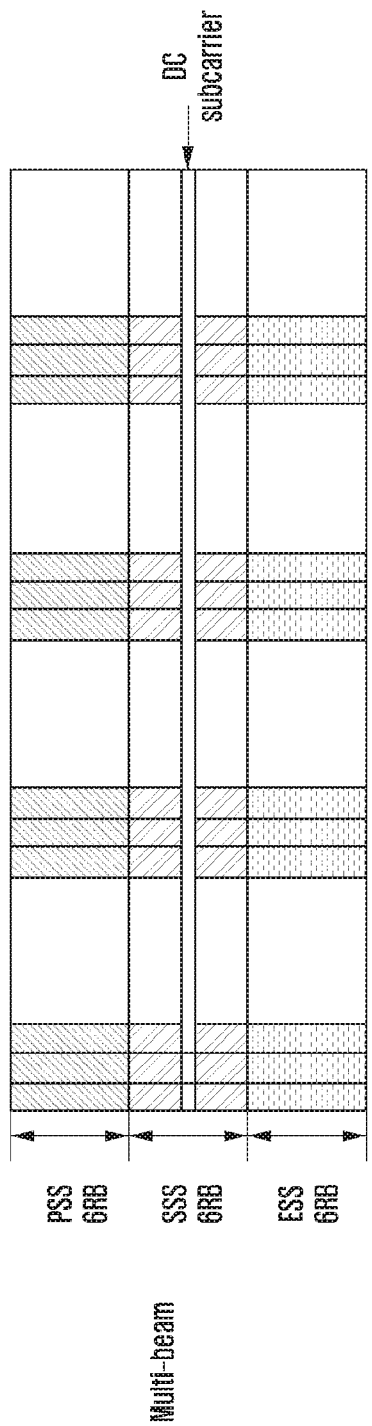

In the aforementioned embodiment, the PSS and the SSS may be transmitted as illustrated in FIGS. 12A and 12B.

According to an embodiment of the present disclosure, as shown in FIGS. 12A and 12B, the PSS may be transmitted in 6 RBs of the center around the DC subcarrier and the SSS may be transmitted in 6 RBs positioned above and adjacent to the 6 RBs in which the PSS is transmitted. Further, FIGS. 12A and 12B show a case in which the PSS and the SSS are transmitted through 14 OFDM symbols (=1 subframe), respectively.

Equations 6 to 9 above may represent the total number of resource blocks used in a bandwidth supported by the base station and may represent the number of subcarriers in one RB.

Further, in equations 6 to 9, the base station transmit BF approach 0 may indicate the case in which the transmission operation mode of the base station is the single-beam mode, and the base station transmit BF approach 1 may indicate the case in which the transmission operation mode of the base station is the multi-beam mode. According to another embodiment of the present disclosure, on the contrary, the base station transmit BF approach 0 may indicate the case in which the transmission operation mode of the base station is the multi-beam mode, and the base station transmit BF approach 1 may indicate the case in which the transmission operation mode of the base station is the single-beam mode.

In the aforementioned embodiment, the terminal may determine the transmission positions of the PSS and the SSS by filtering 6 RBs of the center around the DC subcarrier and other 6 RBs adjacent to the 6 RBs. As the determination result, the terminal may distinguish the transmission operation mode of the base station.

Specifically, FIG. 12A illustrates an example transmission structure of a synchronization signal when the base station does not support beam sweeping, and FIG. 12B illustrates an example transmission structure of a synchronization signal when the base station supports beam sweeping. In the embodiment illustrated in FIGS. 12A and 12B, the entire PSS and SSS may be transmitted through 6 RBs of the center around the DC subcarrier and other 6 RBs adjacent to the 6 RBs.

However, if the base station does not support beam sweeping, as illustrated in FIG. 12A, the base station may transmit the PSS in the 6 RBs of the center around the DC subcarrier to indicate that the transmission operation mode of the base station is the single-beam mode.

Further, if the base station supports beam sweeping, as illustrated in FIG. 12B, the base station may transmit the SSS in the 6 RBs of the center around the DC subcarrier to indicate that the transmission operation mode of the base station is the multi-beam mode.

Therefore, based on the frequency band in which the PSS and the SSS are transmitted, the terminal may determine that the base station supports beam sweeping, and may perform communication with the base station based on the operation mode of supporting beam sweeping. Alternatively, the terminal may determine that the base station does not support beam sweeping, and may perform communication with the base station based on the operation mode of not supporting beam sweeping.

According to still another embodiment of the present invention contrary to that illustrated in FIGS. 12A and 12B, the base station may also transmit the SSS in the 6 RBs of the center around the DC subcarrier if the transmission operation mode is the single-beam mode, and transmit the PSS in the 6 RBs of the center around the DC subcarrier if the transmission operation mode is the multi-beam mode.

As described above, the base station that indicates the transmission mode of the base station by changing the position on the frequency axis at which the PSS and the SSS are transmitted may indicate the reception mode of the base station to the terminal through the PBCH. For example, the base station may transfer the reception operation mode of the base station by using a master information block (MIB) transferred through the PBCH.

Specifically, the base station may indicate whether the base station supports beam sweeping in the reception mode using information of 1 bit in the MIB. For example, the information of 1 bit that is inserted by the base station into the MIB may be defined through "base station receive BF approach".

The information indicated through the "base station reception BF approach" may be as in the following Table 13 or 14.

TABLE 13

| | |
|---|---|
| 0 | Multi-beam Base Station Receive BF Approach Indication |
| 1 | Single-beam Base Station Receive BF Approach Indication |

TABLE 14

| | |
|---|---|
| 0 | Identical to Base Station Transmit BF Approach |
| 1 | Different from Base Station Transmit BF Approach |

As shown in Table 13 above, the terminal may determine the reception operation mode depending on whether the "base station reception BF approach" is "0" or "1". Alternatively, as shown in Table 14, the terminal may determine whether the reception operation mode of the base station is the same as the transmission operation mode of the base station or different from the transmission operation mode of the base station depending on whether the "base station receive BF approach" is "0" or "1".

Figure 13:
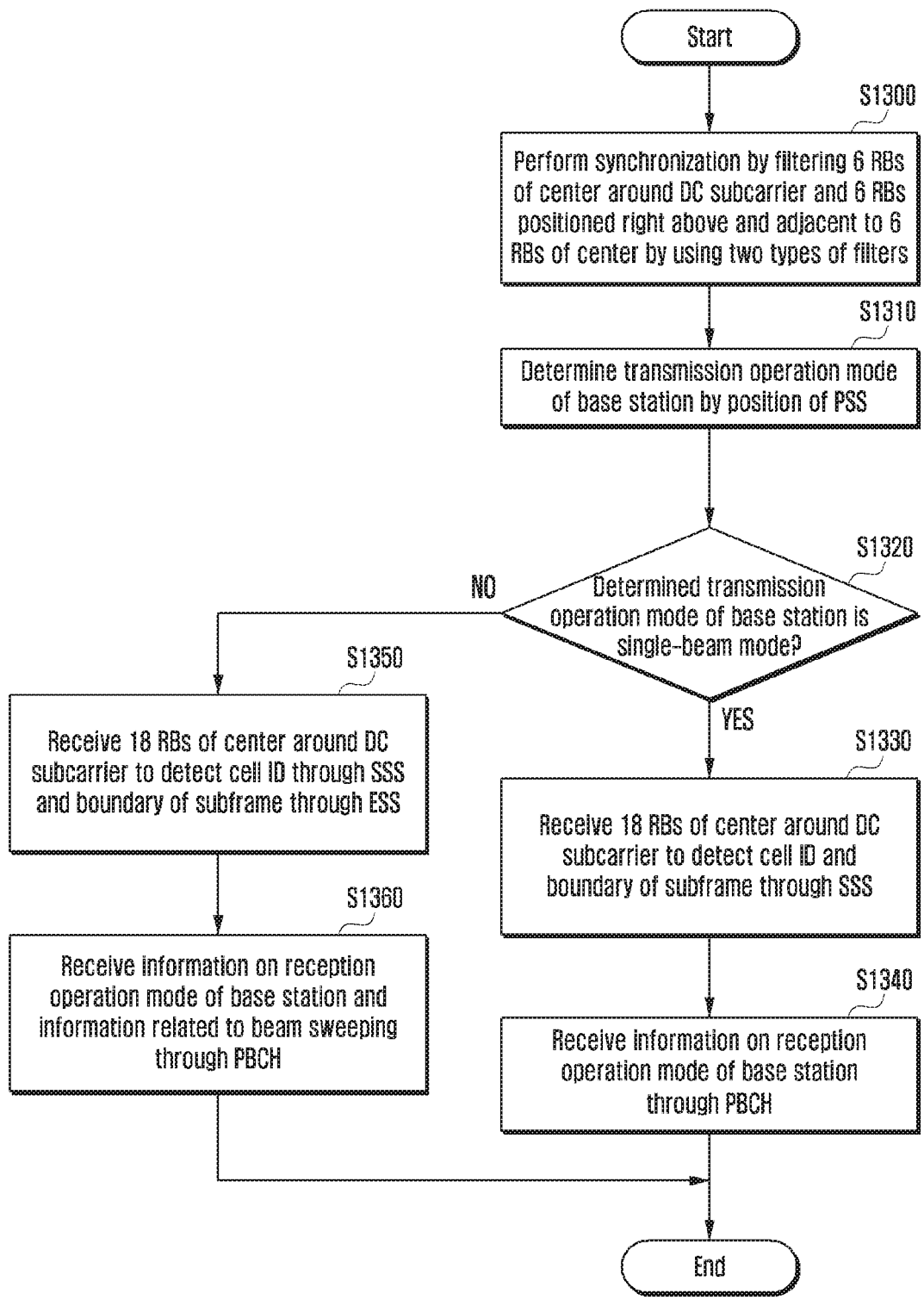
FIG. 13 illustrates a method of determining, by the terminal, transmission and reception operation modes of the base station according to an embodiment of the present disclosure.

As described above with reference to FIGS. 12A and 12B, the method of determining, by the terminal, the transmission and reception operation modes of the base station may be summarized as shown in the flow chart of FIG. 13.

First, in step S1300, the terminal may perform synchronization by filtering 6 RBs of the center around the DC subcarrier and 6 RBs positioned right above and adjacent to the 6 RBs, respectively, by using two types of filters.

In step S1310, the terminal may determine the transmission operation mode of the base station by the position of the PSS detected in the filtered signal. For example, the terminal may determine the transmission operation mode of the base station as the single-beam mode if it is determined that the PSS is received through the 6 RBs of the center around the DC subcarrier. Alternatively, the terminal may determine the transmission operation mode of the base station as the single-beam mode if it is determined that the PSS is received through the 6 RBs positioned right above and adjacent to the 6 RBs of the center around the DC subcarrier.

In step S1320, the terminal may proceed to step S1330 or step S1350 depending on whether or not the determined transmission operation mode of the base station is the single-beam mode.

Specifically, if the transmission operation mode of the base station is the single-beam mode, in step S1330, the terminal may receive 18 RBs of the center around the DC subcarrier to detect the cell ID and the boundary of the subframe through the SSS. Further, in step S1340, the terminal may receive information on the reception operation mode of the base station through the PBCH. For example, the terminal may determine the reception operation modes of the base station according to information included in the MIB received through the PBCH.

Meanwhile, if the transmission operation mode of the base station is the multi-beam mode, in step S1350, the terminal may receive 18 RBs of the center around the DC subcarrier to detect the cell ID through the SSS and the boundary of the subframe through the ESS.

Further, in step S1360, the terminal may receive information on the reception operation mode of the base station and information related to the beam sweeping through the PBCH.

Meanwhile, determining, by the terminal, the transmission operation mode of the base station by the positions on the frequency axis at which the PSS and the SSS are transmitted and the reception operation mode of the base station through the PBCH as described above is merely an example. According to still another embodiment of the present disclosure, the terminal may also determine the reception operation mode of the base station by the positions on the frequency axis at which the PSS and the SSS are transmitted and the transmission operation mode of the base station through the PBCH.

In some embodiments, the PSS and the SSS that are the reference signals for indicating the transmission operation mode of the base station are not necessarily subject to beam sweeping. Accordingly, with respect to the PSS and the SSS illustrated in FIGS. 12A and 12B, the base station may transmit the signals with the single-beam structure. For example, the base station may transmit the PSS and the SSS in a static beam direction through analog-beam forming without beam sweeping.

Figure 12C:
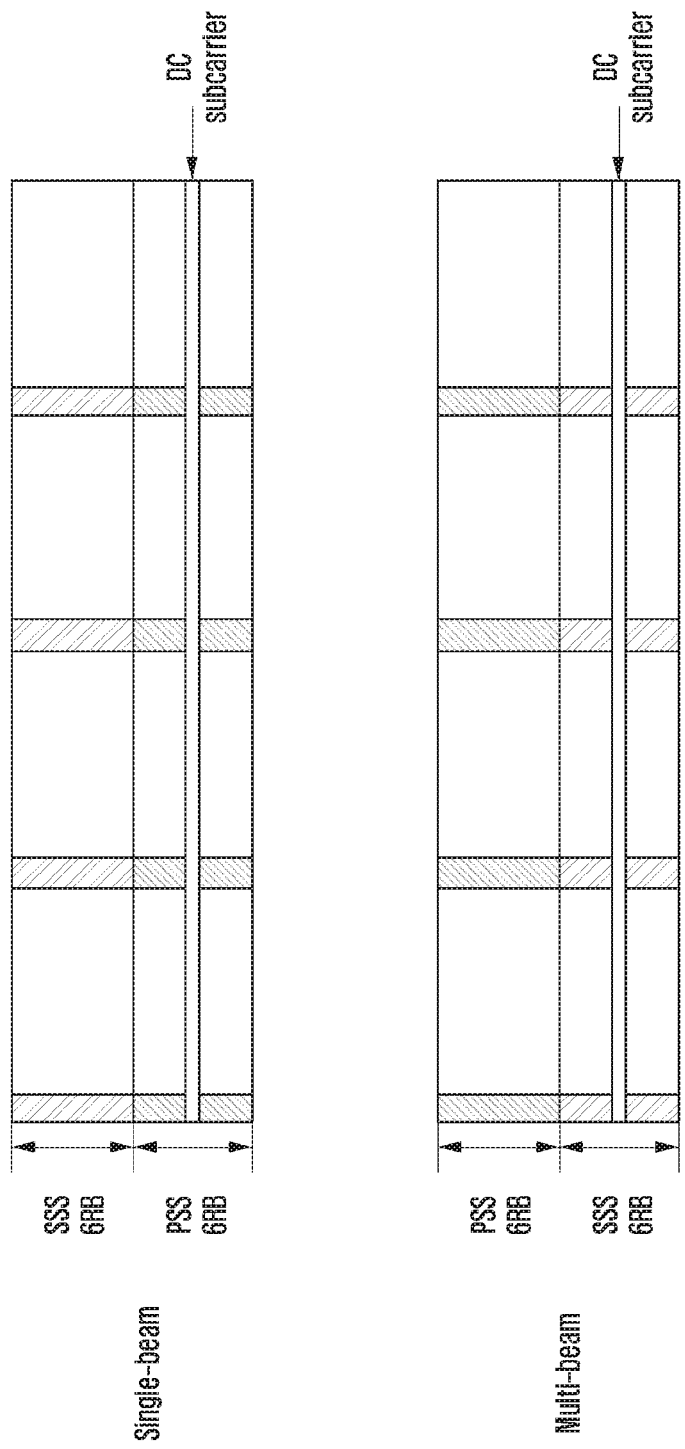

Alternatively, according to still another embodiment of the present invention the base station may transmit a synchronization signal according to the DL frame structure having a structure as illustrated in FIG. 12C. If the DL frame structure as illustrated in FIG. 12C is used, the terminal may clearly determine a timing (e.g. a starting point of a subframe or a slot) of the PSS and the SSS. Therefore, the base station may not transmit the ESS. The PSS and the SSS illustrated in FIG. 12C may not be necessarily subject to beam sweeping. Therefore, when the base station transmits a synchronization signal according to FIG. 12C, the signal may be transmitted with the single-beam structure.

In some embodiments, the base station may indicate the transmission or reception operation mode of the base station by transmitting a different PSS sequence while changing a position on a frequency axis at which the PSS and the SSS are transmitted.

Figure 14A:
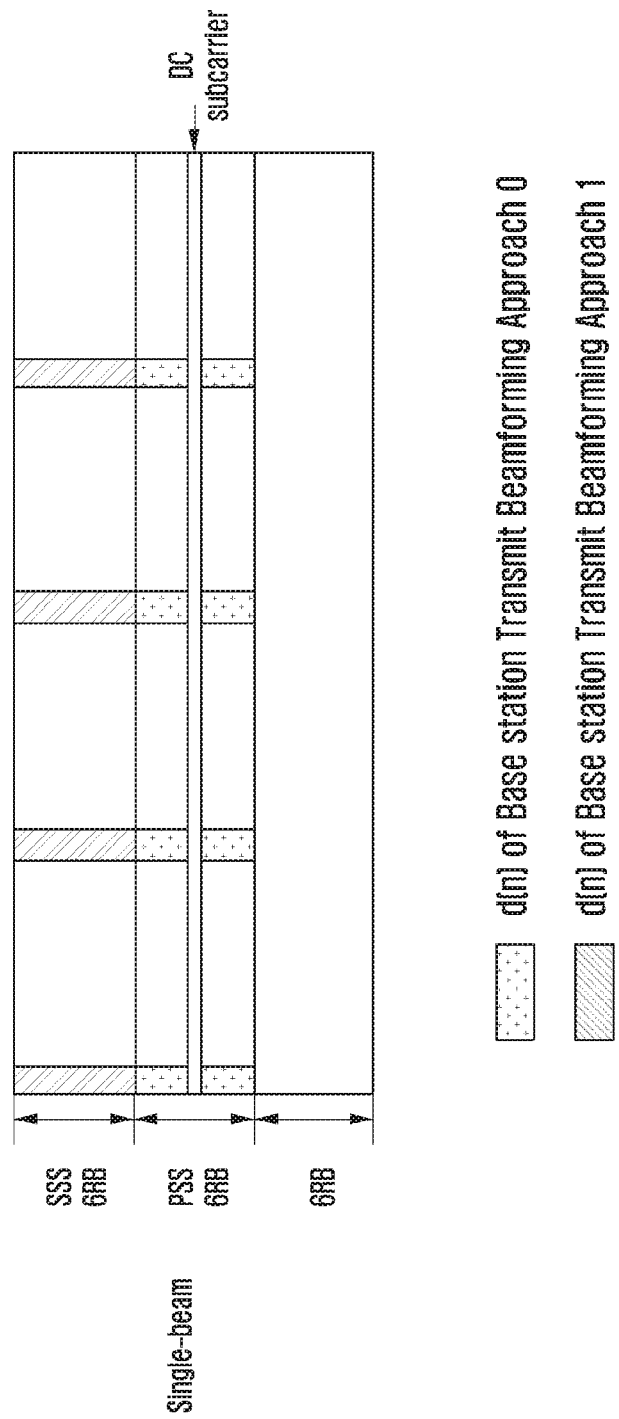
FIGS. 14A to 14C illustrate examples structure of transmitting a synchronization signal by changing a position on a frequency axis while differently transmitting a PSS sequence according to an embodiment of the present disclosure in a case in which the base station does not support beam sweeping or in a case in which the base station supports beam sweeping.
Figure 14B:
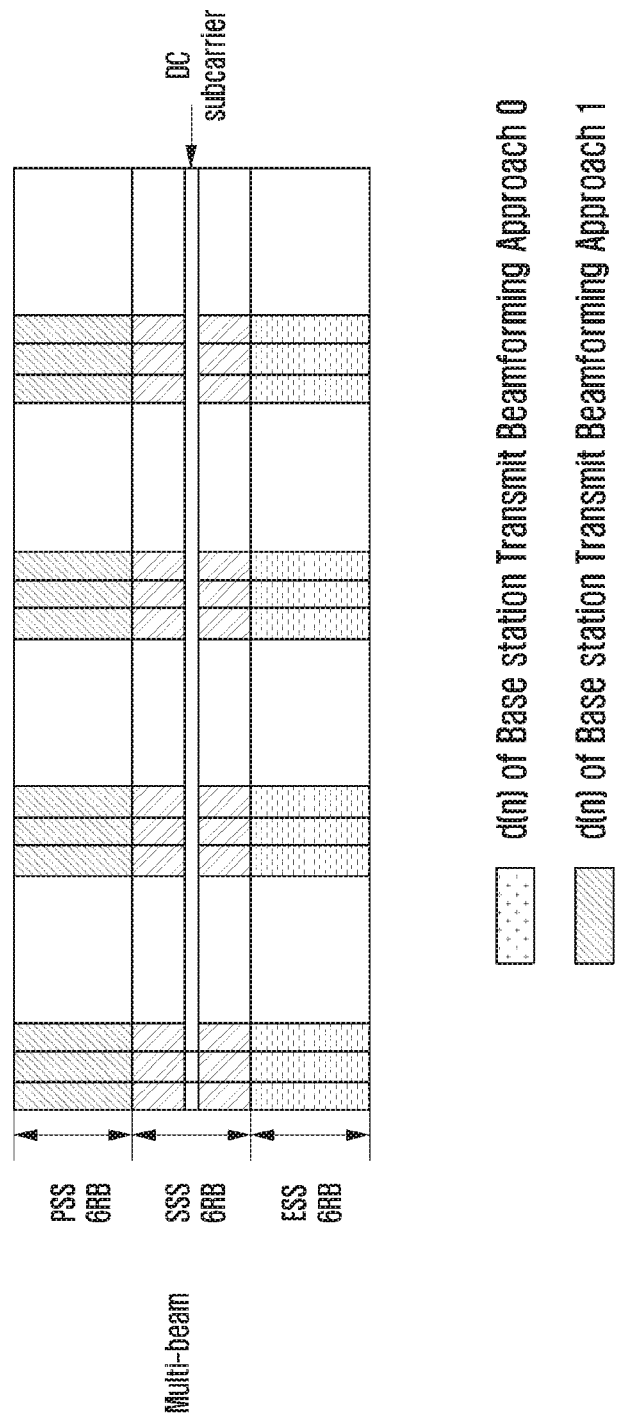

Specifically, the PSS and SSS transmission method by the aforementioned embodiment illustrated in FIGS. 14A and 14B.

Referring to FIGS. 14A and 14B, as described in the aforementioned embodiment, the base station may indicate the transmission operation mode of the base station by indicating whether beam sweeping is supported while changing the position on the frequency axis at which the PSS and the SSS are transmitted. Further, the base station may transmit a different PSS sequence depending on the reception operation mode of the base station.

Specifically, By the frame structure illustrated in FIG. 14A or 14B, the terminal that receives the synchronization signal may determine whether the frequency bandwidth in which the PSS and the SSS are received is the 6 RBs around the DC subcarrier or the other 6 RBs adjacent to the 6 RBs by the same method as described in the aforementioned embodiment. Further, the transmission operation mode of the base station may be determined depending on the positions of the RBs in which the PSS and the SSS are transmitted.

Further, the terminal may determine the transmission operation mode of the base station by determining the PSS sequence.

Specifically, the terminal may determine correlations using sequences each representing the single-beam mode and the multi-beam mode during a process of receiving the PSS. The terminal may determine whether the sequence of the received PSS is a sequence representing the single-beam mode, or the sequence representing the multi-beam operation mode depending on the determined correlation.

Alternatively, the terminal may determine correlation using one type of sequence for a predetermined time when receiving the PSS. If the correlation is successful, the single-beam mode or the multi-beam mode may be determined by the scheme of using the one type of sequence.

Specifically, the terminal may determine that the base station that transmits the PSS supports the single-beam mode if correlation is determined using a sequence representing the single-beam mode and is successful with respect to the received PSS sequence. Meanwhile, if the correlation is unsuccessful, the terminal may determine that the base station that transmits the PSS supports the multi-beam mode.

On the other hand, the terminal may determine that the base station that transmits the PSS supports the multi-beam mode if correlation is determined using a sequence representing the multi-beam mode and is successful with respect to the received PSS sequence. Meanwhile, if the correlation is unsuccessful, the terminal may determine that the base station that transmits the PSS supports the single-beam mode.

Figure 15:
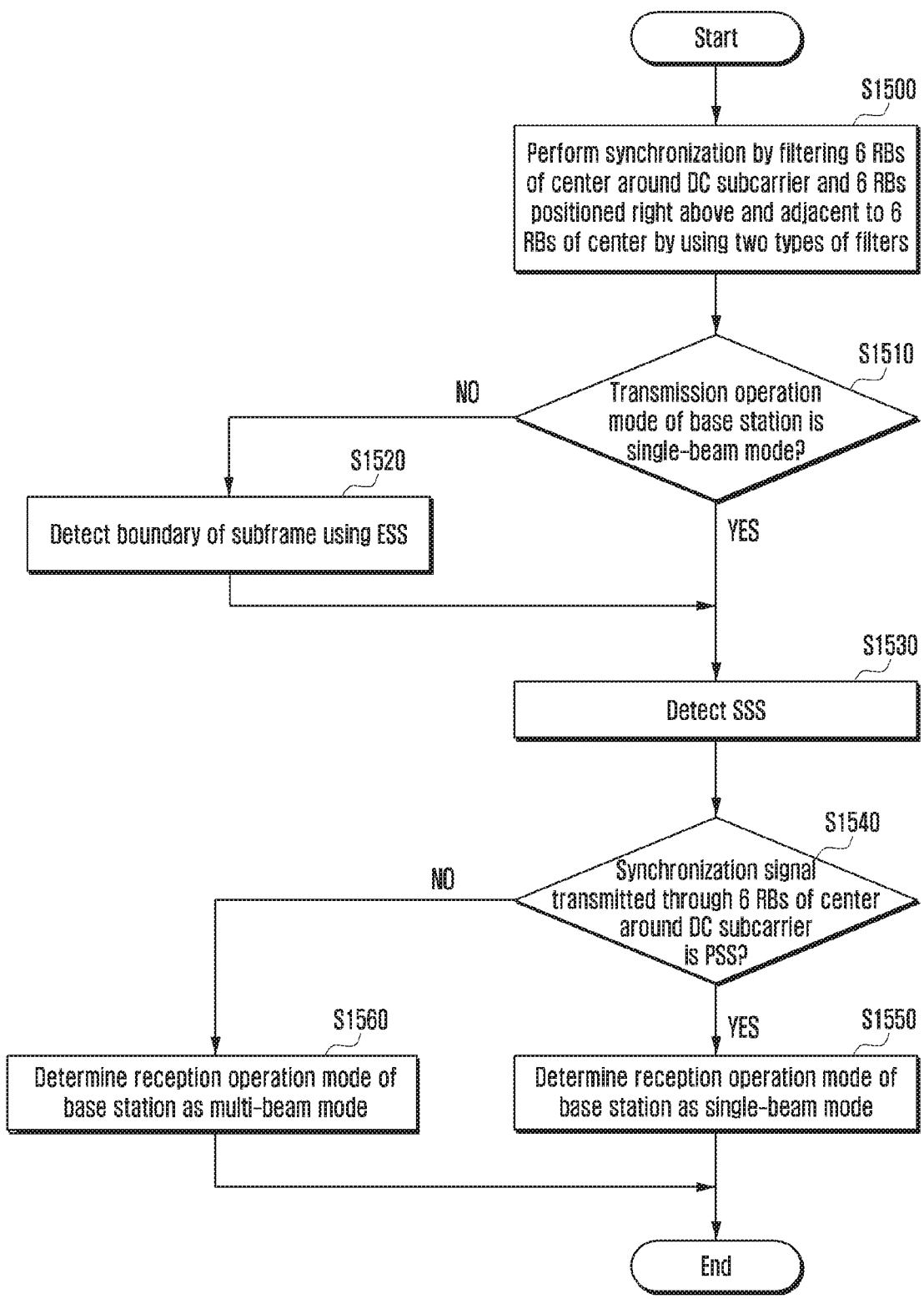
FIG. 15 illustrates a method of determining, by the terminal, transmission and reception operation modes of the base station according to an embodiment of the present disclosure.

According to the aforementioned embodiment described above, the method of determining, by the terminal, the transmission mode of the base station is as shown in the flow chart of FIG. 15.

First, in step S1500, the terminal may perform synchronization by filtering 6 RBs of the center around the DC subcarrier and 6 RBs positioned right above and adjacent to the 6 RBs, respectively, by using two types of filters.

Further, in step S1510, the terminal may determine whether the transmission operation mode of the base station is the single-beam mode. Specifically, the terminal may determine the transmission operation mode of the base station by using the PSS sequence among the received synchronization signals. The method of determining, by the terminal, the transmission operation mode of the base station using the PSS sequence is as described above.

As the determination result, if it is determined that the transmission operation mode of the base station is not the single-beam mode, but is, for example, the multi-beam mode, in step S1520, the terminal may detect the boundary of the subframe using the ESS. Further, in step S1530, the terminal may detect the SSS.

Meanwhile, if it is determined that the transmission operation mode of the base station is the single-beam mode, the terminal may directly detect the SSS in step S1530.

The terminal that detects the SSS may determine whether the synchronization signal transmitted through the 6 RBs of the center around the DC subcarrier is the PSS in step S1540. Specifically, the terminal may use two different types of filters to confirm whether the transmitted synchronization signal is the PSS or the SSS. The terminal may determine the synchronization signal transmitted through 6 RBs of the center around the DC subcarrier and 6 RBs positioned right above and adjacent to the 6 RBs.

As the determination result, if it is determined that the synchronization signal transmitted through the 6 RBs of the center around the DC subcarrier is the PSS, in step S1550, the terminal may determine the reception operation mode of the base station as the single-beam mode.

On the contrary, if the synchronization signal transmitted through the 6 RBs of the center around the DC subcarrier is not the PSS, but is, for example, the SSS, in step S1560, the terminal may determine the reception operation mode of the base station as the multi-beam mode. The terminal may perform communication with the base station according to the determined transmission and reception operation modes.

As described above, indicating by the base station the transmission operation mode by changing the position on the frequency axis at which the base station transmits the PSS and the SSS, and transmitting a different PSS sequence to indicate the reception operation mode are merely an example. According to another embodiment of the present disclosure, on the contrary, the base station may indicate the reception operation mode of the base station by changing the position on the frequency axis at which the PSS and the SSS are transmitted. Further, the base station may transmit a different PSS sequence depending on the transmission operation mode of the base station.

In some embodiments, the PSS and the SSS that are the reference signals for indicating the transmission operation mode of the base station are not necessarily subject to beam sweeping. Accordingly, with respect to the PSS and the SSS illustrated in FIGS. 14A and 14B, the base station may transmit the signals with the single-beam structure. For example, the base station may transmit the PSS and the SSS in a static beam direction through analog-beam forming without beam sweeping.

Figure 14C:
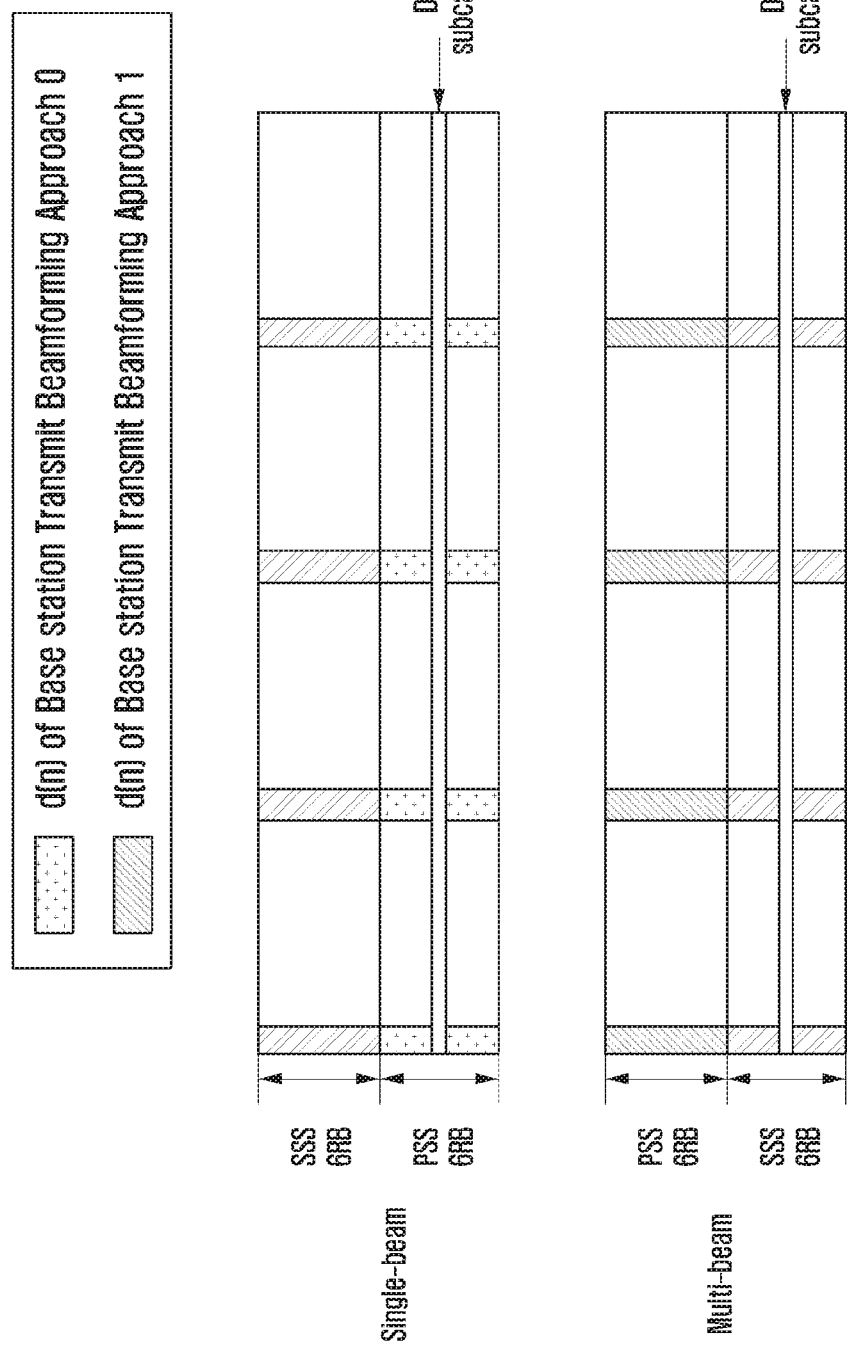

Alternatively, according to still another embodiment of the present disclosure, the base station may transmit a synchronization signal according to the DL frame structure having a structure as illustrated in FIG. 14C. If the DL frame structure as illustrated in FIG. 14C is used, the terminal may clearly determine a timing (e.g. a starting point of a subframe or a slot) of the PSS and the SSS. Therefore, the base station may not transmit the ESS. The PSS and the SSS illustrated in FIG. 14C may not be necessarily subject to beam sweeping. Therefore, when the base station transmits a synchronization signal according to FIG. 14C, the signal may be transmitted with the single-beam structure.

As described above, the transmission operation mode and the reception operation mode of the base station may be set to be the same as each other.

In this case, the base station transmits a synchronization signal according to the frame structure illustrated in FIGS. 12A and 12B as described above to indicate the transmission and reception operation modes of the base station.

Specifically, in order to indicate the transmission and reception operation modes, the base station may perform transmission to the terminal by mapping the PSS and the SSS to a resource and changing the position on the frequency axis of the transmission resource by the method as described in the aforementioned embodiment. However, since the transmission operation mode and the reception operation mode of the base station are the same as each other, the base station need not to perform transmission by changing the PSS sequence or by additionally inserting information for indicating the operation mode into the MIB.

Figure 16:
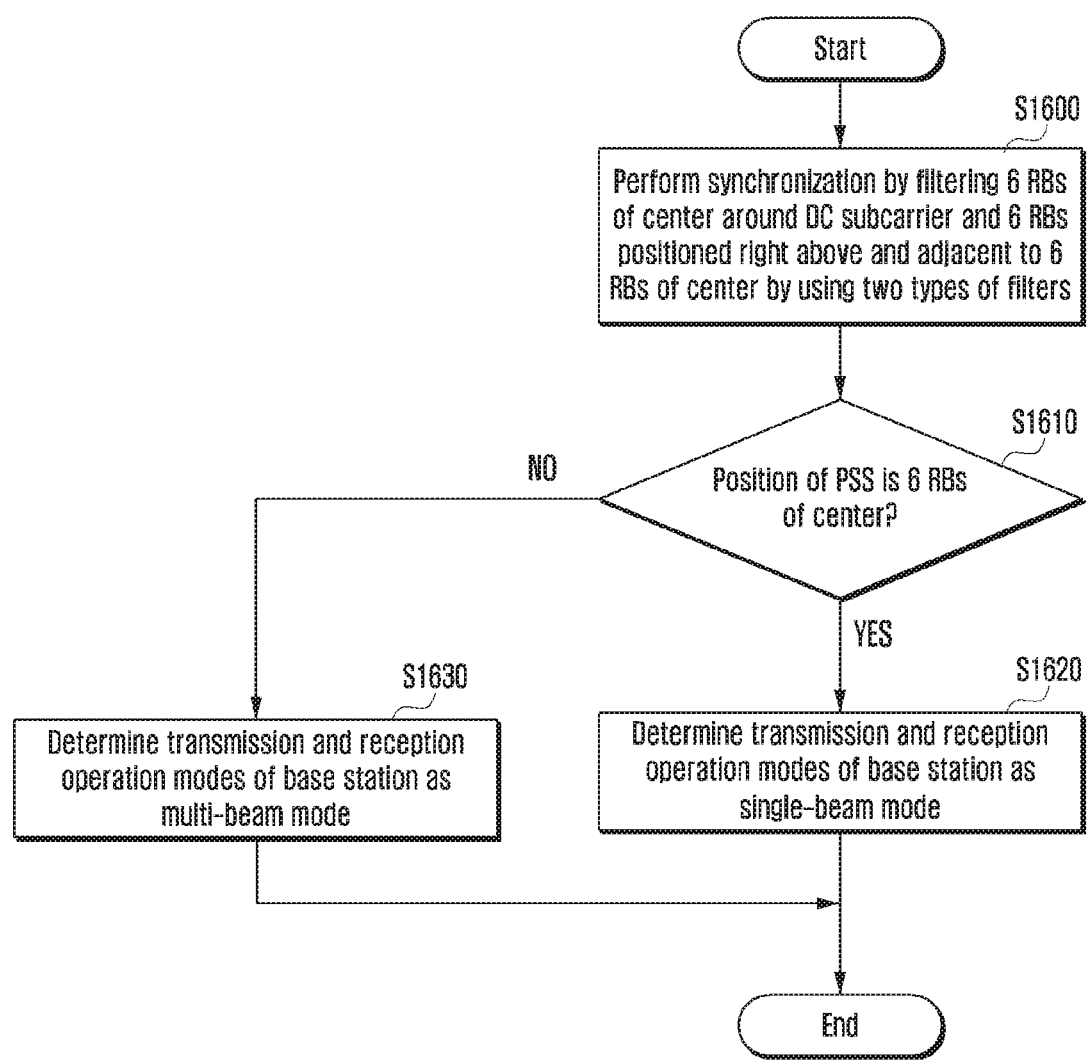
FIG. 16 illustrates a method in which the base station indicates transmission and reception operation modes by transmitting a synchronization signal according to an embodiment of the present disclosure.

Hereinafter, an operation of the terminal in the aforementioned embodiment will be described with reference to FIG. 16. First, in step S1600, the terminal may perform synchronization by filtering 6 RBs of the center around the DC subcarrier and 6 RBs positioned right above and adjacent to the 6 RBs, respectively, by using two types of filters.

Further, the terminal may determine the synchronization signal transmitted through 6 RBs of the center around the DC subcarrier and 6 RBs positioned right above and adjacent to the 6 RBs.

The terminal may determine whether the synchronization signal transmitted through the 6 RBs of the center around the DC subcarrier is the PSS in step S1620.

As the determination result, if it is determined that the synchronization signal transmitted through the 6 RBs of the center around the DC subcarrier is the PSS, in step S1620, the terminal may determine the transmission and reception operation modes of the base station as the single-beam mode.

As the determination result, if it is determined that the synchronization signal transmitted through the 6 RBs of the center around the DC subcarrier is not the PSS, but is, for example, the SSS, in step S1630, the terminal may determine the transmission and reception operation modes of the base station as the multi-beam mode.

The terminal may perform communication with the base station according to the determined transmission and reception operation modes. By the method described above, the terminal may determine the transmission and reception operation modes of the base station according to the frame structure of the synchronization signal transmission of the base station.

In some embodiments, the terminal may determine the transmission or reception operation mode of the base station using an energy pattern of the received PSS. For example, in a case in which the base station transmits the PSS to the terminal in every frame (if PSS transmission period=1 frame), if the base station supports beam sweeping, PSS reception energy may be detected in multiple OFDM symbols in one frame by the beam sweeping.

On the other hand, if the base station does not support beam sweeping, the PSS reception energy may be detected only in one symbol in one frame without beam sweeping.

Accordingly, the terminal may determine the transmission (or reception) operation mode of the base station according to the above described energy pattern. Specifically, the terminal may determine the transmission (or reception) operation mode of the base station as the multi-beam mode if the PSS reception energy is detected in multiple symbols in one frame. Alternatively, the terminal may determine the transmission (or reception) operation mode of the base station as the single-beam mode if the PSS reception energy is detected in one symbol in one frame.

Meanwhile, if the transmission operation mode and the reception operation mode of the base station are set to be different from each other, as described above, the base station may indicate the reception (or transmission) operation mode using the PBCH.

Alternatively, if the transmission operation mode and the reception operation mode of the base station are set to be the same as each other, as described above, the terminal may determine the transmission and reception operation modes of the base station based on the detection of the PSS reception energy.

Figure 17A:
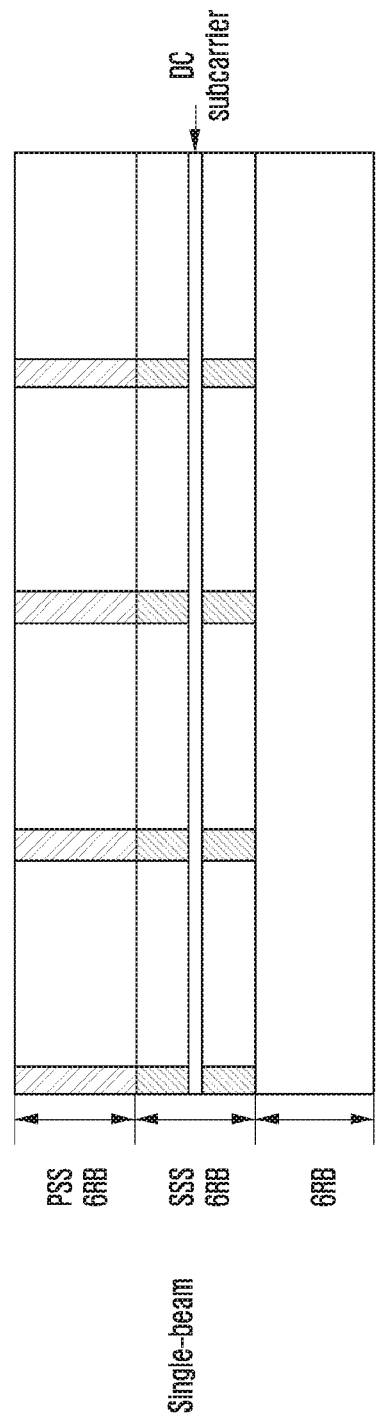
FIGS. 17A and 17B illustrate methods of indicating a transmission (or reception) operation mode of the base station depending on whether an ESS is transmitted according to an embodiment of the present disclosure.
Figure 17B:
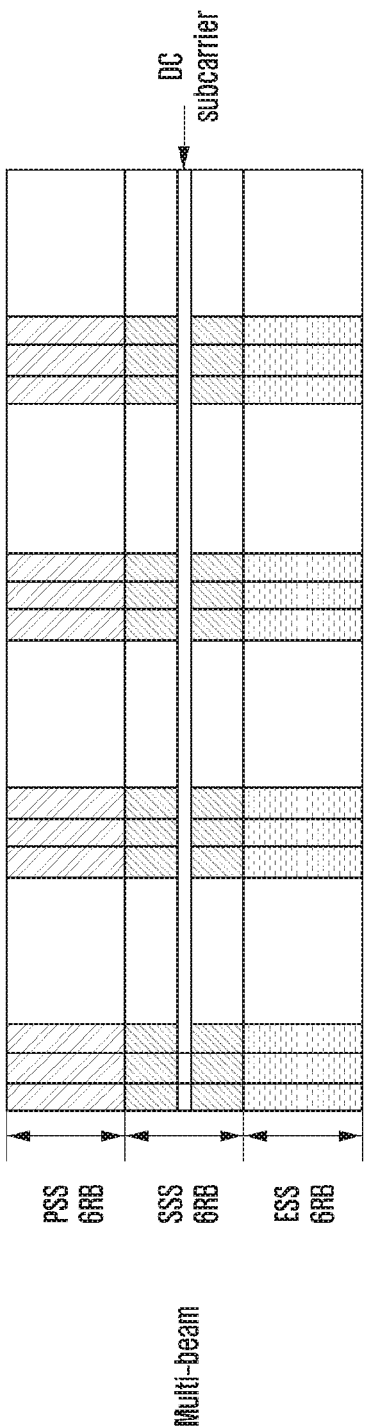

FIGS. 17A and 17B illustrate methods of indicating a transmission (or reception) operation mode of the base station depending on whether an ESS is transmitted according to Embodiment 6 of the present disclosure.

As illustrated in FIG. 17A, if the base station does not support beam sweeping, the base station may not transmit the ESS for a predetermined time in an arbitrary frequency band. Accordingly, the terminal that receives the synchronization signal according to the frequency structure as illustrated in FIG. 17A may determine that the base station does not support beam sweeping and the transmission (or reception) operation mode of the base station is the single-beam mode.

Meanwhile, as illustrated in FIG. 17B, if the base station supports beam sweeping, the base station may transmit the ESS for a predetermined time in an arbitrary frequency band. Accordingly, the terminal that receives the synchronization signal according to the frequency structure as illustrated in FIG. 17B may determine that the base station supports beam sweeping and the transmission (or reception) operation mode of the base station is the multi-beam mode.

Further, in the case in which the transmission (or reception) operation mode of the base station is determined depending on whether the ESS is transmitted, as described above, the base station may also indicate the reception (or transmission) operation mode using the PBCH.

Meanwhile, if the transmission operation mode and the reception operation mode of the base station are set to be the same as each other, as described above, the terminal may also determine the transmission and reception operation modes of the base station based on whether the ESS is transmitted.

In some embodiments, the base station may differently set an SSS sequence depending on whether the beam sweeping is supported.

For example, the base station may transmit a different SSS sequence in a case of indicating the multi-beam mode in which beam sweeping is supported, and in a case of indicating the single-beam mode in which beam sweeping is not supported.

The terminal that receives the SSS may determine correlations using sequences each representing the single-beam mode and the multi-beam mode. The terminal may determine whether the sequence of the received SSS is a sequence representing the single-beam mode, or the sequence representing the multi-beam operation mode depending on the determined correlation.

Alternatively, the terminal may determine correlation using one type of sequence for a predetermined time when receiving the SSS. If the correlation is successful, the single-beam mode or the multi-beam mode may be determined by the scheme of using the one type of sequence.

Specifically, the terminal may determine that the base station that transmits the SSS supports the single-beam mode if correlation is determined using a sequence representing the single-beam mode and is successful with respect to the received SSS sequence. Meanwhile, if the correlation is unsuccessful, the terminal may determine that the base station that transmits the SSS supports the multi-beam mode.

On the other hand, the terminal may determine that the base station that transmits the SSS supports the multi-beam mode if correlation is determined using a sequence representing the multi-beam mode and is successful with respect to the received SSS sequence. Meanwhile, if the correlation is unsuccessful, the terminal may determine that the base station that transmits the SSS supports the single-beam mode.

The terminal that determines the transmission mode of the base station by the method described above may receive a signal from the base station by the determined mode. For example, if it is determined that the transmission mode of the base station is the multi-beam mode, the terminal may perform beam sweeping with respect to the signal received from the base station.

Meanwhile, the base station may additionally indicate a reception mode thereof to the terminal through the PBCH. For example, the base station may transfer the reception operation mode of the base station by using a master information block (MIB) transferred through the PBCH.

Specifically, the base station may indicate whether the base station supports beam sweeping in the reception mode using information of 1 bit in the MIB. For example, the information of 1 bit that is inserted by the base station into the MIB may be defined through "base station receive BF approach".

The information indicated through the "base station reception BF approach" may be as in the following Table 15 or 16.

TABLE 15

| 0 | Multi-beam Base Station Receive BF Approach Indication |
| 1 | Single-beam Base Station Receive BF Approach Indication |

TABLE 16

| 0 | Identical to Base Station Transmit BF Approach |
| 1 | Different from Base Station Transmit BF Approach |

As shown in Table 15 above, the terminal may determine the reception operation mode depending on whether the "base station reception BF approach" is "0" or "1". Alternatively, as shown in Table 16, the terminal may determine whether the reception operation mode of the base station is the same as the transmission operation mode of the base station or different from the transmission operation mode of the base station depending on whether the "base station receive BF approach" is "0" or "1".

Meanwhile, determining, by the terminal, the transmission operation mode of the base station through the SSS sequence and the reception operation mode of the base station through the PBCH as described above is merely an example. According to still another embodiment of the present invention, the terminal may also determine the reception operation mode of the base station through the SSS sequence and the transmission operation mode of the base station through the PBCH.

In some embodiments, the base station may perform transmission to the terminal by changing a cyclic redundancy check (CRC) mask of the PBCH depending on whether beam sweeping is supported. For example, as shown in Table 17, the base station may indicate the transmission (or reception) operation mode of the base station using information masked in the CRC included in the PBCH for checking errors.

TABLE 17

| | PBCH CRC mask<br>$<x_{ant,0}, x_{ant,1}, \ldots, x_{ant,15}>$ |
|---|---|
| Multi-beam Base Station Transmit BF Approach Indication | <0, 0, 0, 0, 0, 0, 0, 0, 0, 0, 0, 0, 0, 0, 0, 0> |
| Single-beam Base Station Transmit BF Approach Indication | <1, 1, 1, 1, 1, 1, 1, 1, 1, 1, 1, 1, 1, 1, 1, 1> |

As shown in Table 17, the base station performs transmission to the terminal by differently setting a CRC scrambling sequence of the PBCH to thereby indicate that the transmission operation mode of the base station is the multi-beam mode or the single-beam mode. Further, the base station may additionally indicate the reception operation mode of the base station through 1 bit of the MIB.

Meanwhile, the base station may indicate the reception operation mode of the base station by using the CRC sequence of the PBCH and additionally indicate the transmission operation mode of the base station through 1 bit of the MIB.

Further, the scheme in which the reception operation mode of the base station is indicated by using the CRC sequence of the PBCH may also be used together with the above-described embodiments. For example, the base station may indicate the reception operation mode of the base station using the CRC sequence of the PBCH while indicating the transmission operation mode of the base station using the PSS sequence.

According to still another embodiment of the present disclosure, the base station may indicate the transmission and reception operation modes of the base station by setting mask information in the CRC.

TABLE 18

| | PBCH CRC mask<br>$<x_{ant,0}, x_{ant,1}, \ldots, x_{ant,15}>$ |
|---|---|
| Multi-beam Base Station Transmit and Receive BF Approach Indication | <0, 0, 0, 0, 0, 0, 0, 0, 0, 0, 0, 0, 0, 0, 0, 0> |
| Single-beam Base Station Transmit and Receive BF Approach Indication | <1, 1, 1, 1, 1, 1, 1, 1, 1, 1, 1, 1, 1, 1, 1, 1> |
| Single-beam Base Station Transmit BF Approach Indication and Multi-beam Base Station Receive BF Approach Indication | <0, 1, 0, 1, 0, 1, 0, 1, 0, 1, 0, 1, 0, 1, 0, 1> |
| Multi-beam Base Station Transmit BF Approach Indication and Single-beam Base Station Receive BF Approach Indication | <1, 0, 1, 0, 1, 0, 1, 0, 1, 0, 1, 0, 1, 0, 1, 0> |

As shown in Table 18, the base station may set different CRC masks in accordance with the transmission operation mode and the reception operation mode of the base station. Accordingly, the terminal may also determine the transmission and reception operation modes of the base station by checking the received CRC sequence of the PBCH.

In some embodiments, the base station may indicate a sweeping period using the synchronization signal. Further, the terminal may determine a PBCH transmission period based on the sweeping period.

Specifically, the PBCH is one of downlink channels, and the base station may transmit important system information (e.g. MIB) through the PBCH. In addition, the base station may repeatedly transmit the PBCH for robustness of a received signal of the system information. Hereinafter, transmitting the PBCH may represent the same meaning as transmitting the MIB through the PBCH.

According to the operation mode, a time required for sweeping may be different depending on a width of a beam transmitted from the base station (that is determined depending on the number of antenna elements configuring each array) and the number of sub-arrays. Hereinafter, a system in which one beam sweeping duration is defined as a first subframe (=14 OFDM symbols) of each frame, and the number of sub-arrays is two will be described as an example.

In a case of the base station intending to perform transmission beam sweeping in 56 directions for common control signal transmission and reference signal transmission for radio resource measurement (RRM), a period for which the beam is transmitted in 56 directions is two frames. On the other hand, in a case of the base station intending to perform transmission beam sweeping in 28 directions, the beam sweeping is terminated in one frame.

If the beam sweeping period is different as described above, a period for which the same PBCH is transmitted may vary for robustness of the received signal. For example, in a case in which the PBCH information is repeatedly transmitted two times, the serving terminal of the base station of which the beam sweeping period is 1 frame may regard the PBCH transmitted during two frames as the same information. Further, the terminal may combine the PBCH regarded as the same information upon decoding.

On the other hand, the serving terminal of the base station of which the beam sweeping period is 2 frames may regard the PBCH transmitted during four frames as the same information. Therefore, the terminal may combine the PBCH transmitted during the four frames upon decoding.

At this point, the same PBCH information may mean the PBCH including the same MIB information. However, even in the case of the PBCH including the same MIB information, a system frame number (SFN) may be different depending on a position of a frame in which the PBCH is transmitted.

Figure 18:
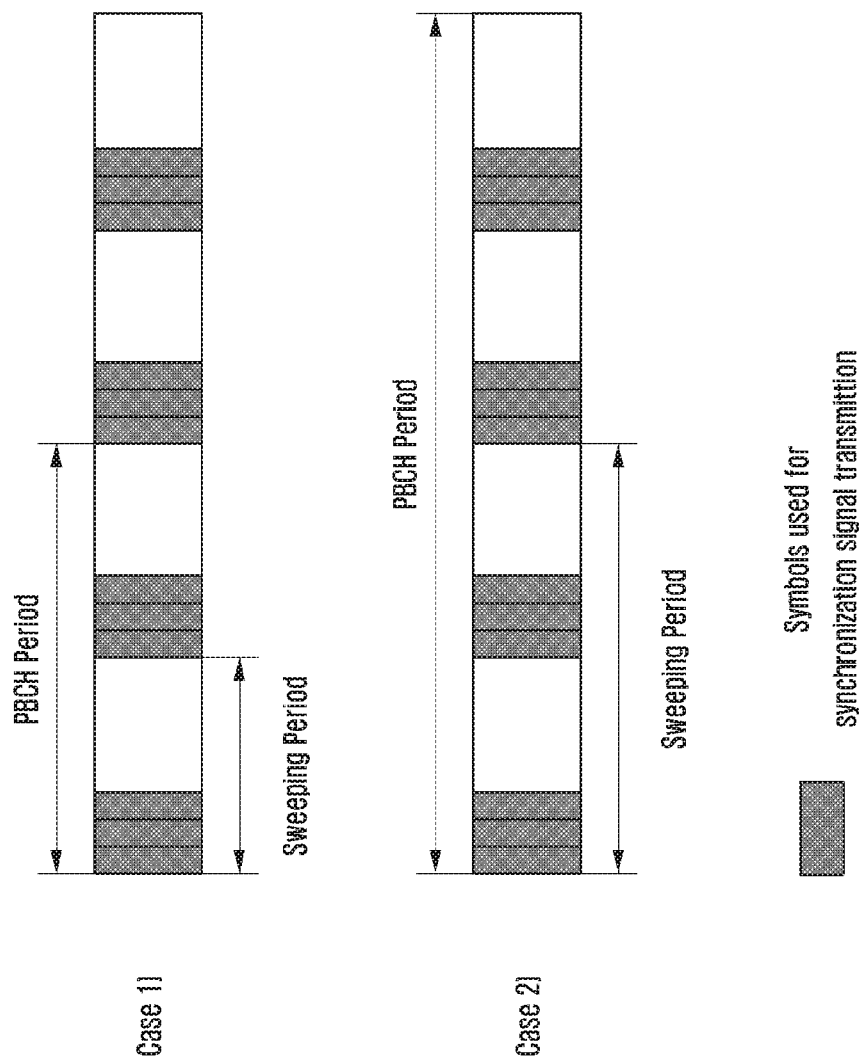
FIG. 18 illustrates an example relationship between a PBCH transmission period and a beam sweeping period if the number of repetition of PBCH transmission is 2 according to an embodiment of the present disclosure.

FIG. 18 illustrates an example relationship between the PBCH transmission period and the beam sweeping period if the number of repetition of PBCH transmission is 2 with reference to the above description.

Therefore, the base station needs to inform the terminal of a period for which the same PBCH information is transmitted. To this end, the base station may indicate a sweeping period using the synchronization signal. Further, the terminal may determine a PBCH transmission period based on the sweeping period.

Specifically, the base station may indicate the beam sweeping period by transmitting a different PSS sequence to the terminal depending on the beam sweeping period.

The PSS may be a synchronization signal used to obtain OFDM symbol synchronization or slot synchronization. A sequence used for the PSS transmission may be generated from Zadoff-Chu (ZC) sequence at a frequency domain.

If the sequence used for the PSS transmission is indicated as d(n), the sequence is as the following equation 10.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{equation (10)}$$

u in Equation 10 represents a Zadoff-Chu root sequence index, and may be defined as shown in Table 19 below.

TABLE 19

|  | $N_{ID}^{(2)}$ | Root index u |
|---|---|---|
| Sweeping Period Type 0 | 0 | A-1 |
|  | 1 | A-2 |
|  | 2 | A-3 |
| Sweeping Period Type 1 | 0 | B-1 |
|  | 1 | B-2 |
|  | 2 | B-3 |
| Sweeping Period Type 2 | 0 | C-1 |
|  | 1 | C-2 |
|  | 2 | C-3 |

In Table 19, sweeping period type 0 may represent a case in which the sweeping period is 1 frame, and sweeping period type 1 may represent a case in which the sweeping period is 2 frames. Further, sweeping period type 2 may represent a case in which the sweeping period is 4 frames. Further, may mean physical layer identity.

The terminal may determine correlations using sequences each representing the sweeping period during a process of receiving the PSS. The terminal may determine whether the sequence of the received PSS is a sequence representing the case in which the sweeping period is 1 frame, or a sequence representing the case in which the sweeping period is 2 frames, or a sequence representing the case in which the sweeping period is 4 frames depending on the determined correlation.

Alternatively, the terminal may determine correlation using one type of sequence for a predetermined time when receiving the PSS. If the correlation is successful, the sweeping period may be determined by the scheme of using the one type of sequence.

Specifically, the terminal may determine that the base station that transmits the PSS supports the case in which the sweeping period is 1 frame if correlation is determined using a sequence representing the case in which the sweeping period is 1 frame and is successful with respect to the received PSS sequence. Alternatively, the terminal may determine that the base station that transmits the PSS supports the case in which the sweeping period is 2 frames if correlation is determined using a sequence representing the case in which the sweeping period is 2 frames and is successful with respect to the received PSS sequence.

By the above-described method, the terminal that determines the sweeping period may determine a PBCH transmission period based on the sweeping period. Further, the PBCH transmitted for the determined PBCH transmission period may be regarded as the same information, and combined upon decoding.

In some embodiments, two sequences of the PSS may be used in an alternative manner according to the PBCH transmission period.

For example, if the beam sweeping period is 1 frame and the PBCH transmission period is 2 frames, the base station may transmit sequence 0 upon PSS transmission during 2 frames, transmit sequence 1 upon PSS transmission during next 2 frames, and use sequence 0 again upon PSS transmission during next 2 frames, thereby indicating the PBCH transmission period.

The sequence used for the PSS transmission is generated through the frequency domain Zadoff-Chu sequence according to equation 11 as below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{equation (11)}$$

Here, the Zadoff-Chu root sequence index u may be defined as in the following Table 20.

TABLE 20

|  | $N_{ID}^{(2)}$ | Root index u |
|---|---|---|
| Type 0 | 0 | A-1 |
| for | 1 | A-2 |
| floor($N_{Frame}^{DL}$) mod ($N_{PBCH}^{DL} \times 2$) < $N_{PBCH}^{DL}$ | 2 | A-3 |
| Type 1 | 0 | B-1 |
| for | 1 | B-2 |
| floor($N_{Frame}^{DL}$) mod ($N_{PBCH}^{DL} \times 2$) ≥ $N_{PBCH}^{DL}$ | 2 | B-3 |

The aforementioned embodiment describes the case in which the PBCH transmission period is 2 frames. Type 0 in Table 20 may represent the sequence type 0, and type 1 may represent the sequence type 1. Further, may mean physical layer identity. Further, in Table 20, may represent a frame number, may represent the number of frames in which the same PBCH is transmitted, and floor( ) may represent a function taking a largest number among integers that are smaller than the number in parentheses.

In some embodiments, the base station may differently set a position of the PSS on the time axis depending on the beam sweeping period. At this point, the terminal may fix a position of the SSS, thereby determining the beam sweeping period based on relative difference in the positions of the PSS and the SSS on the time axis.

The PSS sequence may be mapped to the RE according to equation 12 below.

$$a_{k,l,q} = d_u^l(n), \quad \text{equation (12)}$$

$$n = 0, \ldots, 61$$

$$k = n - 31 + \frac{N_{RB}^{DL} N_{SC}^{RB}}{2}$$

For Sweeping period type 0 $\begin{cases} l = 0 \\ q = N_{SF}^{DL} - 0 \end{cases}$ For Sweeping period type 1 $\begin{cases} l = 0, 1, \ldots, 12, 13 \\ q = N_{SF}^{DL} - 1 \end{cases}$ According to equation 12 above, the PSS may be mapped to a k-th OFDM subcarrier and a first OFDM symbol of a q-th subframe of subframes configuring one frame.

Meanwhile, the base station may reserve the following equation 13 for the PSS. However, the base station may not use information according to equation 13 below.

$$k = n - 31 + \frac{N_{RB}^{DL} N_{SC}^{RB}}{2} \quad \text{equation (13)}$$

$$n = -5, -4, \ldots, -1, 62, 63, \ldots 66$$

For Sweeping period type 0 $\begin{cases} l = 0 \\ q = N_{SF}^{DL} - 0 \end{cases}$ For Sweeping period type 1 $\begin{cases} l = 0, 1, \ldots, 12, 13 \\ q = N_{SF}^{DL} - 1 \end{cases}$ In some embodiments, in the case in which the base station does not perform beam sweeping upon PBCH transmission, and the PBCH transmission is performed according to the single-beam transmission structure of the base station, the PBCH transmission needs to be repeated more often in order to obtain the same coverage as the PBCH transmitted according to the multi-beam transmission structure.

Accordingly, the terminal may require information on the period of the PBCH or the number of repetition. Therefore, the base station may indicate the information on the period or the number of repetition to the terminal according to Embodiments 9-1 to 9-3 as described above.

In some embodiments, the base station may combine and use the PBCH transmission period indication method in the aforementioned embodiments, and the base station transmission and reception operation mode indication method described above.

For example, the base station may indicate the PBCH transmission period through difference in positions of the PSS/SSS on the time axis, and indicate the transmission and reception operation modes of the base station by the PSS sequence.

Alternatively, the base station may also indicate the PBCH transmission period while indicating the transmission and reception operation modes of the base station using the PSS sequence. Specifically, the Zadoff-Chu root sequence index u that is foundational to PSS sequence generation may be defined as in the following Table 21.

TABLE 21

|  | $N_{ID}^{(2)}$ | Root index u |
|---|---|---|
| Type 0 for floor($N_{Frame}^{DL}$) mod ($N_{PBCH}^{DL} \times 2$) < $N_{PBCH}^{DL}$ | | |
| Transmit and Receive BF Approach Indication 0 | 0<br>1<br>2 | A-1<br>A-2<br>A-3 |
| Transmit and Receive BF Approach Indication 1 | 0<br>1<br>2 | B-1<br>B-2<br>B-3 |

TABLE 21-continued

|  | $N_{ID}^{(2)}$ | Root index u |
|---|---|---|
| Type 1 for floor($N_{Frame}^{DL}$) mod ($N_{PBCH}^{DL} \times 2$) ≥ $N_{PBCH}^{DL}$ | | |
| Transmit and Receive BF Approach Indication 0 | 0<br>1<br>2 | C-1<br>C-2<br>C-3 |
| Transmit and Receive BF Approach Indication 1 | 0<br>1<br>2 | D-1<br>D-2<br>D-3 |

According to Table 21 above, the base station may indicate the PBCH transmission period and the transmission and reception operation mode of the base station through the PSS sequence. Accordingly, the terminal may determine the PBCH transmission period and the transmission and reception operation modes of the base station by checking the received PSS sequence.

In some embodiments, the base station may indicate the transmission and reception operation mode of the base station while indicating whether the frame structure of the system is a frequency division duplex (FDD) structure or a time division duplex (TDD) structure.

Generally, the base station may transmit a different transmission position of the SSS to indicate whether the duplexing type of the system is FDD or TDD. For example, if the base station transmits the SSS in the last symbol of a first slot of the subframe, the terminal may determine that the duplexing type of the system is FDD. Further, if the base station transmits the SSS in the last symbol of a second slot of the subframe, the terminal may determine that the duplexing type of the system is TDD.

According to an embodiment of the present disclosure, the base station may divide and indicate the FDD and TDD types based on the positions of the PSS/SSS on the frequency axis or the time axis. Alternatively, the base station may divide and indicate the FDD and TDD types by transmitting a different PSS sequence depending on the FDD or TDD type.

Meanwhile, according to still another embodiment of the present disclosure, the system may support six frame structures. Therefore, the base station may transmit indication for the six frame structures.

The six frame structures are as follows:
(1) Type 1-1, which is a FDD type and used in the case of the multi-beam base station;
(2) Type 1-2, which is a TDD type and used in the case of the multi-beam base station;
(3) Type 2-1, which is a FDD type and used in the case of the single-beam base station;
(4) Type 2-2, which is a TDD type and used in the case of the single-beam base station;
(5) Type 3-1, which is a FDD type and used in the case in which the base station simultaneously utilizes the single-beam mode and the multi-beam mode; and
(6) Type 3-2, which is a TDD type and used in the case in which the base station simultaneously utilizes the single-beam mode and the multi-beam mode.

The base station may indicate the types to the terminal by the above-described methods. For example, the base station may divide and indicate the TDD/FDD mode by set different positions on the frequency axis or the time axis at which the PSS/SSS are transmitted, and may indicate the transmission and reception operation modes by using 1 bit or 2 bits transmitted through the PBCH.

Figure 19:
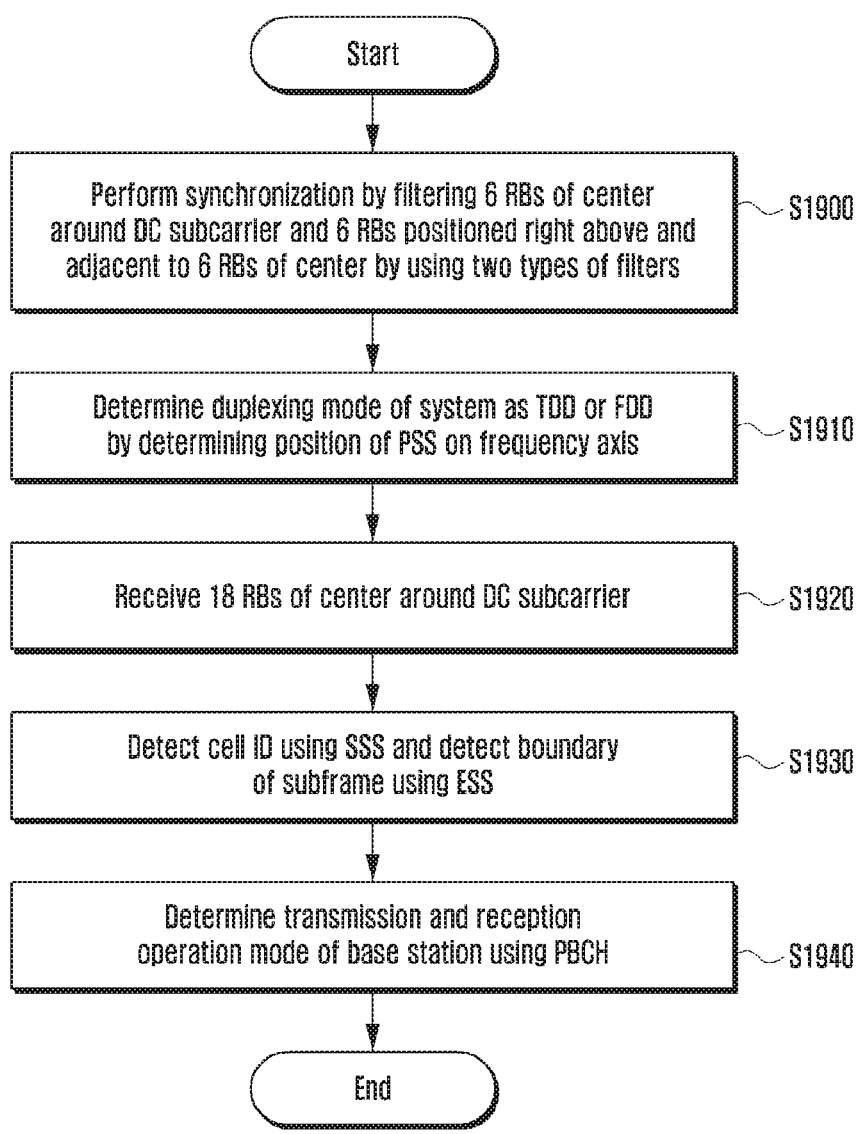
FIGS. 19 and 20 illustrate examples operation of the terminal that receives a synchronization signal and a PBCH according to an indication of the base station according to various embodiments of the present disclosure.

The operation of the terminal that receives the synchronization signal and the PBCH according to the indication of the base station is as shown in the flow chart of FIG. 19.

First, in step S1900, the terminal may perform synchronization by filtering 6 RBs of the center around the DC subcarrier and 6 RBs positioned right above and adjacent to the 6 RBs, respectively, by using two types of filters.

Further, in step S1910, the terminal may determine the position of the PSS on the frequency axis to determine the duplexing mode of the system as TDD or FDD. For example, in a case in which setting is performed in advance so that the duplexing mode of the system is determined as the TDD frame structure if the PSS is transmitted through the 6 RBs of the center, the duplexing mode of the system may be determined as TDD or FDD by determining whether the PSS is transmitted through the 6 RBs of the center.

In step S1920, the terminal may receive 18 RBs of the center around the DC subcarrier. Further, in step S1930, the terminal may detect a cell ID using the SSS and a boundary of the subframe using the ESS.

In step S1940, the terminal may determine the transmission and reception operation modes of the base station using the PBCH. If setting is performed in advance so that the transmission and/or reception operation mode of the base station is indicated by using 2 bits of the MIB of the PBCH, the terminal may determine the transmission and/or reception operation mode of the base station according to a preset condition by checking whether the bit of the MIB is "00", "01", or "10".

Meanwhile, the base station may divide and indicate the TDD/FDD mode by set different positions on the frequency axis or the time axis at which the PSS/SSS are transmitted, and may transmit a different PSS sequence depending on the transmission and reception operation modes of the base station. The base station may also indicate the reception operation mode of the base station by additionally using the PBCH in the case of indicating only the transmission operation mode of the base station by the PSS sequence.

Figure 20:
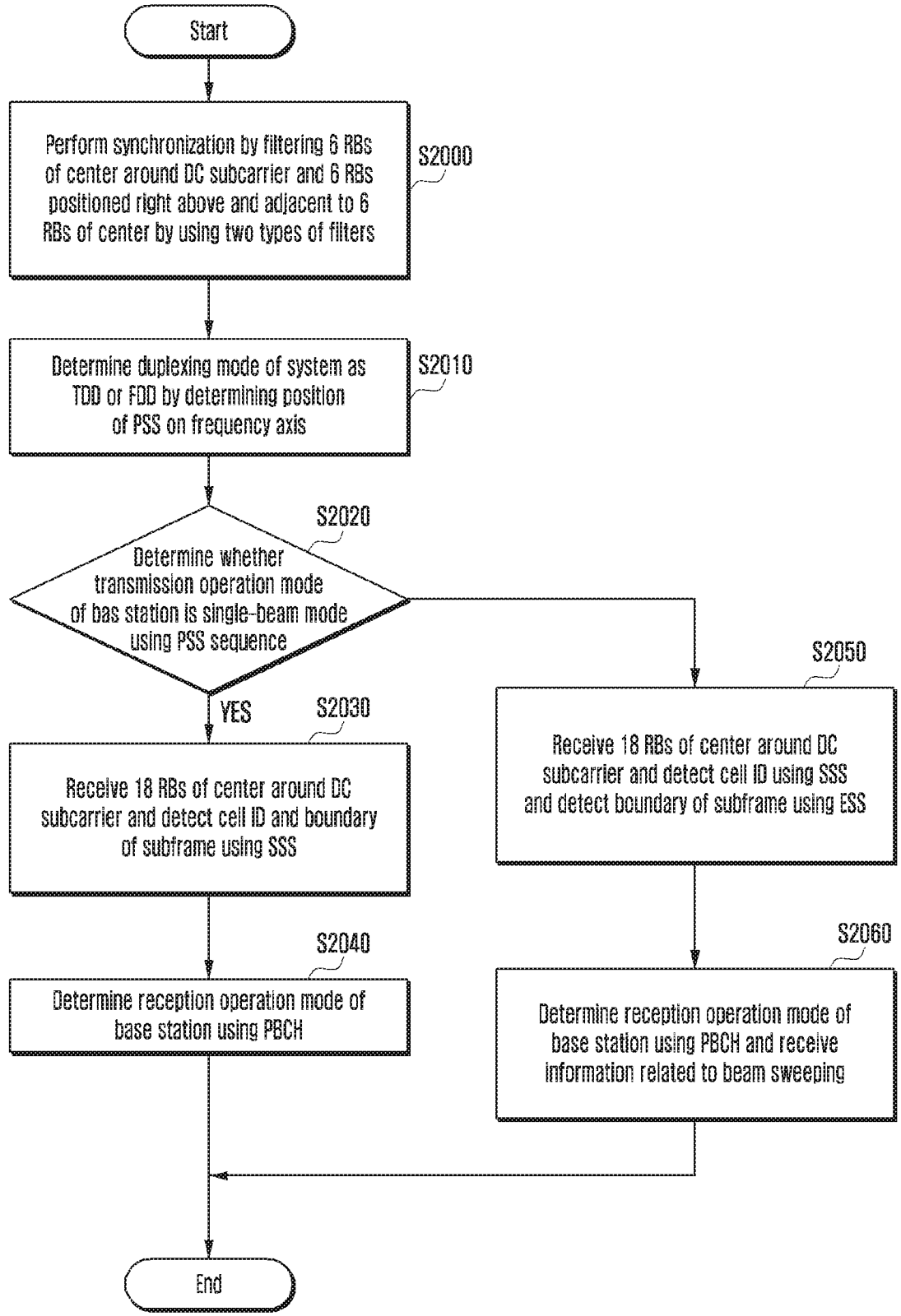

The operation of the terminal that receives the synchronization signal and the PBCH according to the indication of the base station is as shown in the flow chart of FIG. 20.

First, in step S2000, the terminal may perform synchronization by filtering 6 RBs of the center around the DC subcarrier and 6 RBs positioned right above and adjacent to the 6 RBs, respectively, by using two types of filters.

Further, in step S2010, the terminal may determine the position of the PSS on the frequency axis to determine the duplexing mode of the system as TDD or FDD. For example, in a case in which setting is performed in advance so that the duplexing mode of the system is determined as the TDD frame structure if the PSS is transmitted through the 6 RBs of the center, the duplexing mode of the system may be determined as TDD or FDD by determining whether the PSS is transmitted through the 6 RBs of the center.

Further, in step S2020, the terminal may determine whether the transmission operation mode of the base station is the single-beam mode by using the PSS sequence. The detailed method of determining, by the terminal, the transmission operation mode of the base station using the PSS sequence is as described above.

As the determination result, if the transmission operation mode of the base station is the single-beam mode, in step S2030, the terminal may receive 18 RBs of the center around the DC subcarrier to detect the cell ID and the boundary of the subframe by using the SSS.

Further, in step S2040, the terminal may determine the reception operation mode of the base station using the PBCH.

Meanwhile, as the determination result, if the transmission operation mode of the base station is not the single-beam mode, but is, for example, the multi-beam mode, in step S2050, the terminal may receive 18 RBs of the center around the DC subcarrier to detect the cell ID by using the SSS and detect the boundary of the subframe by using the ESS.

Further, in step S2060, the terminal may determine the reception operation mode of the base station using the PBCH and receive information related to beam sweeping.

According to an example, if the duplexing mode of the system determined by the terminal is FDD, and the transmission and reception operation modes of the base station is the single-beam mode, the terminal may recognize that the frame structure of the system is the type 2-1 among the six structures that are defined above. Further, the terminal may perform wireless communication according to the type 2-1.

In some embodiments, the base station may also indicate the duplex mode while indicating the PBCH period and the transmission and reception operation modes of the base station by using a position on the frequency axis at which the PSS/SSS are transmitted, a position on the time axis, the PSS sequence, any bit of the MIB transmitted through the PBCH, the CRC mask of the MIB, or the like.

For example, the base station may indicate whether the transmission operation mode of the base station is the single-beam mode or the multi-beam mode by changing the position on the time axis at which the PSS and the SSS are transmitted. Further, the base station may indicate whether the duplex mode of the system is TDD or FDD by changing the PSS sequence. Further, the base station may indicate the PBCH transmission period by using the CRC of the PBCH.

As shown in Table 1 above, the terminal may determine the DL/UL frame structure in a corresponding frequency region through an identifier according to an operating frequency. Further, based on a value of the identifier, the terminal may acquire information on with which of the single-beam-related frame and the multi-beam-related frame among DL/UL frame structures that may be implemented in the corresponding frequency region the terminal should be consistent, through another identifier.

For example, DL/UL frame structures 1 and 2 may be distinguished through the synchronization signal as in the aforementioned embodiments described above. Further, if it is recognized that the DL/UL frame structure is the DL/UL frame structure 1 through the synchronization signal, it is possible to find out whether the DL/UL frame structure is 1-1 or 1-2 through the MIB as in the aforementioned embodiment described above.

In some cases, the DL/UL frame structure 1 may only include a structure corresponding to the DL/UL frame structure 1-1.

Figure 23:
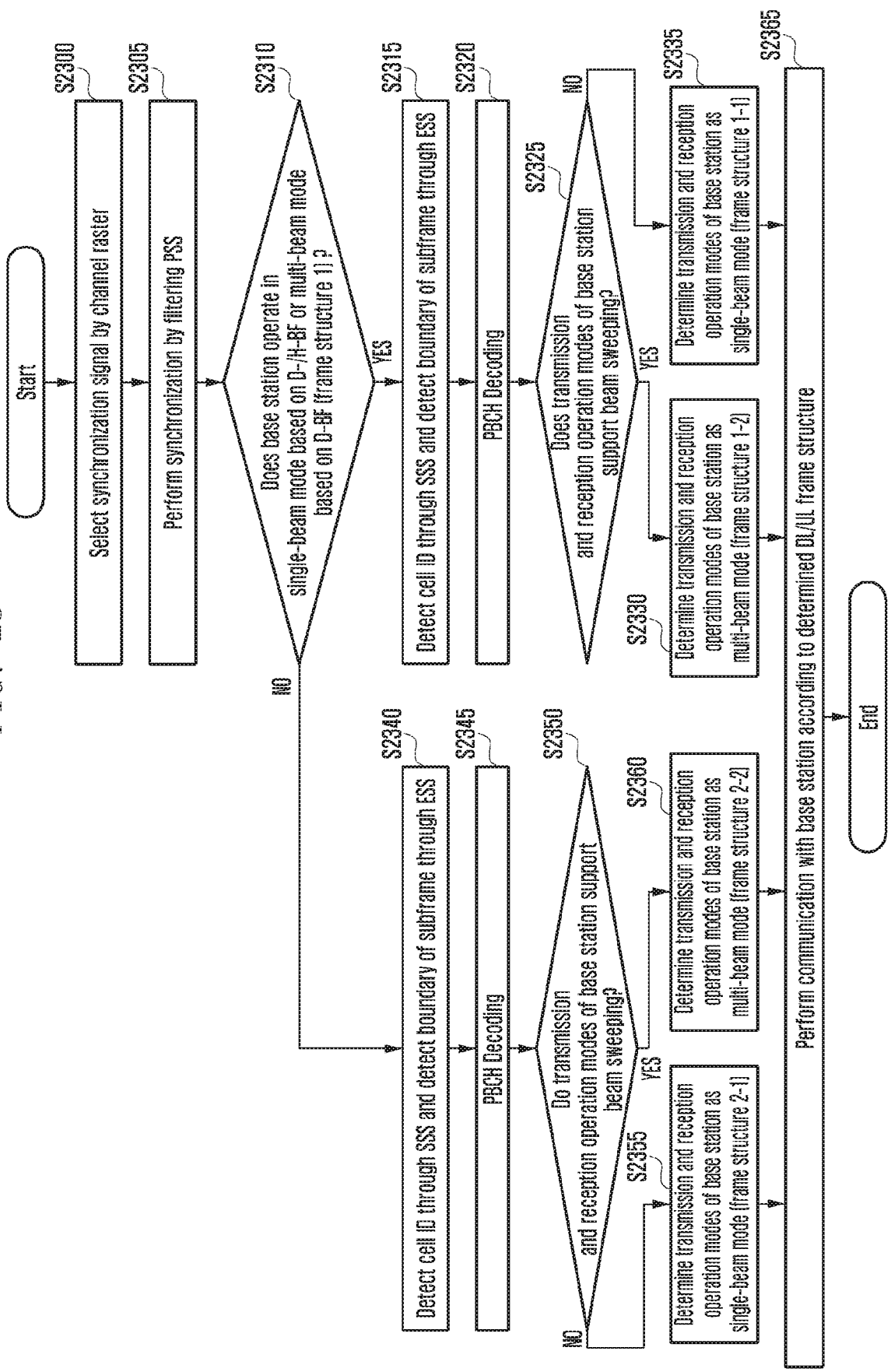
FIG. 23 illustrates an example method of indicating an operating frequency and an operation mode of the base station according to an embodiment of the present disclosure.

Specifically, FIG. 23 illustrates an example operation of the base station and the terminal according to the aforementioned embodiment.

First, in step S2300, the terminal may select a synchronization signal through the channel raster, and in step S2305, may perform synchronization by filtering a PSS.

Further, in step S2310, the terminal may determine whether or not the base station operates in the single-beam mode based on D-BF/H-BF, or in the multi-beam mode based on D-BF. In other words, the terminal may determine whether the frame structure is the frame structure 1.

As the determination result, if the base station operates in the single-beam mode based on D-BF/H-BF, or in the multi-beam mode based on D-BF, that is, if it is determined that the frame structure is the frame structure 1, in step S2315, the terminal may detect a cell ID through an SSS, and detect a boundary of a subframe through an ESS.

Further, in step S2320, the terminal may perform PBCH decoding, and in step S2325, may determine whether the transmission and reception operation modes of the base station support beam sweeping.

As the determination result, if the transmission and reception operation modes of the base station support beam sweeping, in step S2330, the terminal may determine the transmission and reception operation modes of the base station as the multi-beam mode. In other words, the terminal may determine the frame structure as the frame structure 1-2 which is the multi-beam system based on D-BF architecture.

Meanwhile, if the transmission and reception operation modes of the base station do not support beam sweeping, in step S2335, the terminal may determine that the transmission and reception operation modes of the base station as the single-beam mode. In other words, the terminal may determine the frame structure as the frame structure 1-1 which is the single-beam system based on D-BF or H-BF architecture.

Further, as the determination result of step S2310, if the base station does not operate in the single-beam mode based on D-BF/H-BF, or in the multi-beam mode based on D-BF, that is, if it is determined that the frame structure is the frame structure 2, in step S2340, the terminal may detect a cell ID through an SSS, and detect a boundary of a subframe through an ESS.

Further, in step S2345, the terminal may perform PBCH decoding, and in step S2350, may determine whether the transmission and reception operation modes of the base station support beam sweeping.

As the determination result, if the transmission and reception operation modes of the base station support beam sweeping, in step S2355, the terminal may determine the transmission and reception operation modes of the base station as the multi-beam mode. In other words, the terminal may determine the frame structure as the frame structure 2-2 which is the multi-beam system based on H-BF architecture.

Meanwhile, if the transmission and reception operation modes of the base station do not support beam sweeping, in step S2360, the terminal may determine that the transmission and reception operation modes of the base station as the single-beam mode. In other words, the terminal may determine the frame structure as the frame structure 2-1 which is the single-beam system based on D-BF or H-BF architecture.

Further, in step S2365, the terminal may perform communication with the base station according to the determined DL/UL frame structure.

As described above, according to Table 2, if the operating frequency of the terminal is in a band of F1 to F2 GHz, the base station may determine whether to follow the DL/UL frame structure in a band of F1 GHz or less, or the DL/UL frame structure in a band of F2 GHz or more. Therefore, the base station may perform indication to make the terminal to follow the DL/UL frame structure in a band of F1 GHz or less or in a band of F2 GHz or more, through a synchronization sequence such as PSS/SSS/ESS in the same manner as described above.

Further, the terminal may determine whether the DL/UL frame structure uses the single-beam mode or the multi-beam mode through the MIB. As described above, the DL/UL frame structure may be different with respect to the single-beam mode and the multi-beam mode depending on the operating band. At this point, the terminal operating in the band of F1 to F2 GHz may indicate whether the base station operates in the single-beam mode or the multi-beam mode through the synchronization or the MIB.

Figure 21:
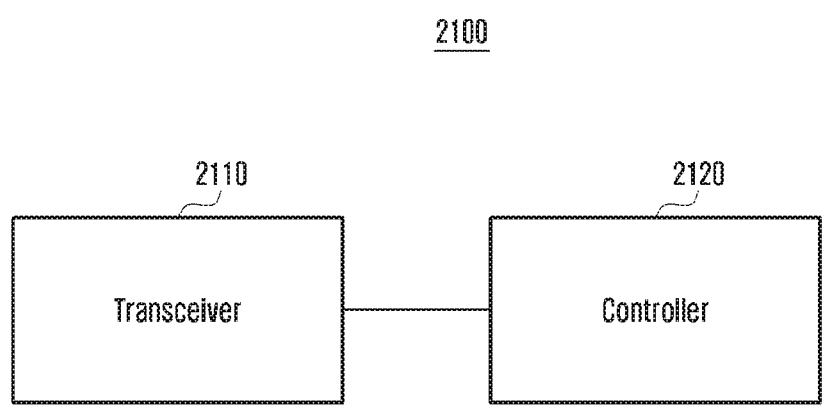
FIG. 21 is a block diagram illustrating components of the base station according to an embodiment of the present disclosure.
Figure 22:
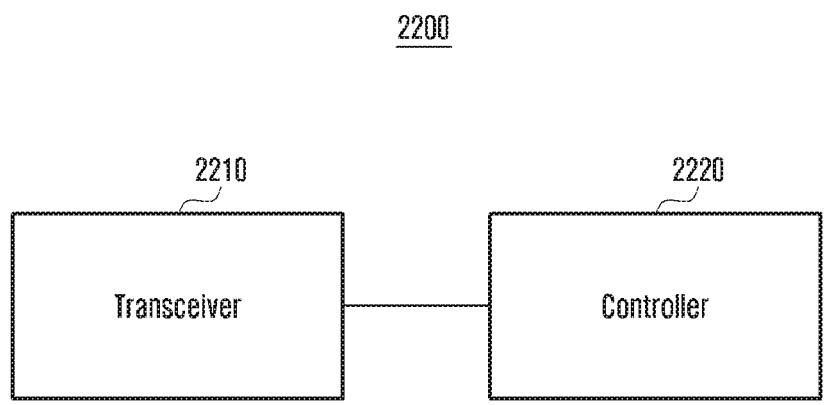
FIG. 22 illustrates an example component of the terminal according to an embodiment of the present disclosure.

Meanwhile, FIG. 21 illustrates an example component of a base station 2100 according to an embodiment of the present disclosure. The base station 2100 may include a transceiver 2110 and a controller 2120.

The transceiver 2110 is a component for transmitting and receiving a signal.

Further, the controller 2120 is a component for generally controlling the base station 2100. Specifically, the controller 2120 may check an operation mode depending on whether beam sweeping is supported, control the transceiver unit to transmit a signal related to the operation mode to a terminal, and perform a control to communicate with the terminal according to the operation mode.

The operation mode may include a first type that supports the beam sweeping and a second type that does not support the beam sweeping. Further, the first type is a digital-beamforming type (single-beam type) and the second type is an analog-beamforming type (analog-BF type) or a hybrid-beamforming type (hybrid-BF type).

Meanwhile, the controller 2120 may control the transceiver 2110 to transmit a primary synchronization signal (PSS) having a different sequence depending on the operation mode. Alternatively, the controller 2120 may also perform a control to vary a frequency band in which the PSS and a secondary synchronization signal (SSS) are transmitted or a time at which the PSS and the SSS are transmitted depending on the operation mode.

The controller 2120 may control the transceiver 2110 to transmit information including a bit indicating the operation mode through a physical broadcast channel (PBCH).

Further, the controller 2120 may determine a frame structure type of the wireless communication system as any one of a frequency division duplex (FDD) type and a time division duplex (TDD) type, and may control the transceiver 2110 to transmit information on the frame structure type based on the determination to the terminal.

Meanwhile, the controller 2120 may control the transceiver 2110 to transmit information related to a PBCH transmission period to the terminal.

The controller 2120 may control an operation of the base station 2110 in all embodiments described above in addition to the above described operations.

Meanwhile, FIG. 21 illustrates an example component of a terminal 2200 according to an embodiment of the present disclosure. The terminal 2200 may include a transceiver 2210 and a controller 2220.

The transceiver 2210 is a component for transmitting and receiving a signal.

Further, the controller 2220 is a component for generally controlling the terminal 2200. Specifically, the controller 2220 may control the transceiver 2210 to receive a signal related to an operation mode depending on whether the base station supports beam sweeping from the base station 2100, determine the operation mode of the base station based on the received signal, and perform a control to communicate with the base station 2100 according to the operation mode.

Meanwhile, the operation mode includes a first type that supports the beam sweeping and a second type that does not support the beam sweeping, in which the first type may be a single-beam type and the second type may be a multi-beam type.

The controller 2220 may control the transceiver 2210 to receive a primary synchronization signal (PSS) and a secondary synchronization signal (SSS). Further, the controller 2220 may determine the operation mode by the PSS sequence or based on a frequency band in which the PSS and the SSS are received or a reception time at which the PSS and the SSS are received.

Further, the controller 2220 may control the transceiver 2210 to receive information including a bit indicating the operation mode through a physical broadcast channel (PBCH).

Meanwhile, the controller 2220 may control the transceiver 2210 to receive information on the frame structure type if the frame structure type of the wireless communication system is determined as any one of a frequency division duplex (FDD) type and a time division duplex (TDD) type.

Further, the controller 2220 may control the transceiver 2210 to receive information related to a PBCH transmission period from the base station.

Meanwhile, the controller may control an operation of the terminal 2200 in all embodiments described above in addition to the above described operations.

The components of the terminal and the base station described above may be implemented as software. For example, the controller of the terminal or the base station may further include a flash memory or other non-volatile memories. Such non-volatile memory may store a program for performing each role of the controller.

Further, the controller of the terminal or the base station may include a CPU and a random access memory (RAM). The CPU of the controller may copy the above-described programs stored in a non-volatile memory to the RAM, and execute the copied programs to perform a function of the terminal as described above.

The controller is a component for controlling the terminal or the base station. The controller may be used in the same meaning as a CPU, a microprocessor, a processor, an operating system, or the like. Further, the controller of the terminal or the base station may be implemented as a system-on-a-chip (SOC) or a system on chip (SoC) together with other functional units such as a communication module included in the terminal, or the like.

Meanwhile, a method of the terminal or the base station according to various embodiments described above may be coded as software and stored in a non-transitory readable medium. Such non-transitory readable medium may be installed in various apparatuses to be used.

The non-transitory readable medium means a medium that semi-permanently stores data and is readable by a device, not a medium that stores data for a short period of time such as a register, a cache, a memory, or the like. Specifically, the non-transitory readable medium may be a CD, a DVD, a hard disk, a Blu-ray disk, an USB, a memory card, a ROM, or the like.

Further, although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a base station in a wireless communication system, comprising:
   determining an operation mode as one of a first type supporting beam sweeping and a second type not supporting the beam sweeping, in case that the beam sweeping is supported by the base station;
   generating a primary synchronization signal (PSS), the PSS associating with a first sequence in case that the operation mode is determined as the first type and the PSS associating with a second sequence different from the first sequence in case that the operation mode is determined as the second type;
   transmitting, to a terminal, a signal related to the operation mode, the signal related to the operation mode comprising the PSS associating with a different sequence depending on the operation mode; and
   performing a communication with the terminal according to the operation mode,
   wherein the operation mode is determined, by the terminal, by performing a correlation between the PSS and a sequence corresponding to a specific operation mode.

2. The method of claim 1, wherein the first type is a single-beam type and the second type is a multi-beam type.

3. The method of claim 1, wherein a frequency band in which the PSS and a secondary synchronization signal (SSS) are transmitted, or a time at which the PSS and the SSS are transmitted, are based on the operation mode.

4. The method of claim 1, wherein transmitting the signal further comprises transmitting information including a bit indicating the operation mode through a physical broadcast channel (PBCH).

5. The method of claim 1, further comprising:
   determining at least one of a frequency division duplex (FDD) type or a time division duplex (TDD) type for a frame structure type of the base station;
   transmitting, to the terminal, information including the frame structure type; and
   transmitting, to the terminal, information related to a PBCH transmission period.

6. A base station in a wireless communication system, comprising:
   a transceiver; and
   a controller configured to:
      determine an operation mode as one of a first type supporting beam sweeping and a second type not supporting the beam sweeping, in case that the beam sweeping is supported by the base station,
      generate a primary synchronization signal (PSS), the PSS associating with a first sequence in case that the operation mode is determined as the first type and the PSS associating with a second sequence different from the first sequence in case that the operation mode is determined as the second type,
      control the transceiver to transmit, to a terminal, a signal related to the operation mode, the signal related to the operation mode comprising the PSS associating with a different sequence depending on the operation mode,
      control to perform a communication with the terminal according to the operation mode,
   wherein the operation mode is determined, by the terminal, by performing a correlation between the PSS and a sequence corresponding to a specific operation mode.

7. The base station of claim 6, wherein the first type is a single-beam type and the second type is a multi-beam type.

8. The base station of claim 6, wherein the controller is further configured to:
control to adjust a frequency band in which the PSS and a secondary synchronization signal (SSS) are transmitted or a time at which the PSS and the SSS are transmitted based on the operation mode.

9. The base station of claim 6, wherein the transceiver is further configured to transmit information including a bit indicating the operation mode through a physical broadcast channel (PBCH).

10. The base station of claim 6, wherein:
the controller is further configured to determine at least one of a frequency division duplex (FDD) type or a time division duplex (TDD) type for a frame structure type of the base station; and
the transceiver is further configured to:
transmit, to the terminal, information including the frame structure type; and
transmit, to the terminal, information related to a PBCH transmission period.

11. A method of a terminal in a wireless communication system, comprising:
receiving, from a base station, a signal related to an operation mode, the operation mode comprising a first type supporting beam sweeping and a second type not supporting the beam sweeping, based on whether the base station supports beam sweeping, the signal related to the operation mode comprising a primary synchronization signal (PSS) having a different sequence depending on the operation mode, the PSS associating with a first sequence in case that the operation mode is the first type and the PSS associating with a second sequence different from the first sequence in case that the operation mode is the second type;
performing a correlation between the received PSS and a sequence corresponding to a specific operation mode;
identifying the operation mode of the base station based on a result of the correlation; and
performing a communication with the base station according to the operation mode.

12. The method of claim 11, wherein the first type is a single-beam type and the second type is a multi-beam type.

13. The method of claim 11, wherein receiving the signal further comprises receiving the PSS and a secondary synchronization signal (SSS), and
wherein the operation mode is identified based on a frequency band in which the PSS and the SSS are received, or a reception time at which the PSS and the SSS are received.

14. The method of claim 11, wherein receiving the signal further comprises receiving information including a bit indicating the operation mode of the base station through a physical broadcast channel (PBCH).

15. The method of claim 11, further comprising:
receiving, from the base station, information including a frame structure type of the wireless communication system that is determined by at least one of a frequency division duplex (FDD) type or a time division duplex (TDD) type; and
receiving, from the base station, information related to a PBCH transmission period.

16. A terminal in a wireless communication system, comprising:
a transceiver; and
a controller operably connected to the transceiver, the controller configured to:
control the transceiver to receive, from a base station, a signal related to an operation mode, the operation mode comprising a first type supporting beam sweeping and a second type not supporting the beam sweeping, based on whether the base station supports beam sweeping, the signal related to the operation mode comprising a primary synchronization signal (PSS) having a different sequence depending on the operation mode, the PSS associating with a first sequence in case that the operation mode is the first type and the PSS associating with a second sequence different from the first sequence in case that the operation mode is the second type,
perform a correlation between the received PSS and a sequence corresponding to a specific operation mode,
identify the operation mode of the base station based on a result of the correlation; and
perform a communication with the base station according to the operation mode.

17. The terminal of claim 16, wherein the first type is a single-beam type and the second type is a multi-beam type.

18. The terminal of claim 16, wherein:
the controller is further configured to control the transceiver to receive the PSS and a secondary synchronization signal (SSS); and
the controller is further configured to identify the operation mode based on a frequency band in which the PSS and the SSS are received, or a reception time at which the PSS and the SSS are received.

19. The terminal of claim 16, wherein the transceiver is further configured to receive information including a bit indicating the operation mode through a physical broadcast channel (PBCH).

20. The terminal of claim 16, wherein the transceiver is further configured to:
receive, from the base station, information including a frame structure type of the wireless communication system that is determined by at least one of a frequency division duplex (FDD) type or a time division duplex (TDD) type; and
receive information related to a PBCH transmission period from the base station.

* * * * *